(12) United States Patent
Kim et al.

(10) Patent No.: US 10,547,417 B2
(45) Date of Patent: Jan. 28, 2020

(54) METHOD AND APPARATUS FOR TRANSMITTING AND RECEIVING SIGNAL IN COMMUNICATION SYSTEM USING SCALABLE FRAME STRUCTURE

(71) Applicant: Samsung Electronics Co., Ltd., Suwon-si, Gyeonggi-do (KR)

(72) Inventors: Chanhong Kim, Suwon-si (KR); Yeohun Yun, Hwaseong-si (KR); Hyunseok Ryu, Yongin-si (KR); Peng Xue, Suwon-si (KR); Taeyoung Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 56 days.

(21) Appl. No.: 15/717,150

(22) Filed: Sep. 27, 2017

(65) Prior Publication Data

US 2018/0091267 A1 Mar. 29, 2018

(30) Foreign Application Priority Data

Sep. 27, 2016 (KR) .................. 10-2016-0124209
Nov. 3, 2016 (KR) .................. 10-2016-0146067
Jan. 6, 2017 (KR) .................. 10-2017-0002603

(51) Int. Cl.
*H04L 5/00* (2006.01)
*H04L 27/26* (2006.01)
*H04J 11/00* (2006.01)

(52) U.S. Cl.
CPC ............ *H04L 5/001* (2013.01); *H04L 5/0007* (2013.01); *H04L 27/26* (2013.01);
(Continued)

(58) Field of Classification Search
CPC . H04L 27/2602; H04L 27/26; H04L 27/2607; H04L 27/2662; H04L 5/0007;
(Continued)

(56) References Cited

U.S. PATENT DOCUMENTS

2006/0013325 A1   1/2006   Agrawal et al.
2007/0268812 A1   11/2007  Yoon et al.
(Continued)

FOREIGN PATENT DOCUMENTS

KR   10-2009-0008414 A   1/2009

OTHER PUBLICATIONS

Samsung; Extended CP length aspects; 3GPP TSG RAN WG1 Meeting #87; R1-1612443; Nov. 14-18, 2016; Reno, NV.

*Primary Examiner* — Ricardo H Castaneyra
(74) *Attorney, Agent, or Firm* — Jefferson IP Law, LLP

(57) ABSTRACT

A $5^{th}$ generation (5G) or pre-5G communication system supporting higher data rate after a $4^{th}$ generation (4G) communication system such as a long-term evolution (LTE) is disclosed. The system includes a scalable frame structure to integrally support various services in a cellular wireless communication system, and provides a transmission/reception method to which the corresponding frame structure is applied, so that the system performance is improved through minimizing of inter-symbol interference between the 5G system and the LTE system or between the 5G systems. The scalable frame structure adjusts a cyclic prefix (CP) length by giving a specific pattern thereto when subcarrier spacing is extended, while maintaining a CP overhead in the same manner based on the frame structure based on a specific subcarrier spacing, thereby maintaining the $2^m$-times relationship between a symbol length, CP length, slot length, and subframe length.

12 Claims, 50 Drawing Sheets

(52) U.S. Cl.
CPC ....... *H04L 27/2602* (2013.01); *H04J 11/0069* (2013.01); *H04J 2011/0009* (2013.01); *H04J 2211/005* (2013.01)

(58) Field of Classification Search
CPC . H04L 5/001; H04J 2211/005; H04J 11/0069; H04J 2011/0009; H04W 72/042; H04W 72/0453; H04W 72/04
See application file for complete search history.

(56) References Cited

U.S. PATENT DOCUMENTS

| | | |
|---|---|---|
| 2011/0103406 A1 | 5/2011 | Cai et al. |
| 2015/0256308 A1 | 9/2015 | Ma et al. |
| 2016/0128086 A1 | 5/2016 | Dinan |
| 2016/0191216 A1 | 6/2016 | Ma et al. |
| 2017/0163463 A1* | 6/2017 | Werner ................ H04L 5/0007 |

* cited by examiner

METHOD AND APPARATUS FOR TRANSMITTING AND RECEIVING SIGNAL IN COMMUNICATION SYSTEM USING SCALABLE FRAME STRUCTURE

CROSS-REFERENCE TO RELATED APPLICATION(S)

This application claims the benefit under 35 U.S.C. 119(a) of a Korean patent application filed on Sep. 27, 2016 in the Korean Intellectual Property Office and assigned Serial number 10-2016-0124209, of a Korean patent application filed on Nov. 3, 2016 in the Korean Intellectual Property Office and assigned Serial number 10-2016-0146067, and of a Korean patent application filed on Jan. 6, 2017 in the Korean Intellectual Property Office and assigned Serial number 10-2017-0002603 the entire disclosure of each of which is herein incorporated by reference.

TECHNICAL FIELD

The present disclosure relates to a cellular wireless communication system that defines a frame structure for signal transmission and reception and an apparatus for transmitting and receiving a signal using the frame structure. More particularly, the present disclosure relates to a scalable frame structure and a method and an apparatus for transmitting and receiving a signal using the scalable frame structure.

BACKGROUND

Recently, in order to process an explosively increasing mobile data traffic, there has been a lively discussion on $5^{th}$ generation (5G) system or new radio (NR) access technology, which is the next-generation communication system after a long-term evolution (LTE) or evolved universal terrestrial radio access (E-UTRA) system and an LTE-advanced (LTE-A) or E-UTRA evolution system. As compared with the existing mobile communication system that gives priority to typical voice/data communication, the 5G system takes aim at various services, such as an enhanced mobile broadband (eMBB) service for improvement of the existing voice/data communication, an ultra-reliable and low latency communication (URLLC) service, and a massive machine type communication (massive MTC or mMTC) service, and satisfaction of various requirements for the respective services.

In order to meet the demand for wireless data traffic that is on an increasing trend after commercialization of $4^{th}$ generation (4G) communication systems, efforts have been made to develop improved 5G or pre-5G communication system. For this reason, the 5G or pre-5G communication system is also called a beyond 4G network communication system or a post LTE system. In order to achieve high data rate, implementation of a 5G communication system in an ultrahigh frequency (millimeter wave (mmWave)) band (e.g., like 60 GHz band) has been considered. In order to mitigate a path loss of radio waves and to increase a transfer distance of the radio waves in the ultrahigh frequency band, technologies of beamforming using array antennas, massive multiple input multiple output (MIMO), full dimension MIMO (FD-MIMO), hybrid beamforming, and large-scale antennas for the 5G communication system have been discussed. Further, for system network improvement in the 5G communication system, technology developments have been made for an evolved small cell, advanced small cell, cloud radio access network (cloud RAN), ultra-dense network, device to device communication (D2D), wireless backhaul, moving network, cooperative communication, coordinated multi-points (CoMP), and reception interference cancellation. In addition, hybrid frequency-shift keying (FSK) and quadrature amplitude modulation (QAM) modulation frequency and quadrature amplitude modulation (FQAM) and sliding window superposition coding (SWSC), which correspond to advanced coding modulation (ACM) systems, and filter bank multicarrier (FBMC) and non-orthogonal multiple access (NOMA), which correspond to advanced connection technology, have been developed in the 5G system.

On the other hand, the Internet, which is a human centered connectivity network where humans generate and consume information, is now evolving to the Internet of things (IoT) where distributed entities, such as things, exchange and process information. The internet of everything (IoE), which is a combination of the IoT technology and big data processing technology through connection with a cloud server, has emerged. As technology elements, such as sensing technology, wired/wireless communication and network infrastructure, service interface technology, and security technology, have been demanded for IoT implementation, a sensor network for machine-to-machine (M2M) connection, M2M communication, machine type communication (MTC), and so forth have been recently researched. Such an IoT environment may provide intelligent Internet technology (IT) services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between the existing information technology (IT) and various industries.

Accordingly, various attempts have been made to apply the 5G communication system to IoT networks. For example, technologies of sensor network, M2M communication, and MTC have been implemented by techniques for beam-forming, MIMO, and array antennas, which correspond to the 5G communication technology. As the big data processing technology as described above, application of a cloud radio access network (cloud RAN) would be an example of convergence between the 5G technology and the IoT technology.

On the other hand, the frame structure of the existing LTE and LTE-A systems is designed in consideration of the typical voice/data communication, and extension is restricted to satisfy the various services and the requirements as in the 5G system. Accordingly, in the 5G system, it is necessary to flexibly define and operate the frame structure in consideration of the requirements of the various services.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an efficient scalable frame structure to integrally support various services in a wireless communication system, and to provide a method and an apparatus for transmitting and receiving a signal using the frame structure. Further, the present disclosure can provide a frame structure capable of aligning transmission symbols having the same cyclic prefix (CP) overhead in different subcarrier spacings with symbol levels. In particular, the present disclosure proposes a scalable frame structure supporting at least two different subcarrier spacings and a method and an apparatus for transmitting and receiving a signal based on the frame structure in a cellular wireless communication system using an orthogonal frequency division multiplexing (OFDM) method.

In accordance with an aspect of the present disclosure, a method of a terminal for transmitting/receiving a signal in a mobile communication system is provided. The method includes identifying a first subcarrier spacing and a second subcarrier spacing, and receiving a signal from a base station on the basis of at least one of the first subcarrier spacing and the second subcarrier spacing, wherein a first cyclic prefix (CP) pattern applied to a symbol in accordance with the first subcarrier spacing and a second CP pattern applied to a symbol in accordance with the second subcarrier spacing are determined on the basis of a predetermined CP pattern set, and wherein the symbol corresponding to the first subcarrier spacing to which the first CP pattern is applied and the symbol corresponding to the second subcarrier spacing to which the second CP pattern is applied are respectively time-aligned.

In accordance with another aspect of the present disclosure, a method for a base station for transmitting/receiving a signal in a mobile communication system is provided. The method includes identifying a first subcarrier spacing and a second subcarrier spacing, and transmitting a signal to a terminal on the basis of at least one of the first subcarrier spacing and the second subcarrier spacing, wherein a first cyclic prefix (CP) pattern applied to a symbol in accordance with the first subcarrier spacing and a second CP pattern applied to a symbol in accordance with the second subcarrier spacing are determined on the basis of a predetermined CP pattern set, and wherein the symbol corresponding to the first subcarrier spacing to which the first CP pattern is applied and the symbol corresponding to the second subcarrier spacing to which the second CP pattern is applied are respectively time-aligned.

In accordance with still another aspect of the present disclosure, a terminal in a mobile communication system is provided. The terminal includes a transceiver configured to transmit/receive a signal, and at least one processor configured to: control the transceiver, identify a first subcarrier spacing and a second subcarrier spacing, and receive a signal from a base station on the basis of at least one of the first subcarrier spacing and the second subcarrier spacing, and determine, based on a predetermined cyclic prefix (CP) pattern set, a first CP pattern applied to a symbol based on the first subcarrier spacing and a second CP pattern applied to a symbol based on the second subcarrier spacing, and wherein the symbol corresponding to the first subcarrier spacing to which the first CP pattern is applied and the symbol corresponding to the second subcarrier spacing to which the second CP pattern is applied are respectively time-aligned.

In accordance with yet still another aspect of the present disclosure, a base station in a mobile communication system is provided. The base station includes a transceiver configured to transmit/receive a signal, and at least one processor configured to: control the transceiver, identify a first subcarrier spacing and a second subcarrier spacing, and transmit a signal to a terminal on the basis of at least one of the first subcarrier spacing and the second subcarrier spacing, and determine, based on a predetermined cyclic prefix (CP) pattern set, a first CP pattern applied to a symbol based on the first subcarrier spacing and a second CP pattern applied to a symbol based on the second subcarrier spacing, and wherein the symbol corresponding to the first subcarrier spacing to which the first CP pattern is applied and the symbol corresponding to the second subcarrier spacing to which the second CP pattern is applied are respectively time-aligned.

According to the aspects of the present disclosure, since an efficient scalable frame structure is defined to integrally support various services in a cellular wireless communication system and a method and an apparatus for transmitting and receiving a signal, to which the corresponding frame structure is applied, are provided, the system performance can be improved through minimization of inter-symbol interference. Further, since various or the same cell coverage can be supported for each subcarrier spacing, various cell deployment scenarios can be supported in accordance with an operator's demand.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Figure 4:
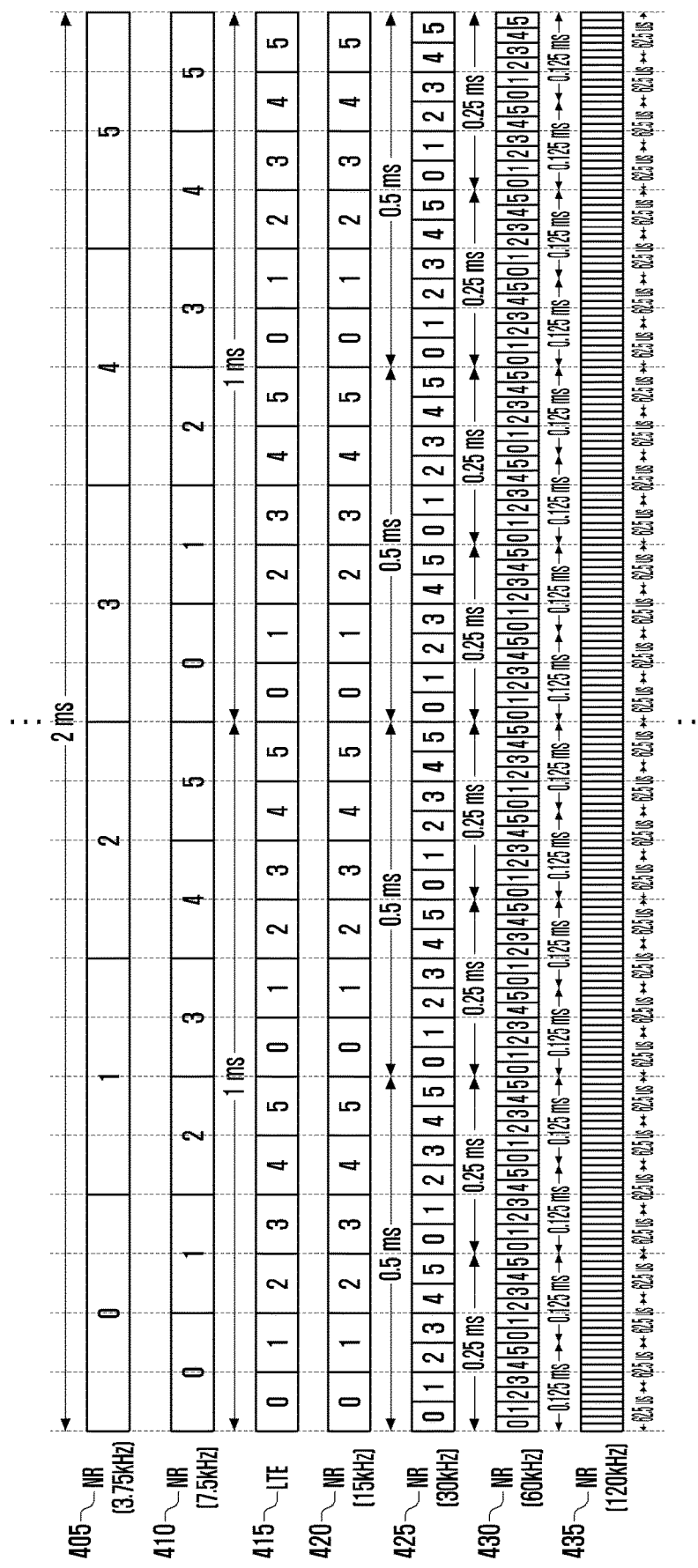
FIG. 4 is a diagram illustrating an example of a frame structure that satisfies an extended CP length based symbol/slot/subframe alignment having a CP ratio of 1/4 with respect to certain $2^m$ reference subcarrier spacings on the basis of 15 kHz according to an embodiment of the present disclosure.
Figure 6A:
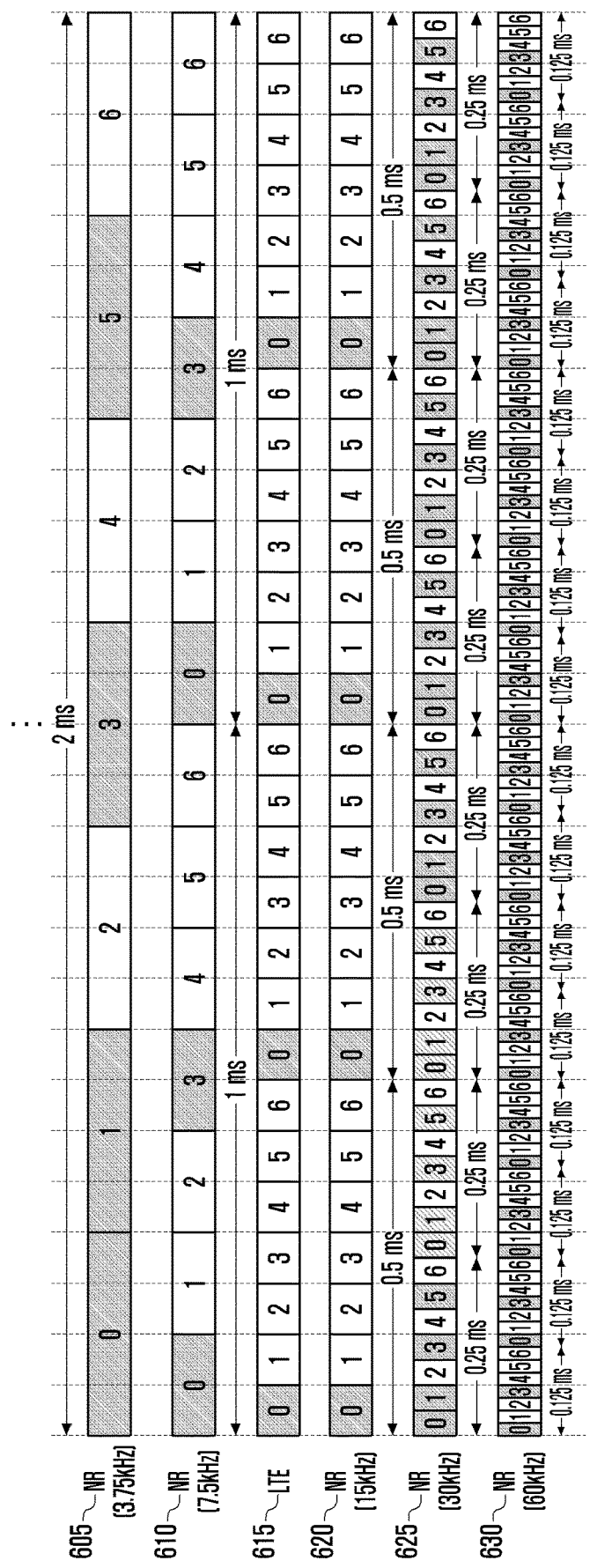
FIG. 6A is a diagram illustrating an example of a frame structure that satisfies a normal CP length based symbol/slot/subframe alignment having a CP ratio of 1/14 with respect to 3.75 kHz, 7.5 kHz, 30 kHz, and 60 kHz while maintaining a CP pattern of LTE as it is on the basis of 15 kHz with the purpose of a sub-6 GHz band of T_s according to an embodiment of the present disclosure.
Figure 6B:
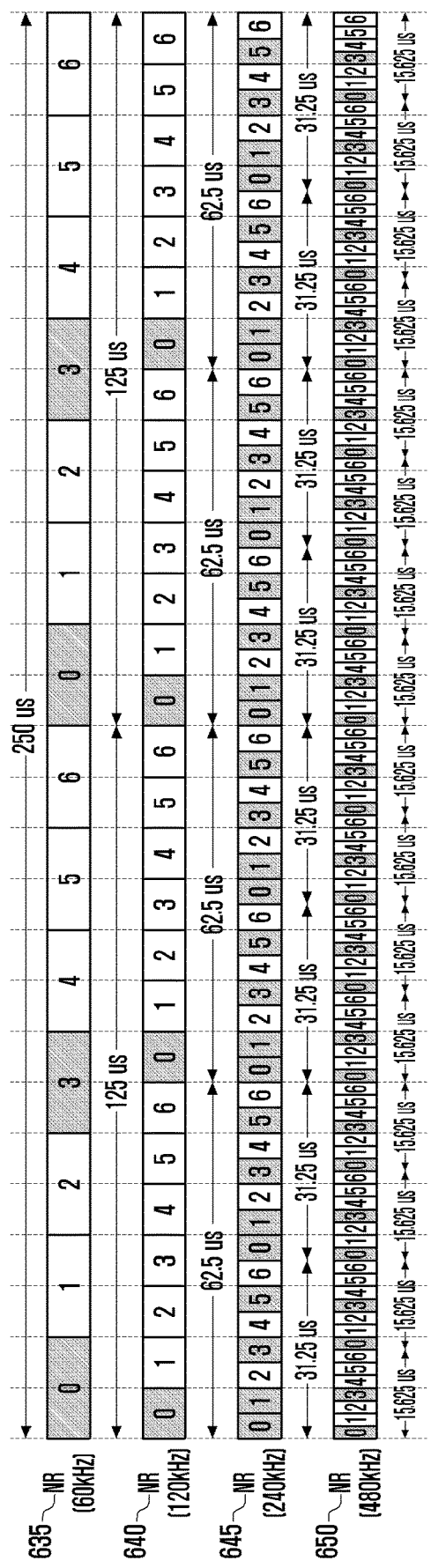
Figure 7:
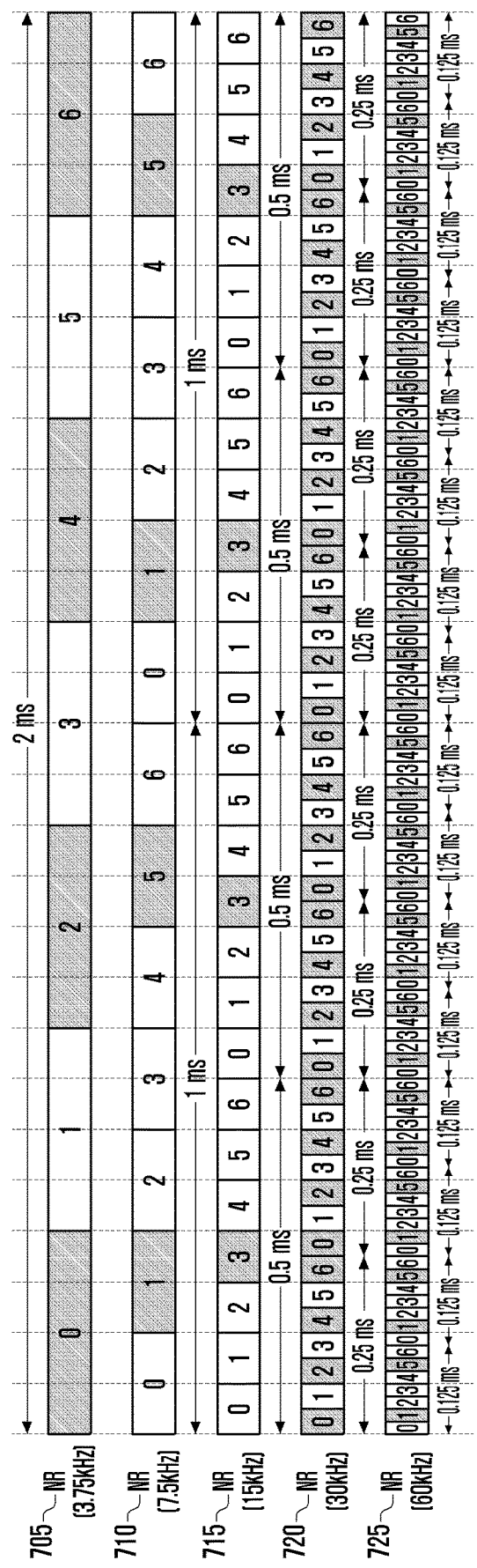
Figure 8:
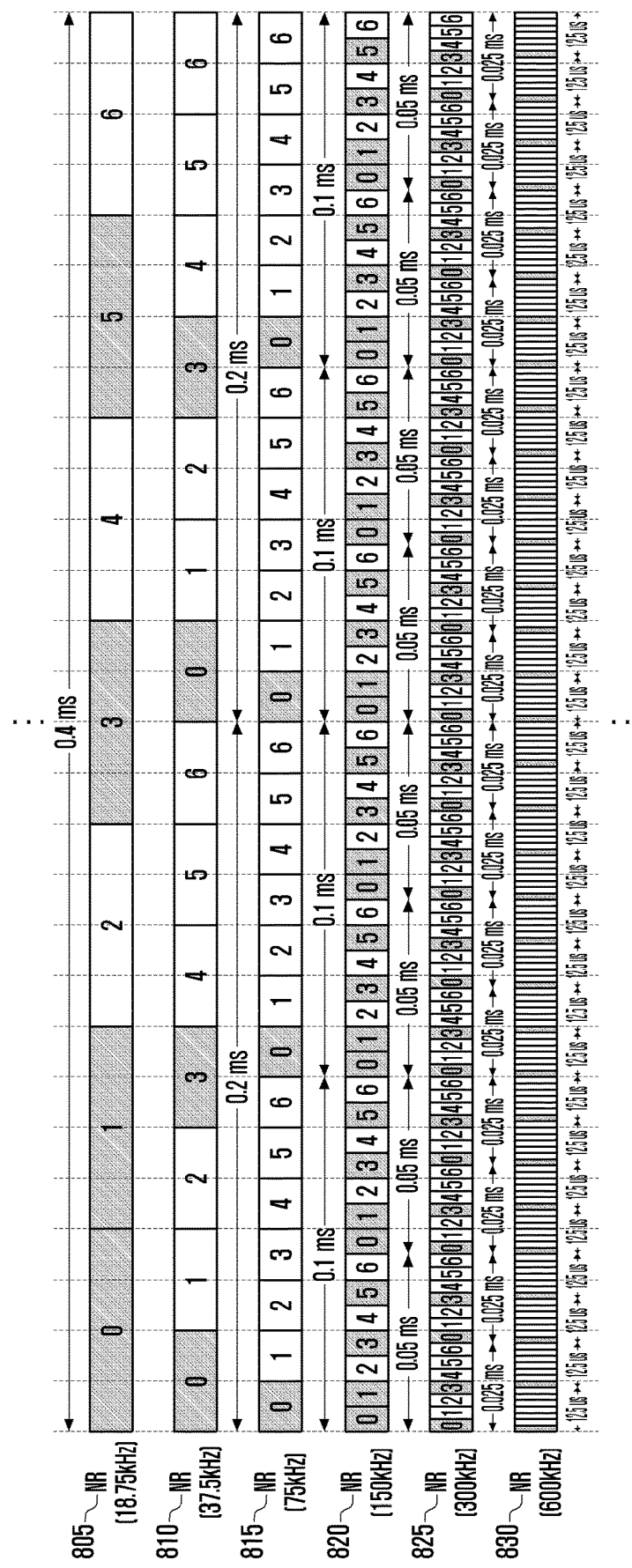
Figure 9:
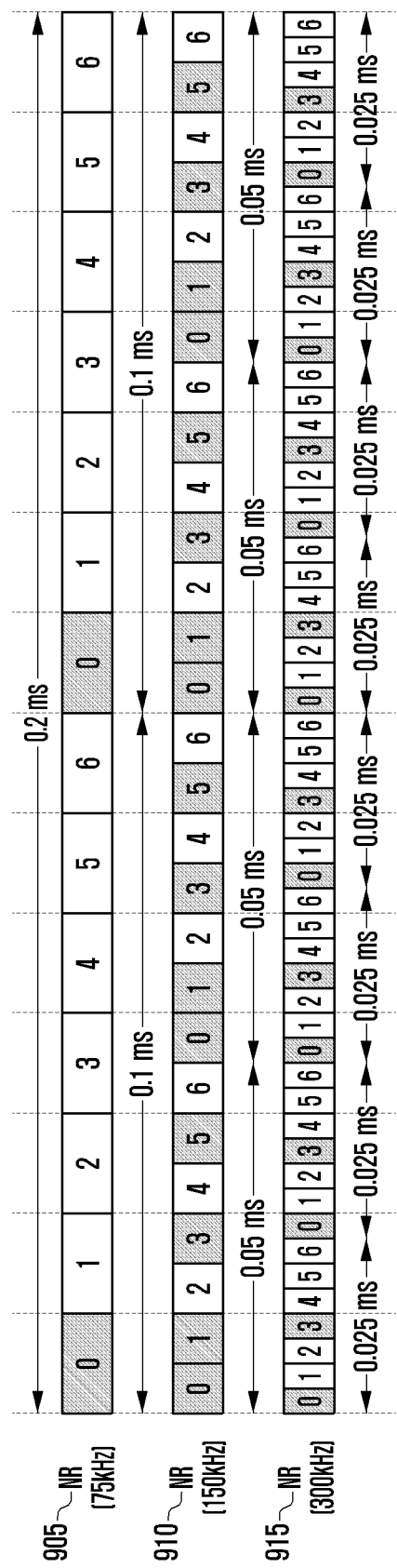
Figure 10:
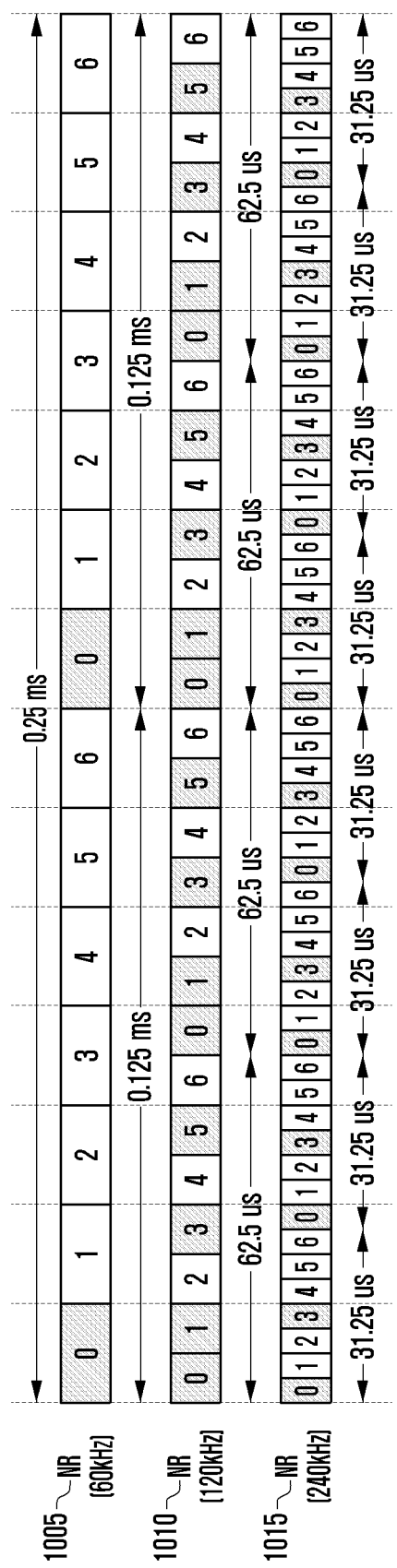
Figure 11:
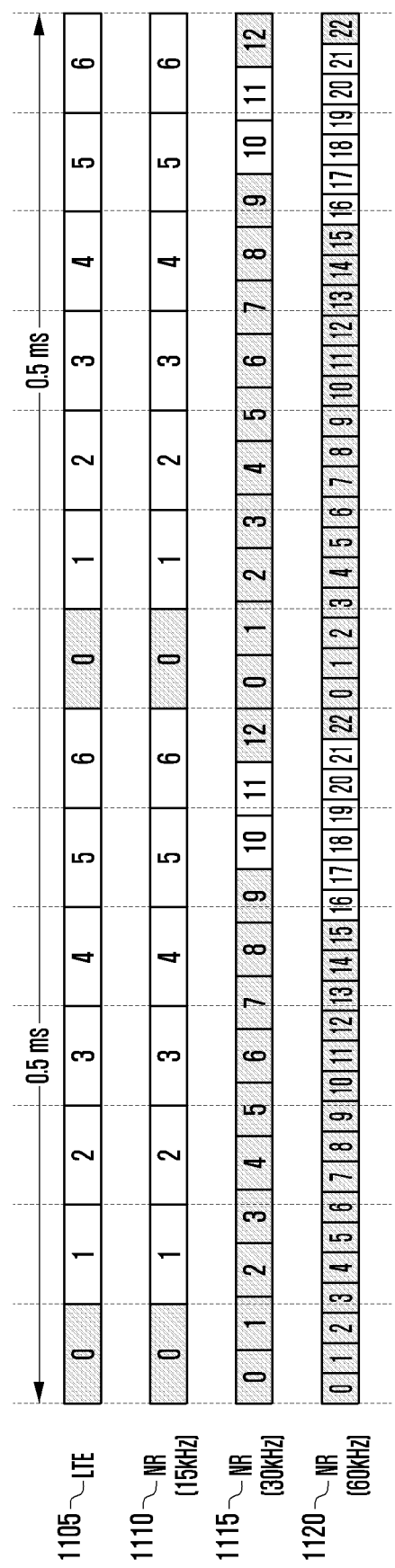
Figure 12:
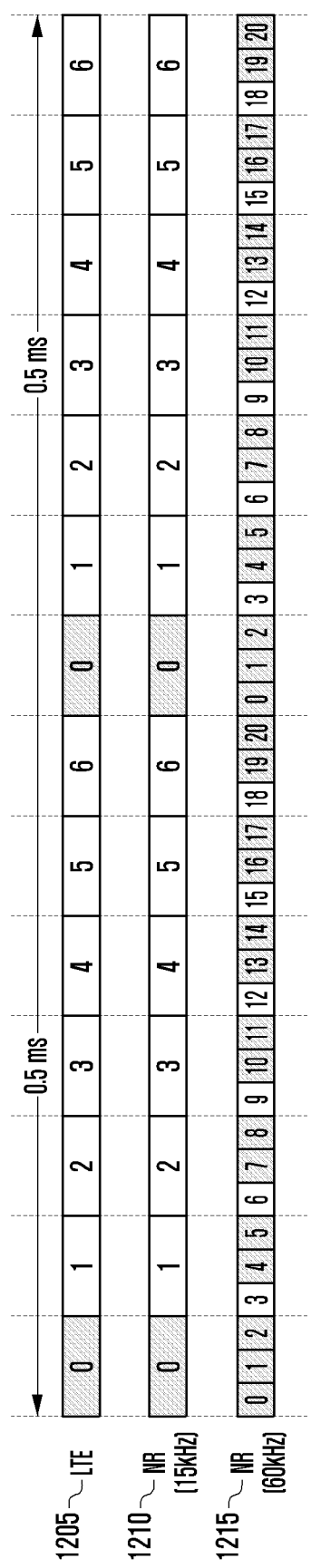
Figure 13A:
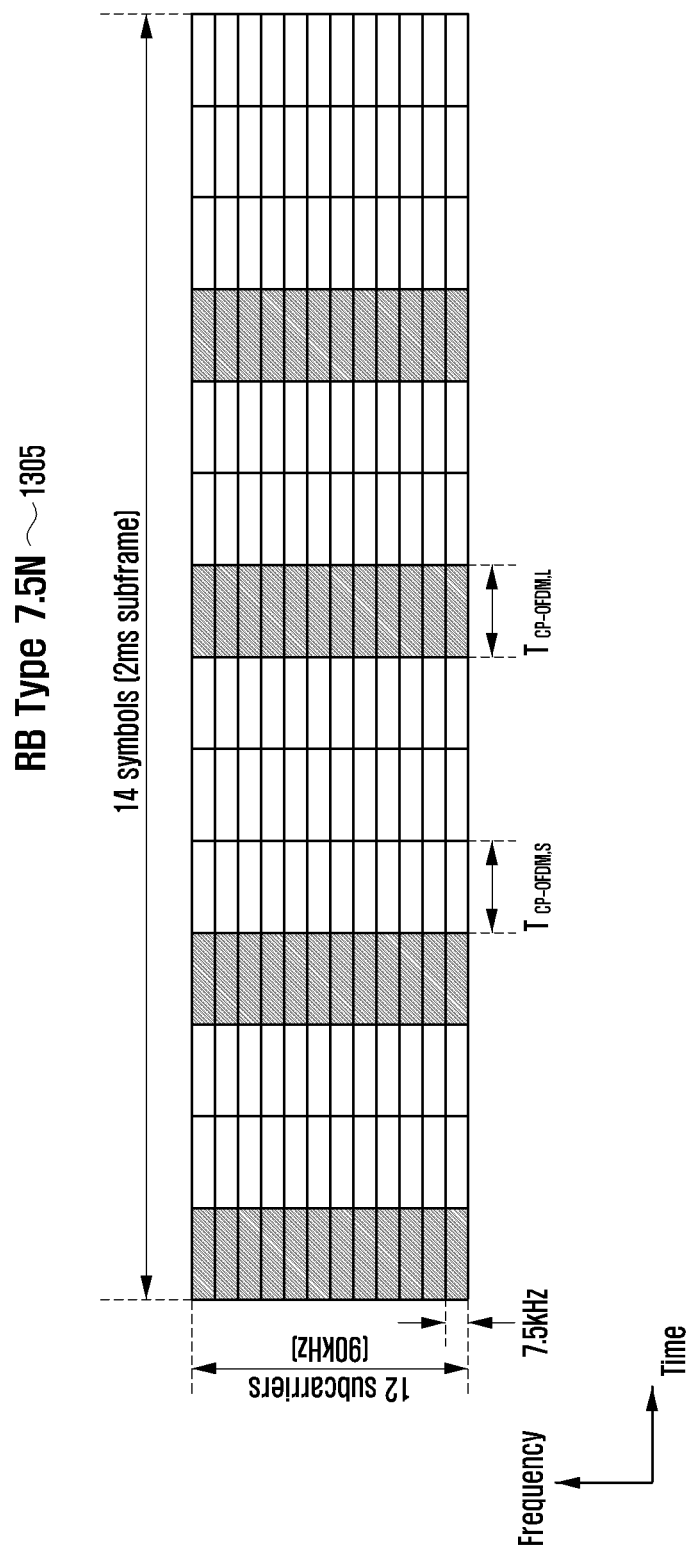
Figure 13B:
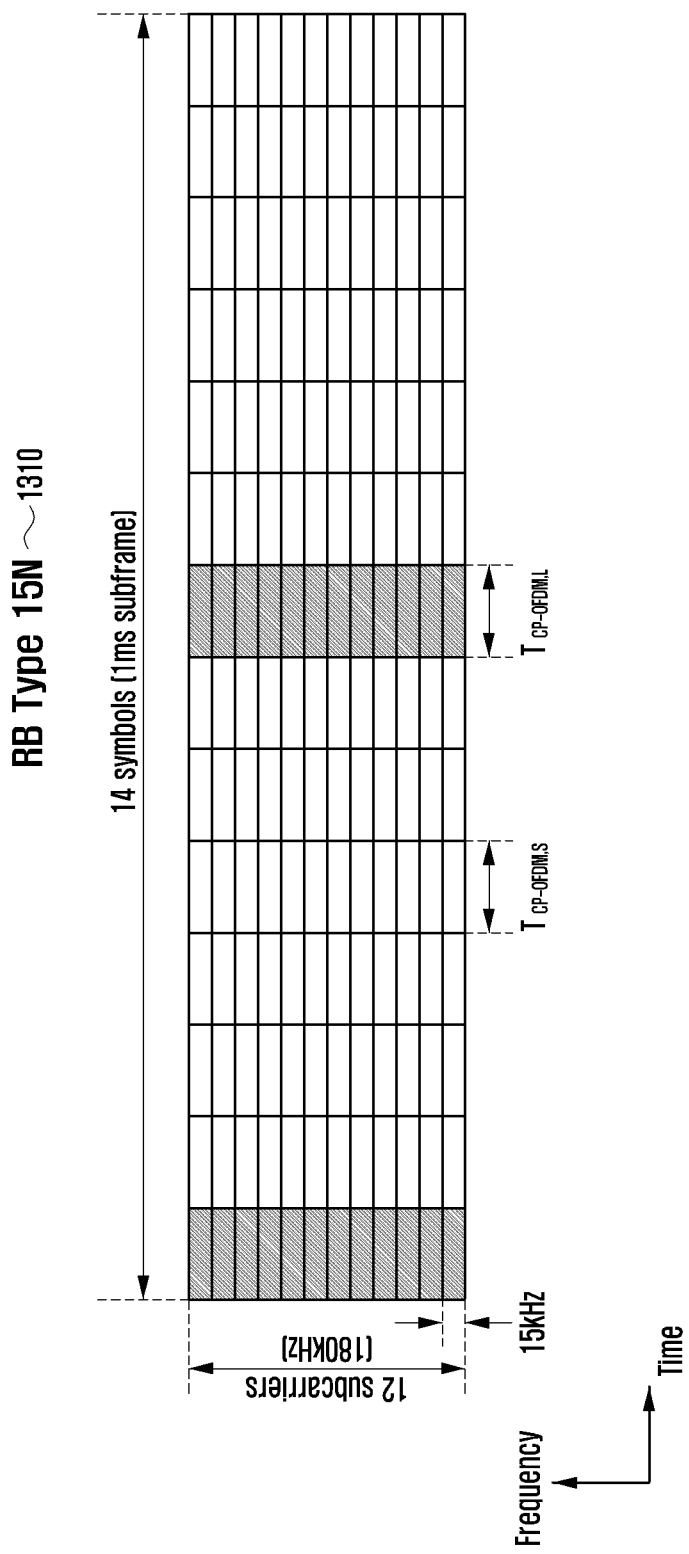
Figure 13C:
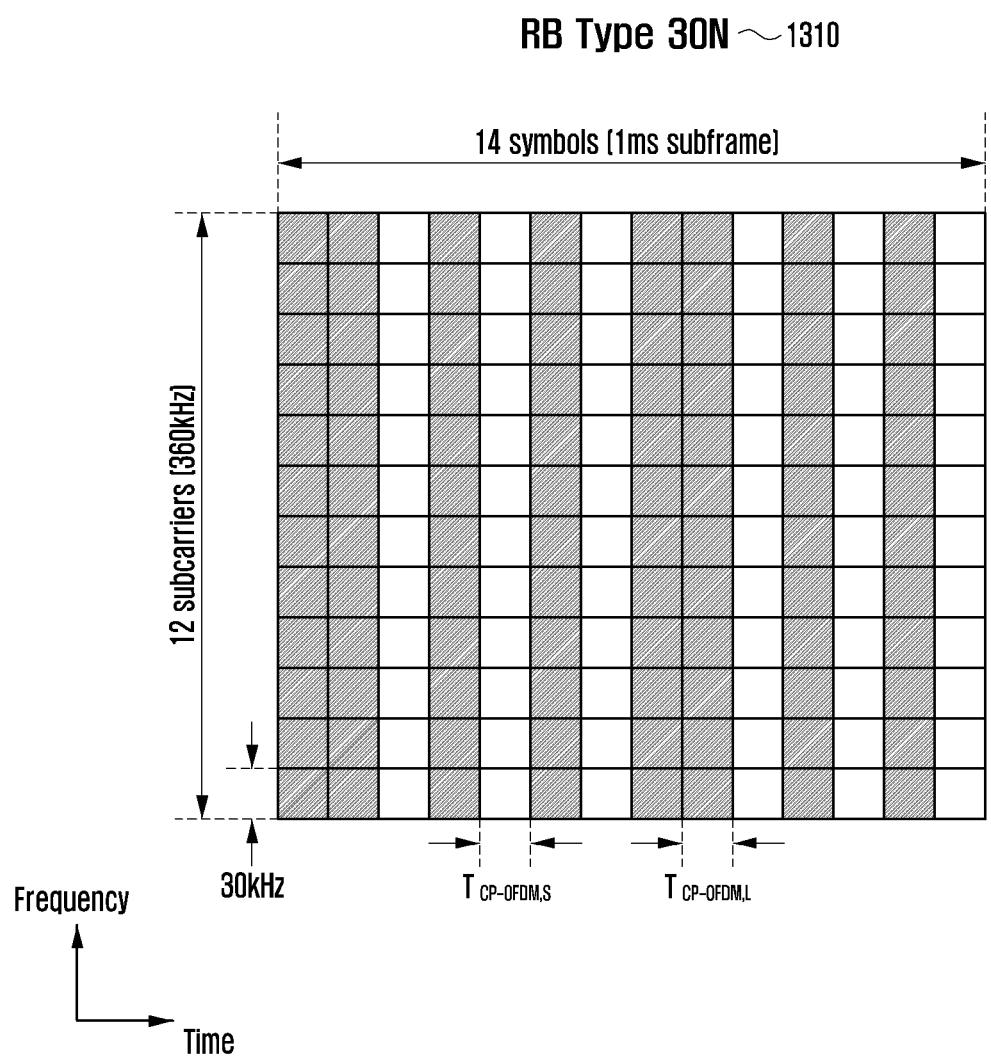
Figure 13D:
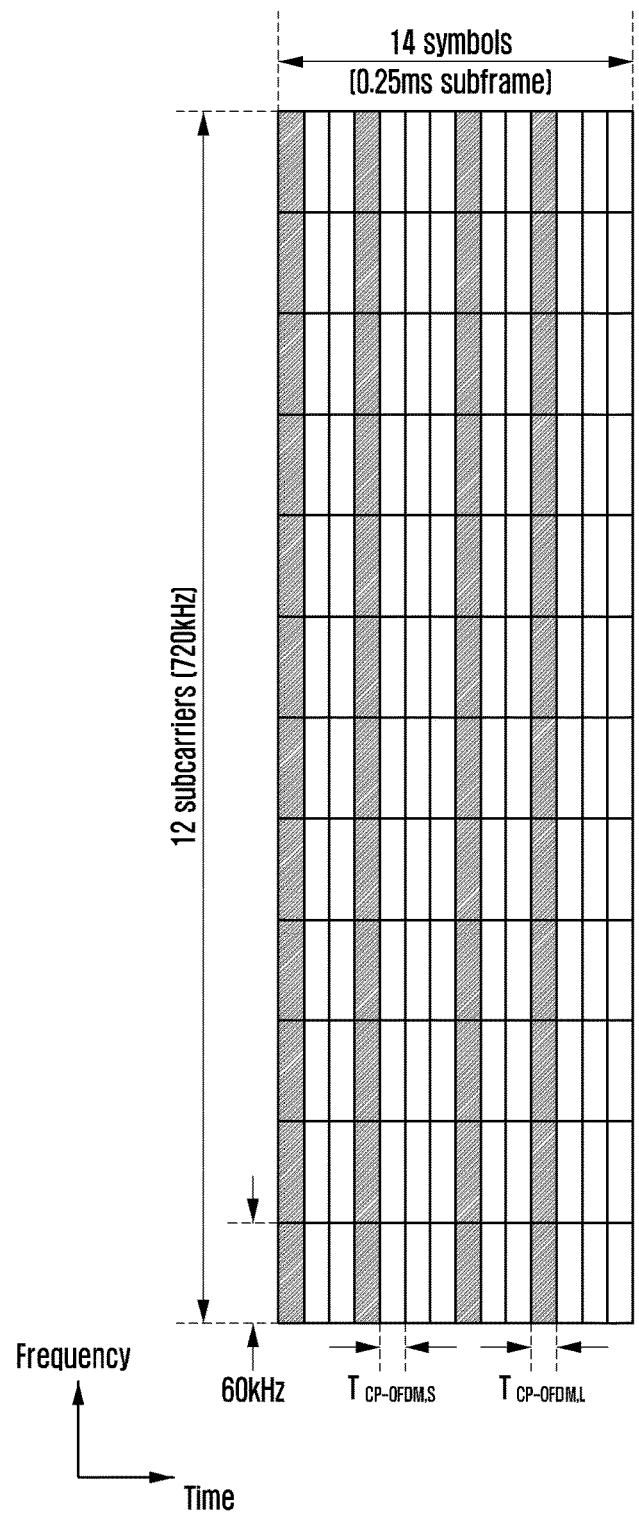
Figure 14A:
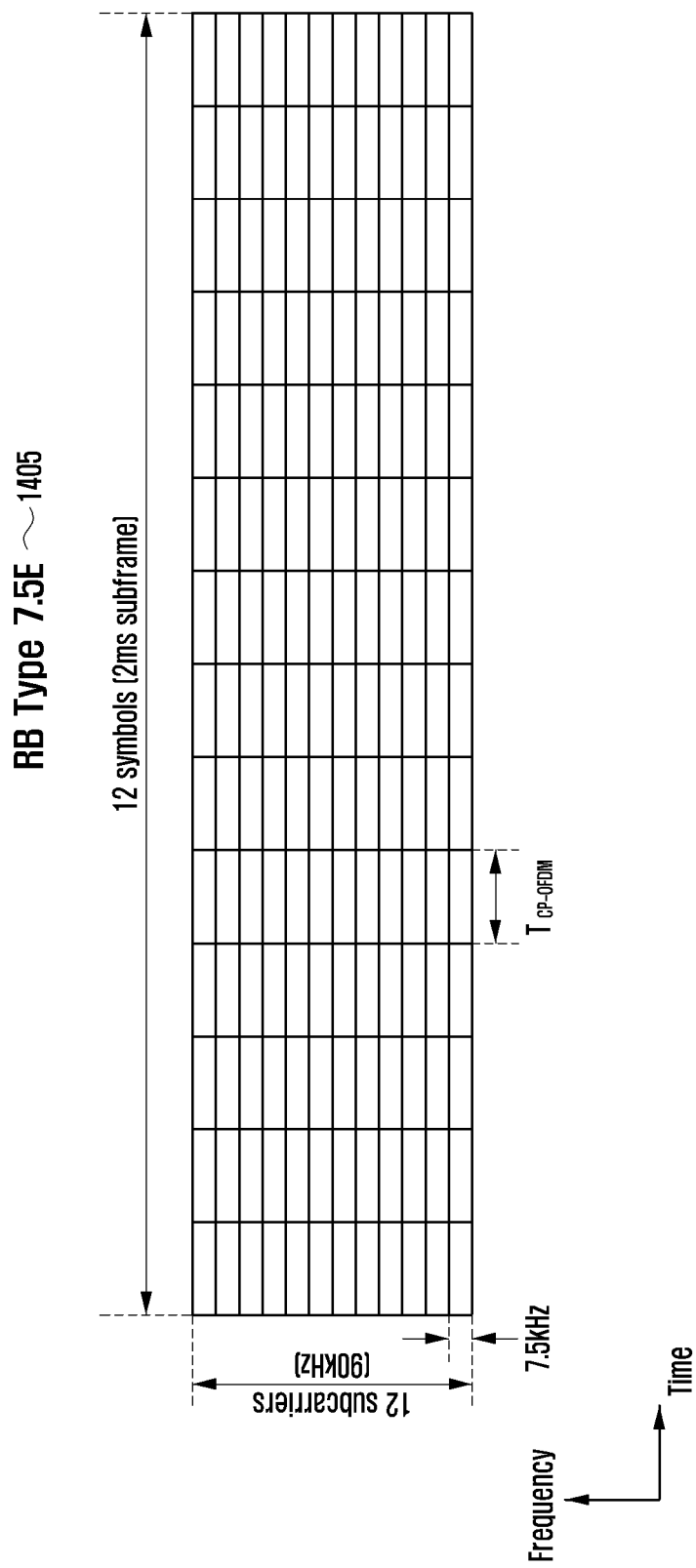
Figure 14B:
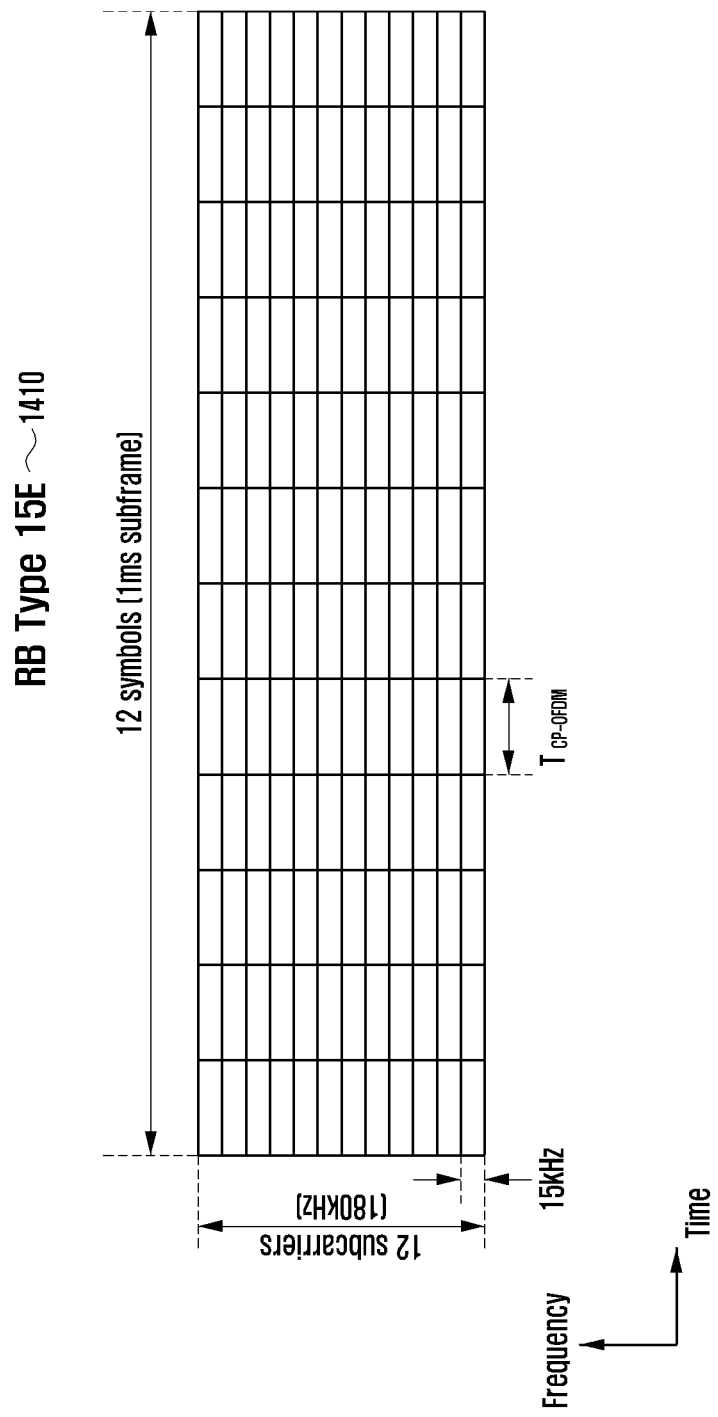
Figure 14C:
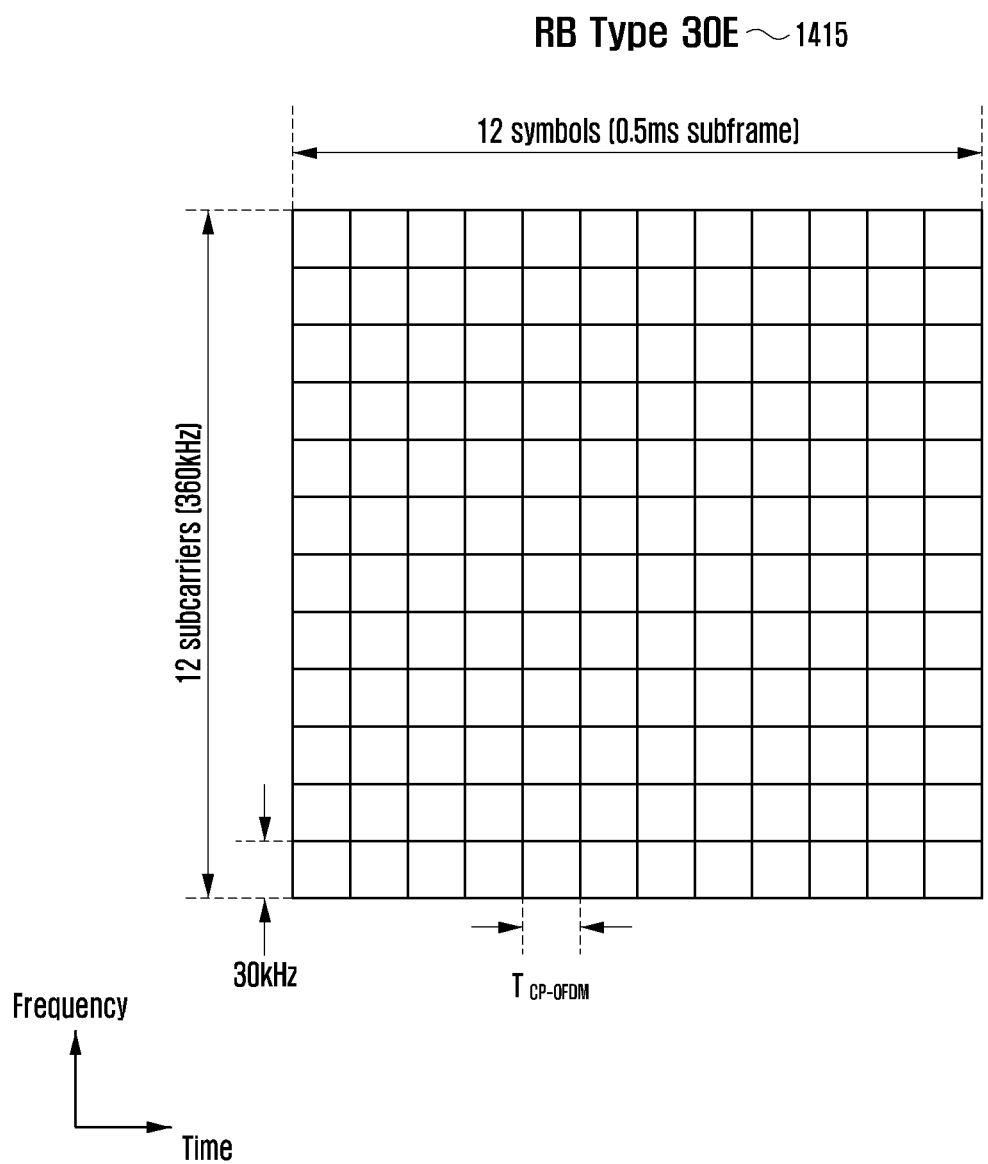
Figure 14D:
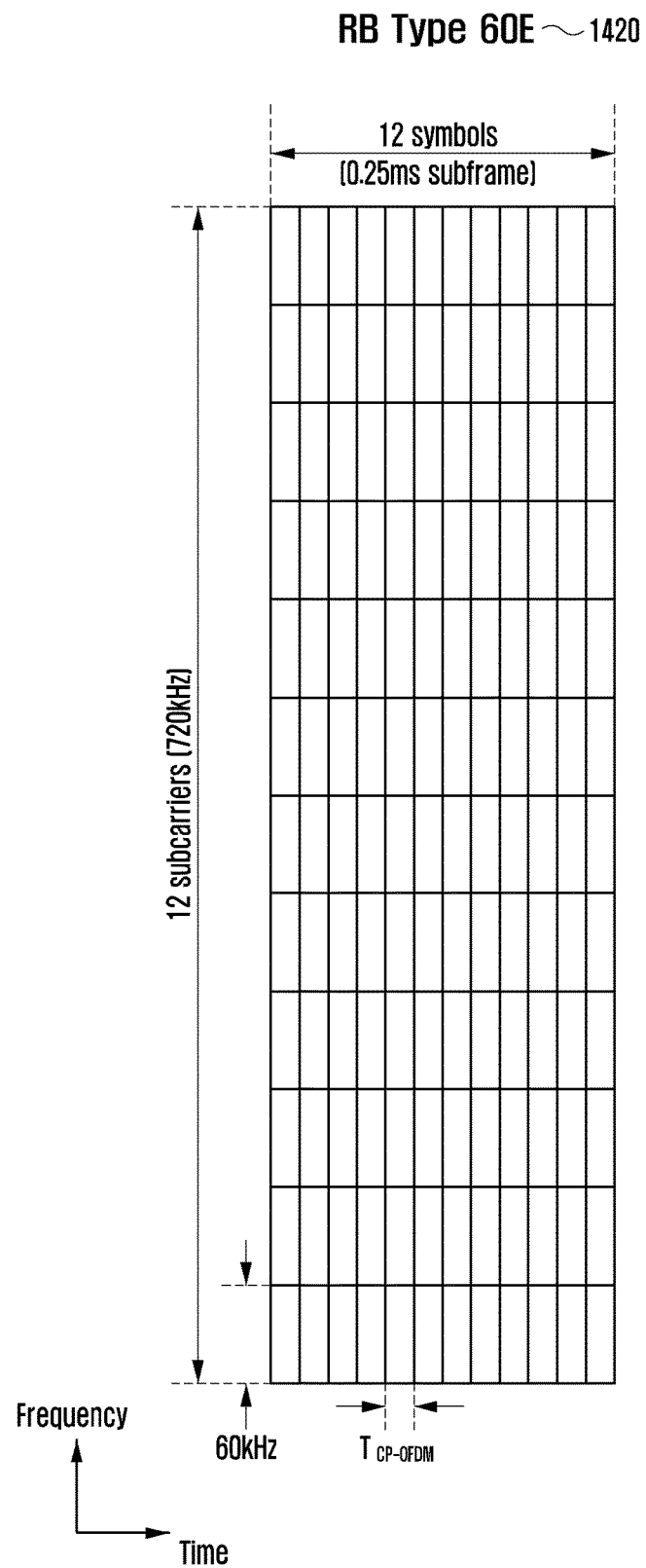
Figure 15A:
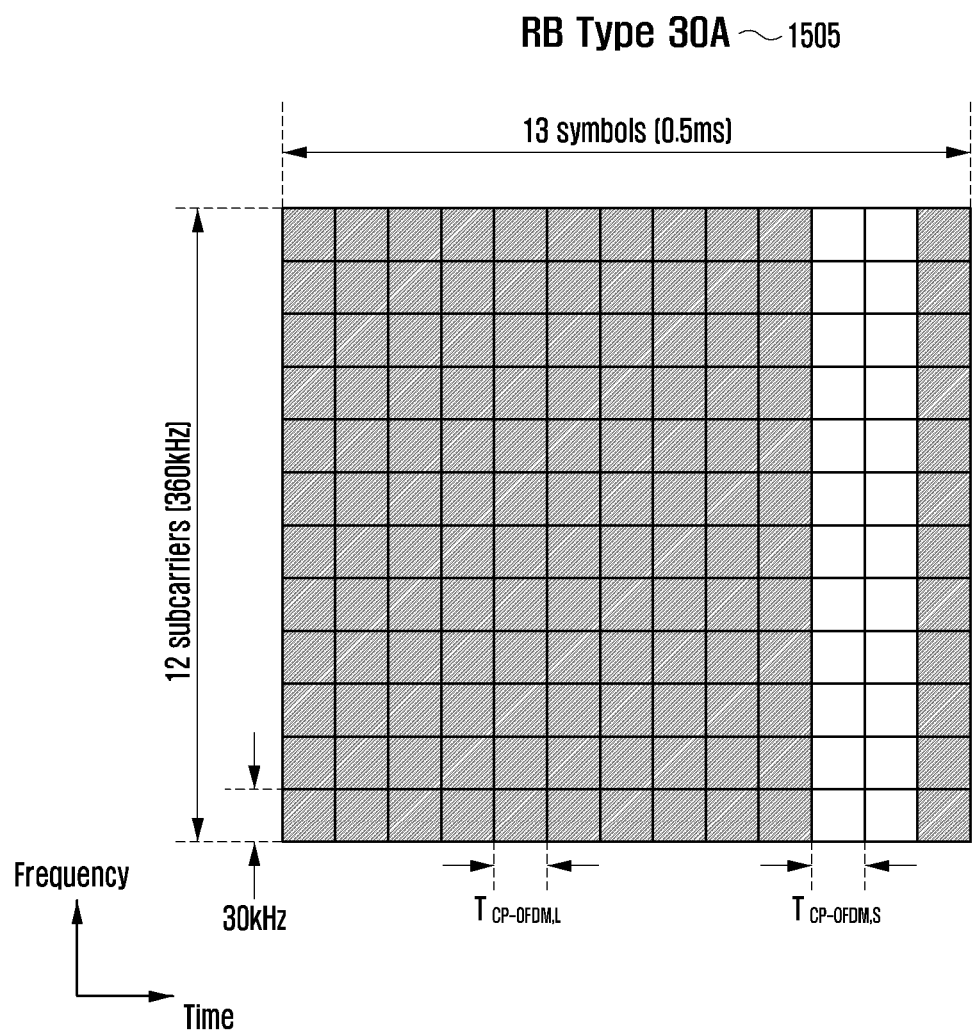
Figure 15B:
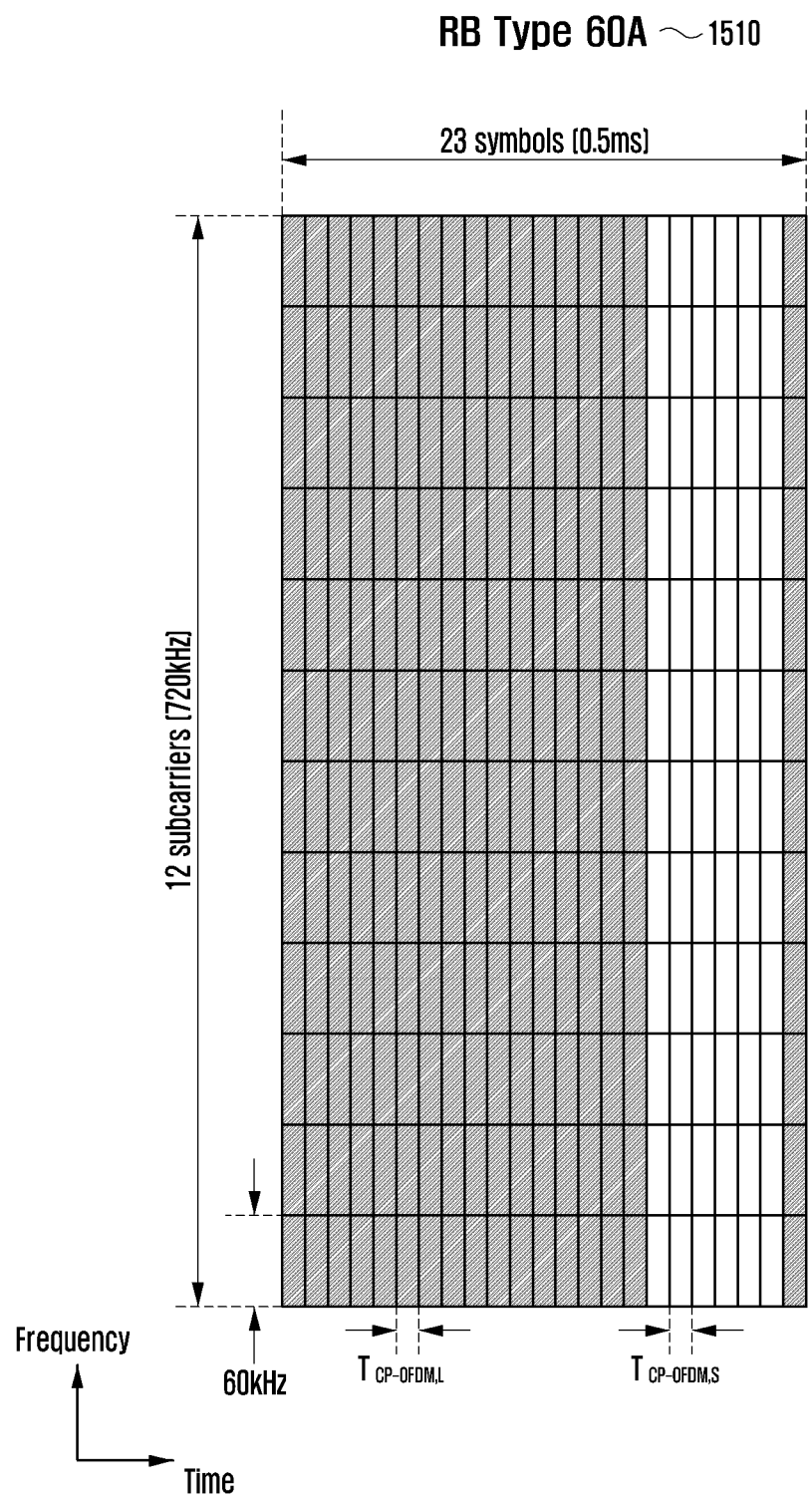
Figure 16:
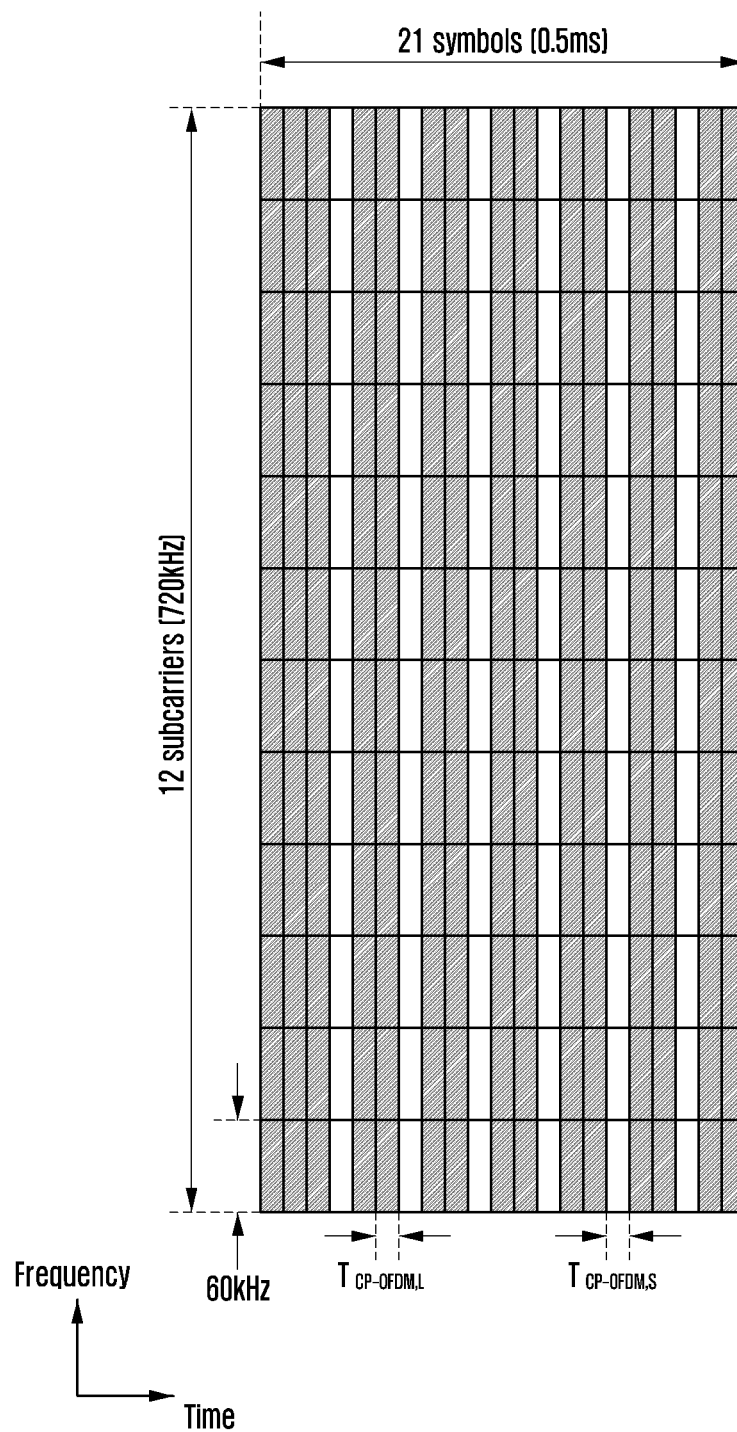
Figure 17A:
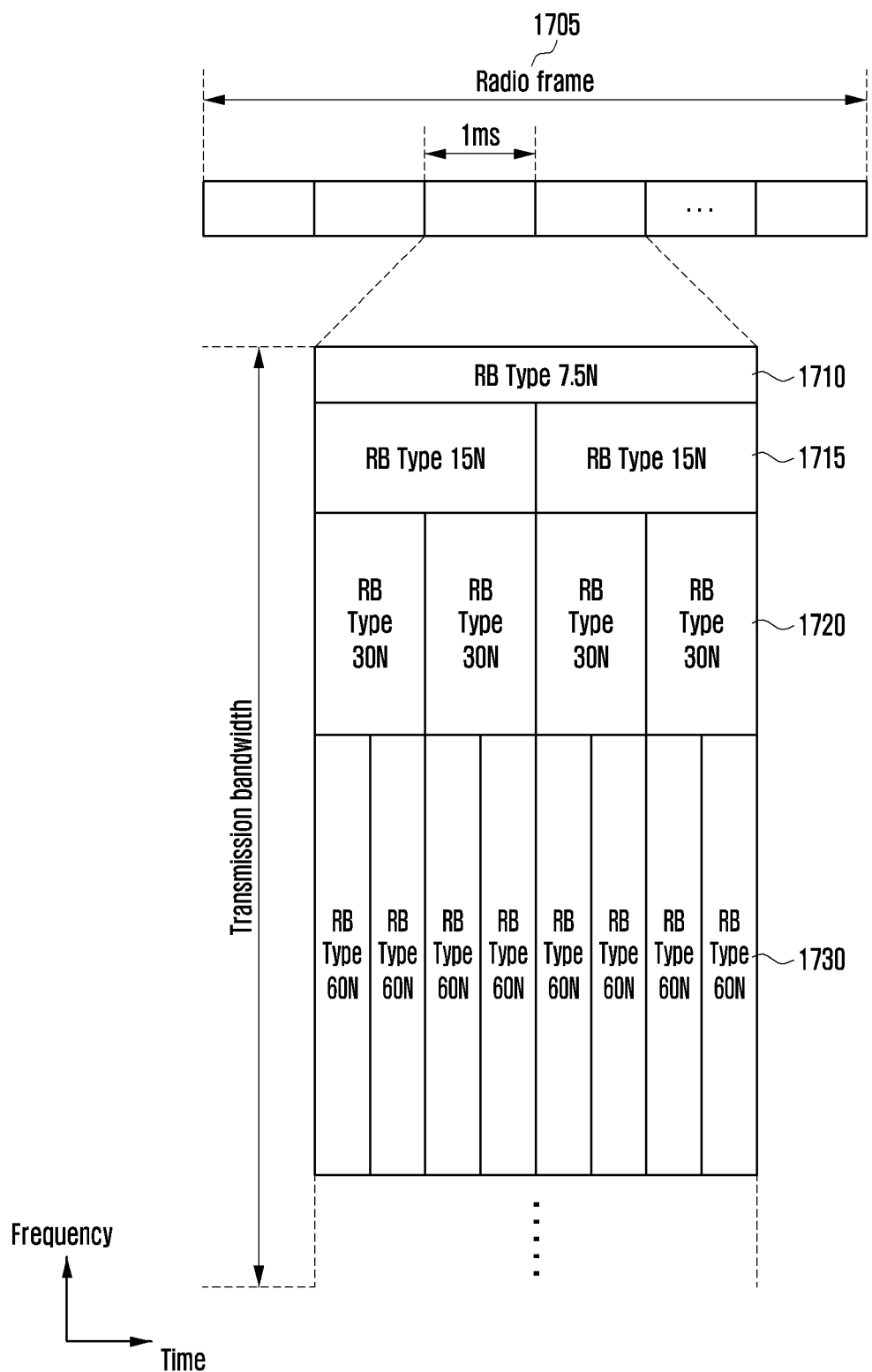
Figure 17B:
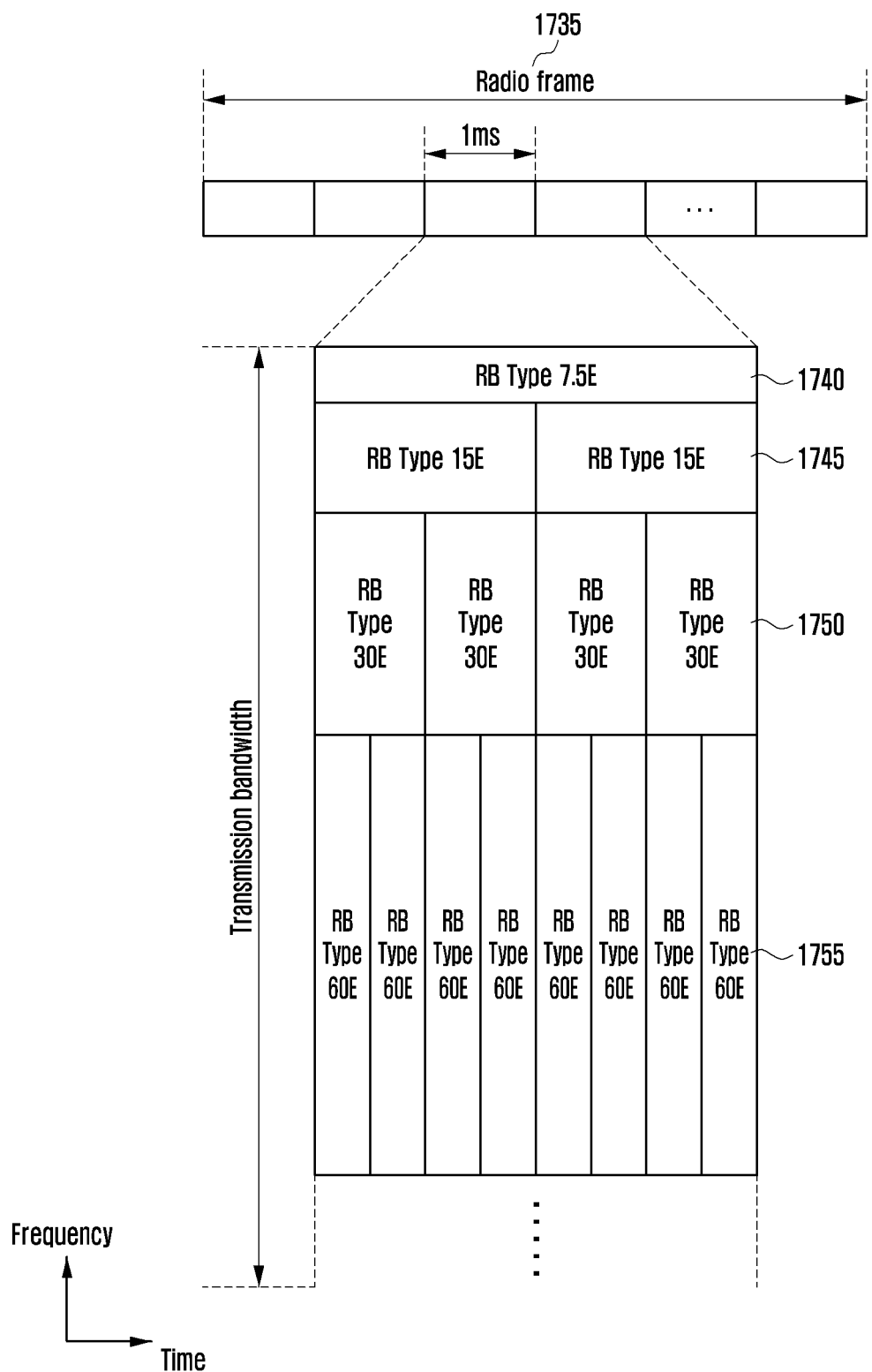
Figure 18:
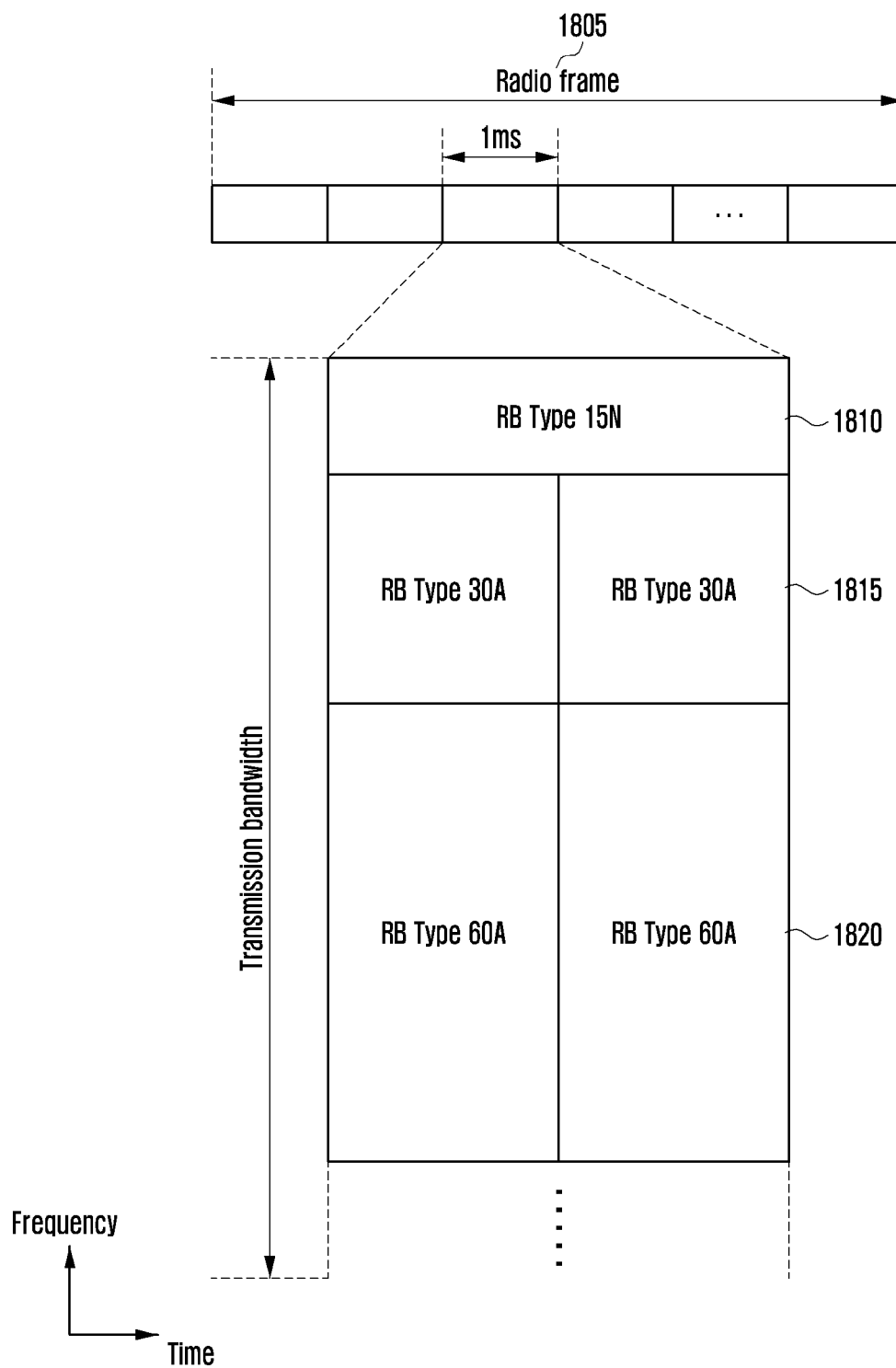
Figure 19:
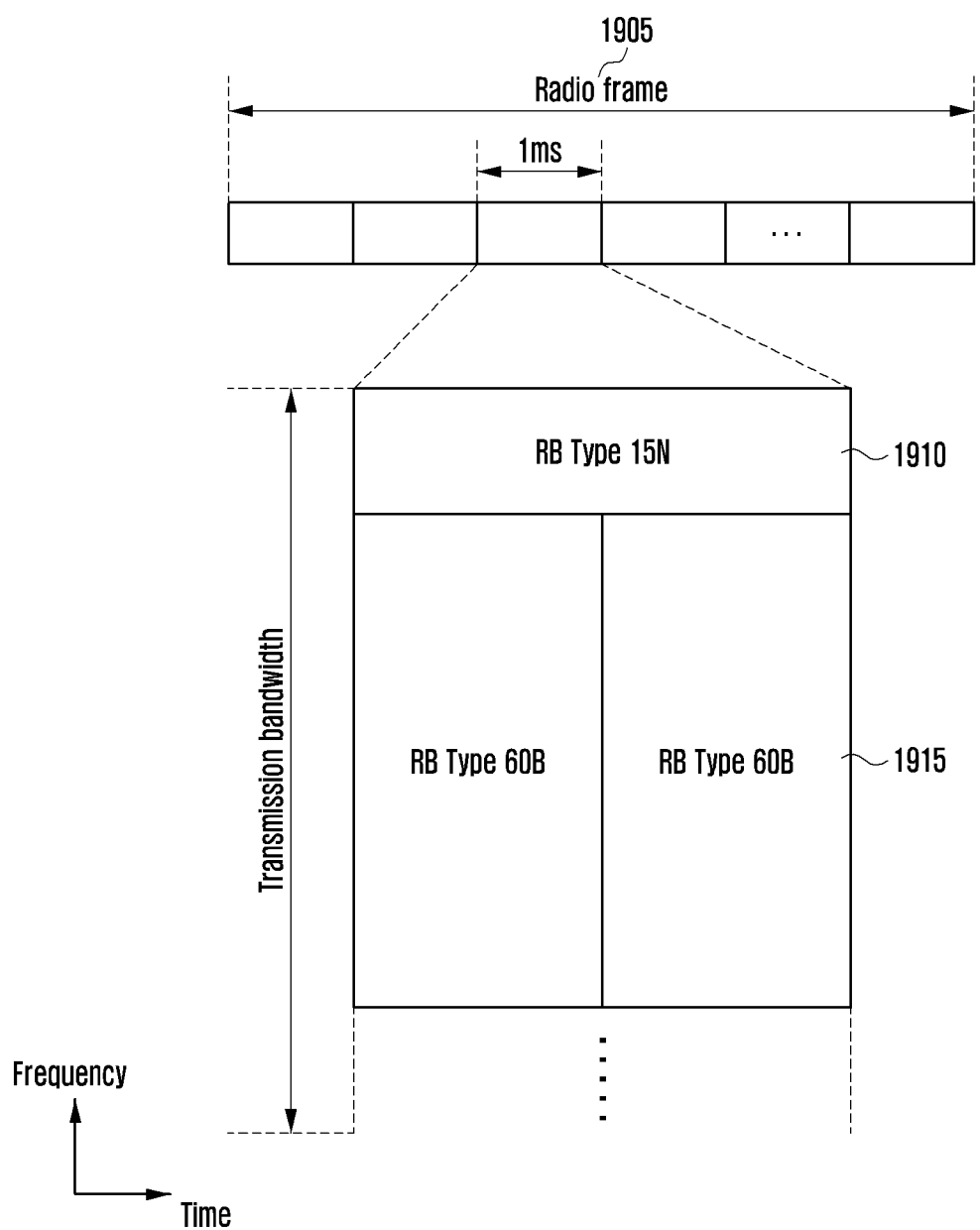
Figure 20A:
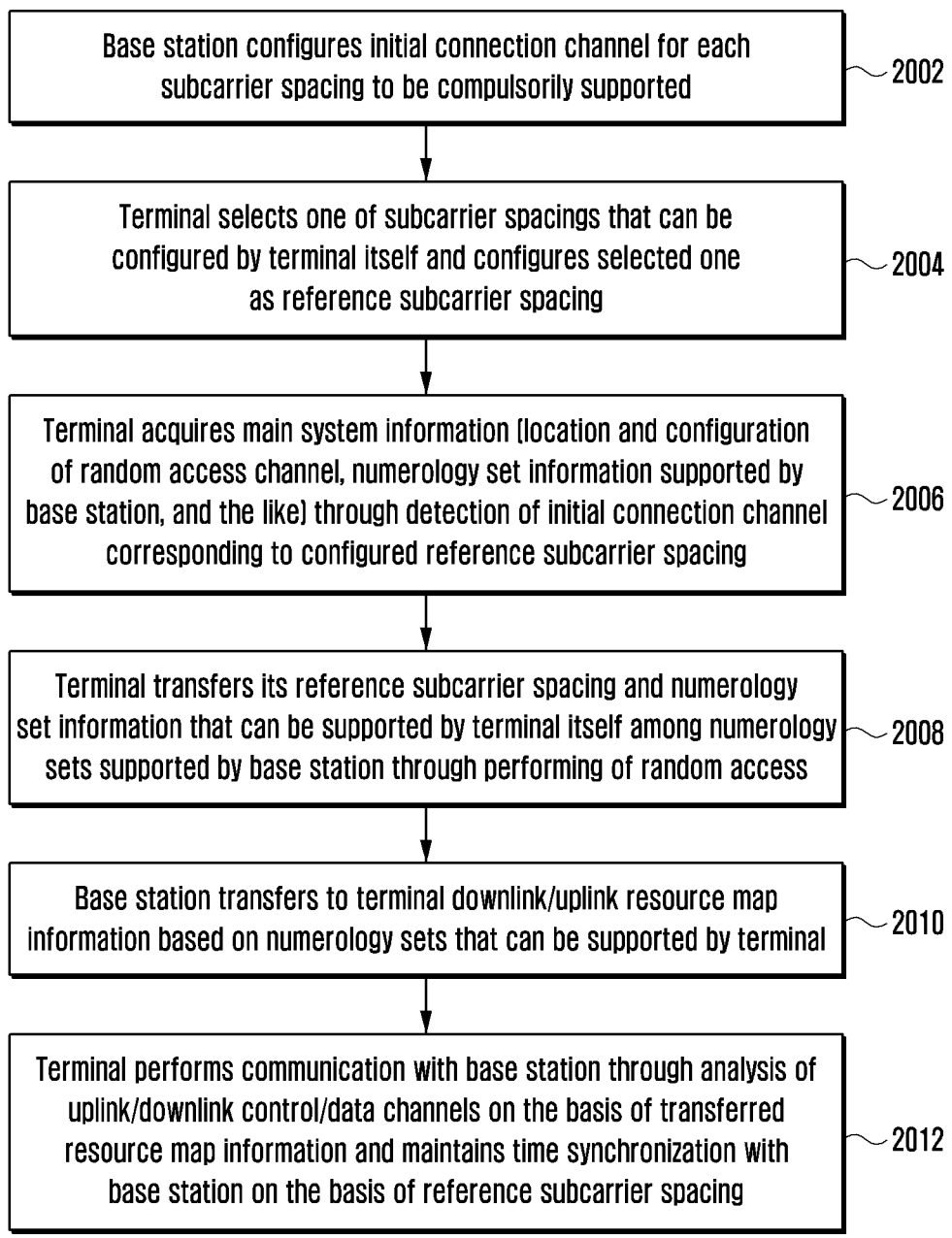
Figure 20B:
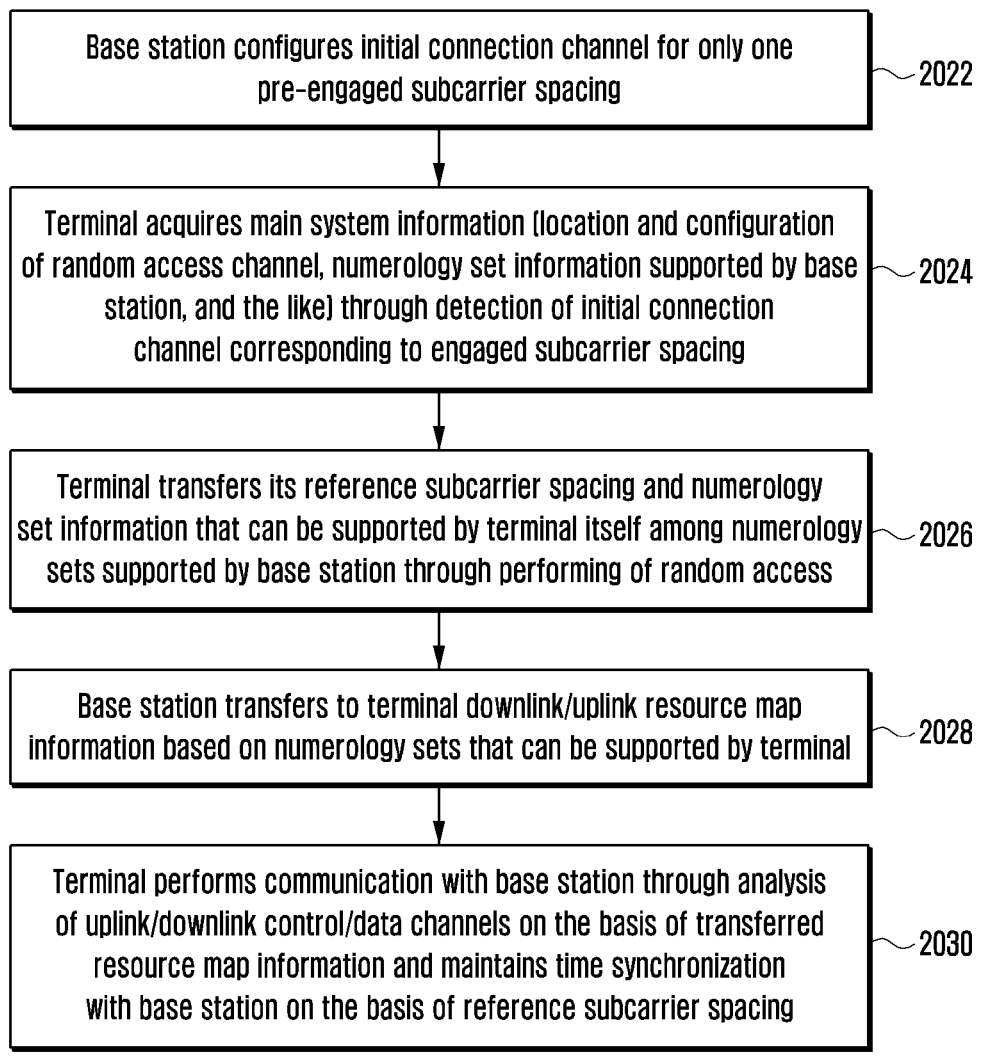
Figure 20C:
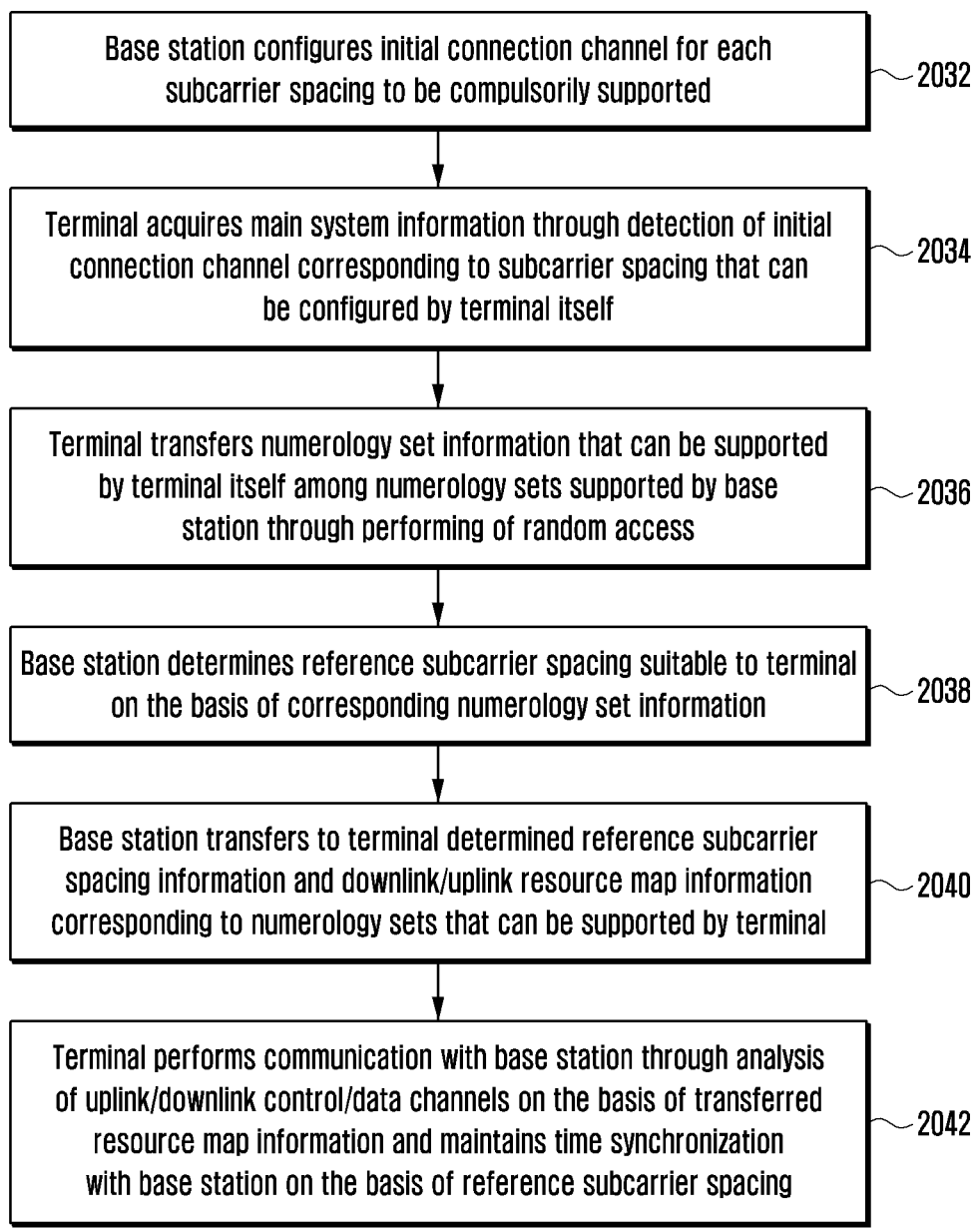
Figure 20D:
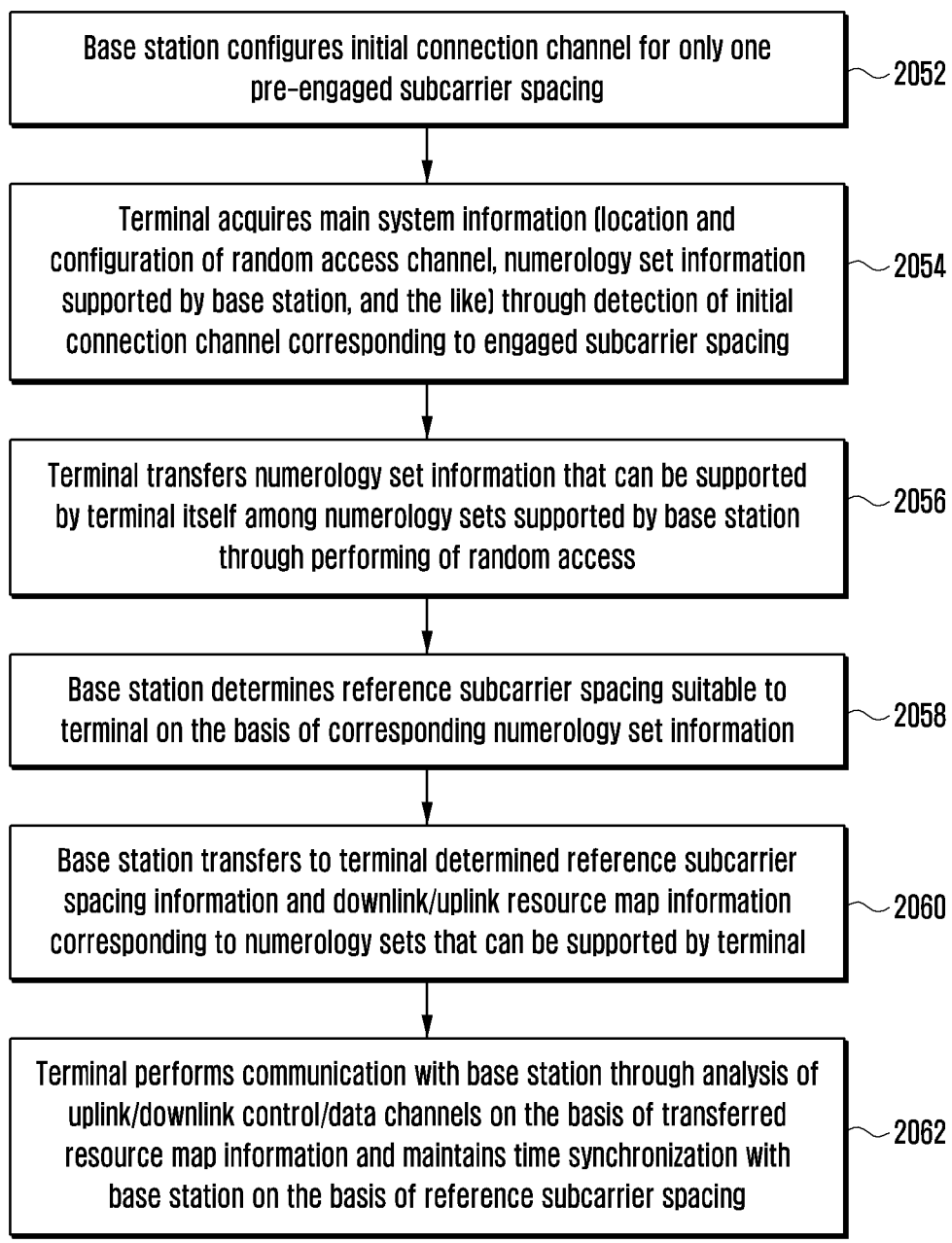
Figure 20E:
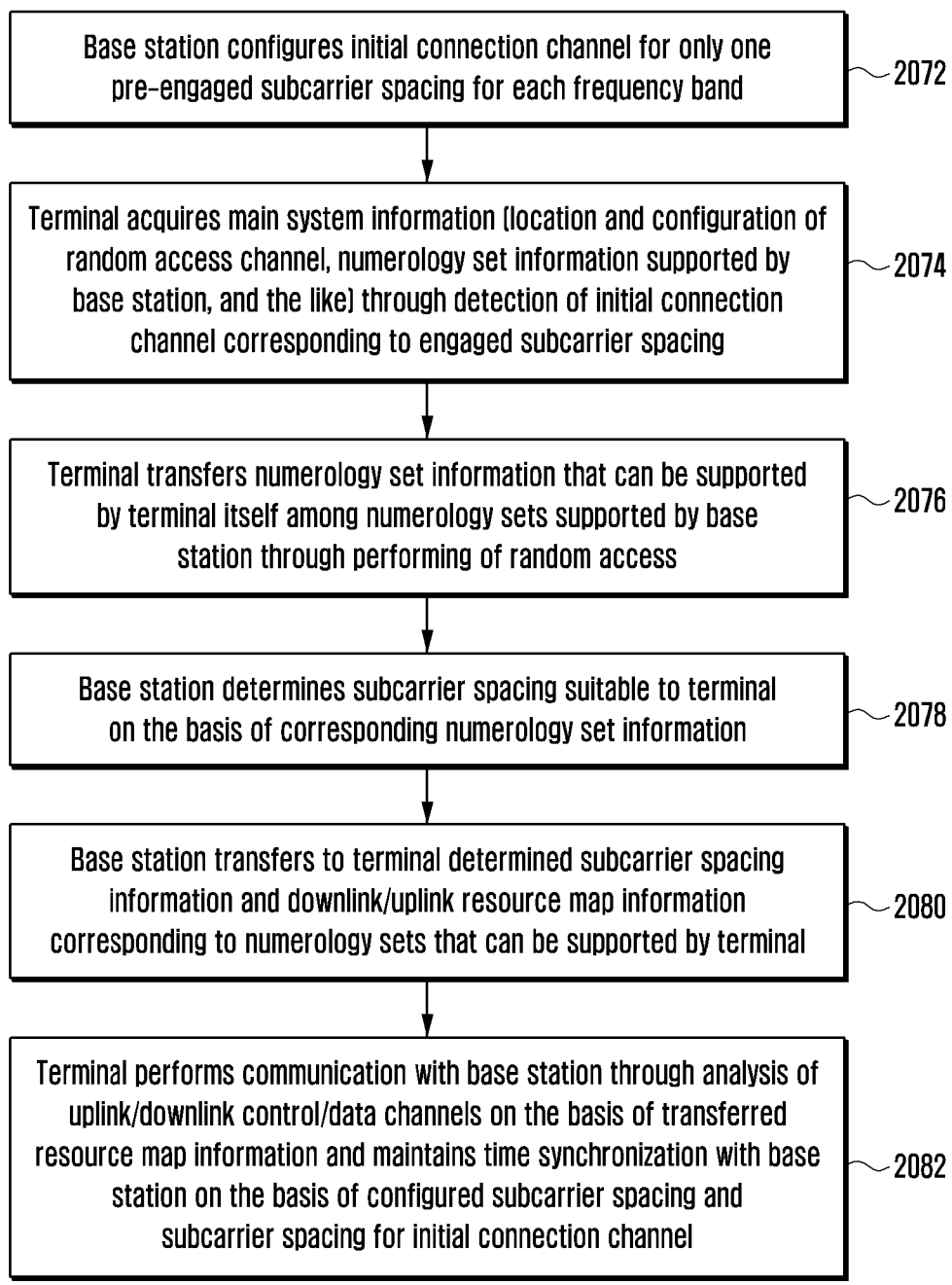
Figure 21:
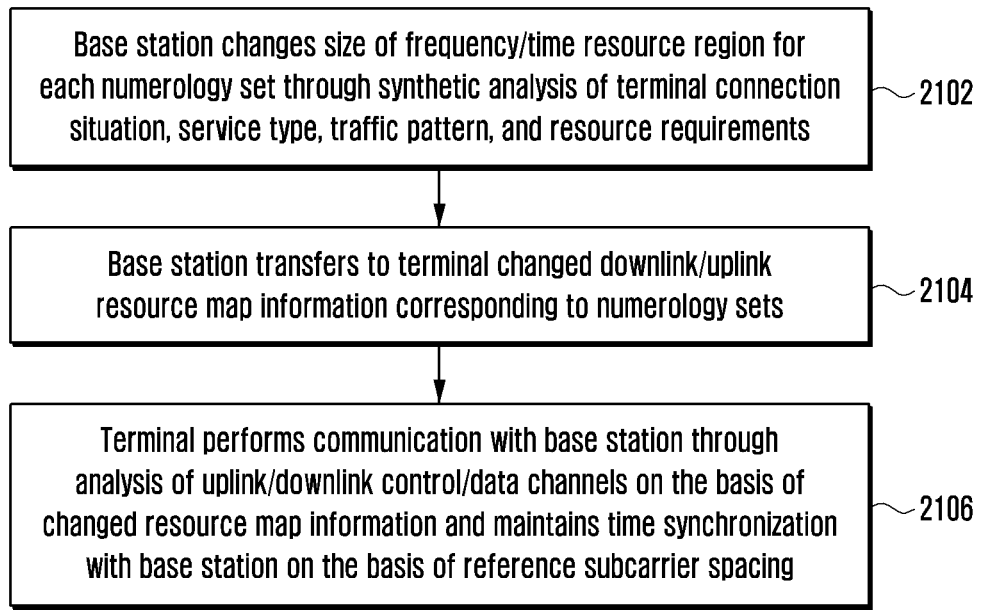
Figure 22A:
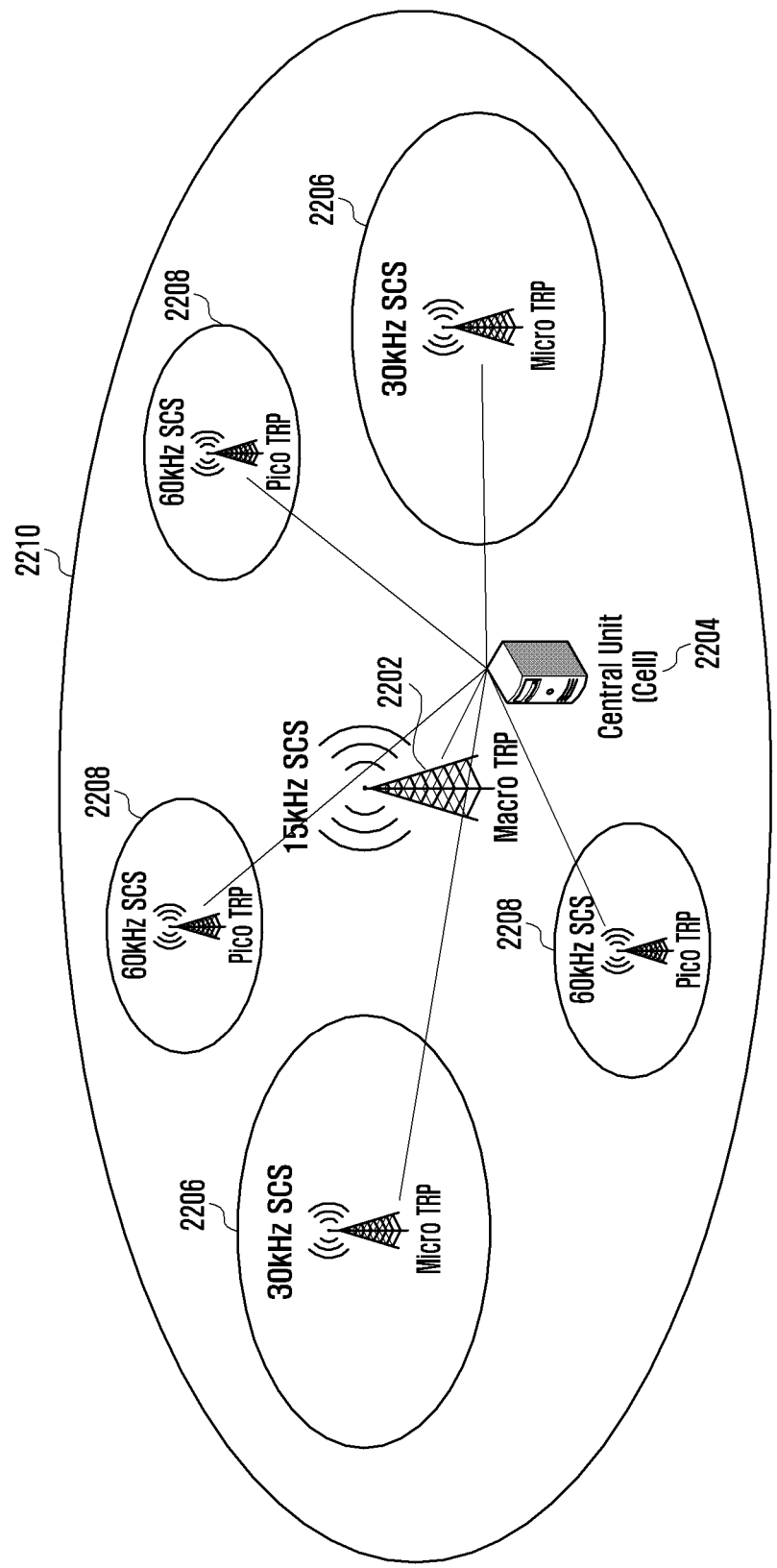
Figure 22B:
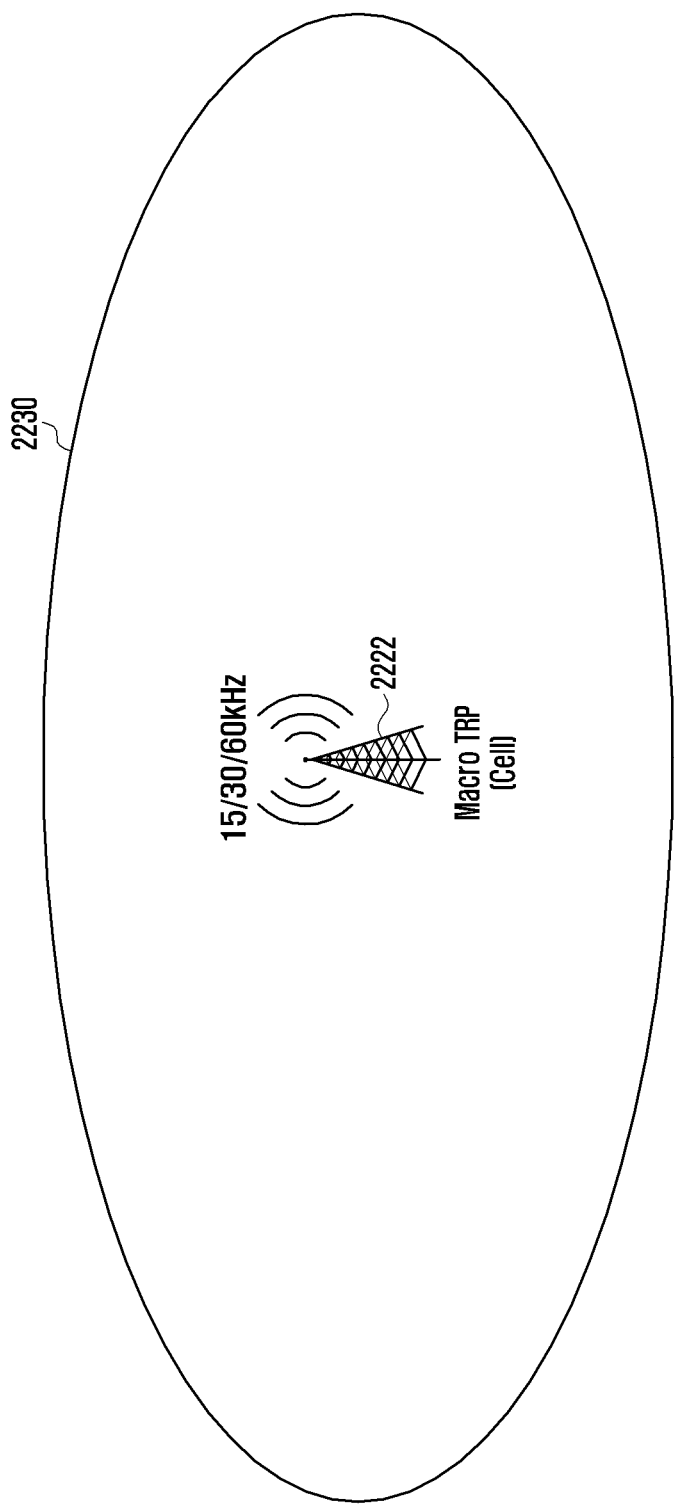
Figure 23:
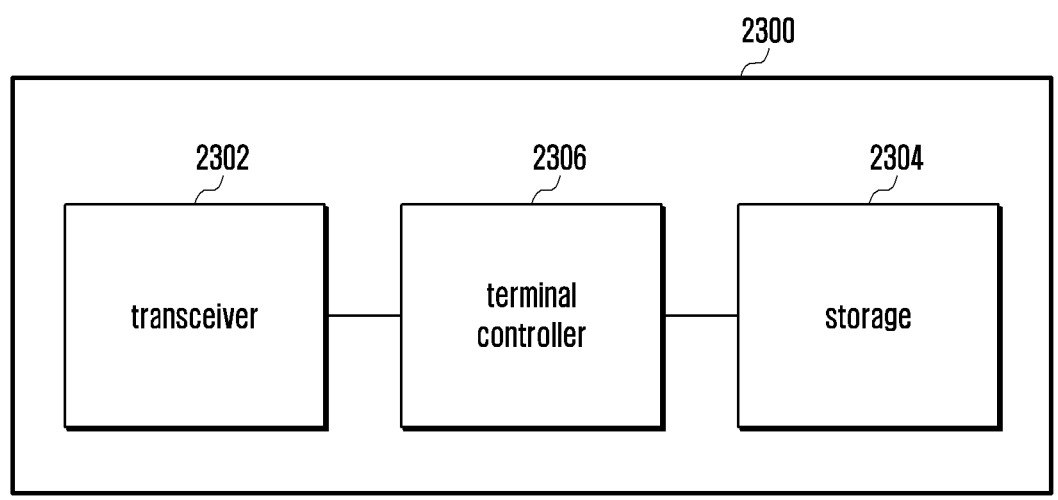
Figure 24:
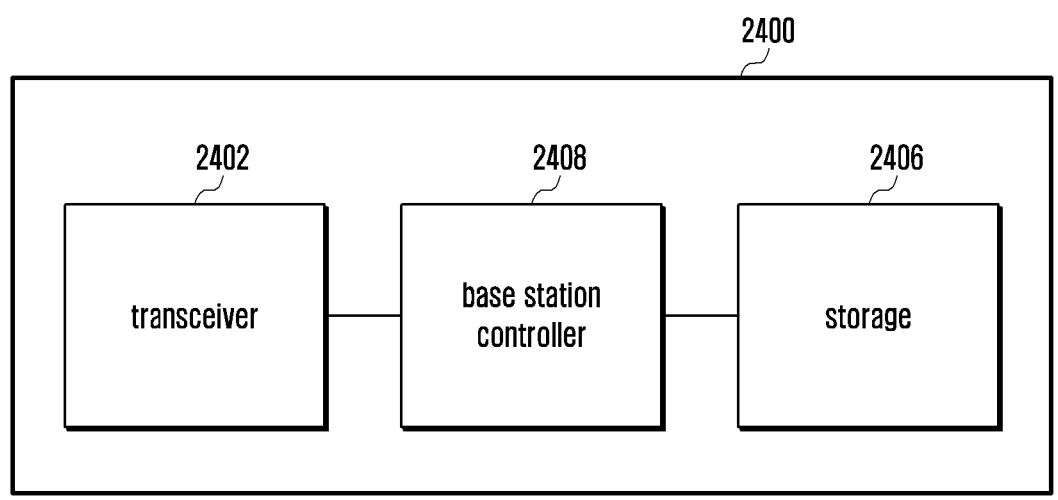
Figure 25:
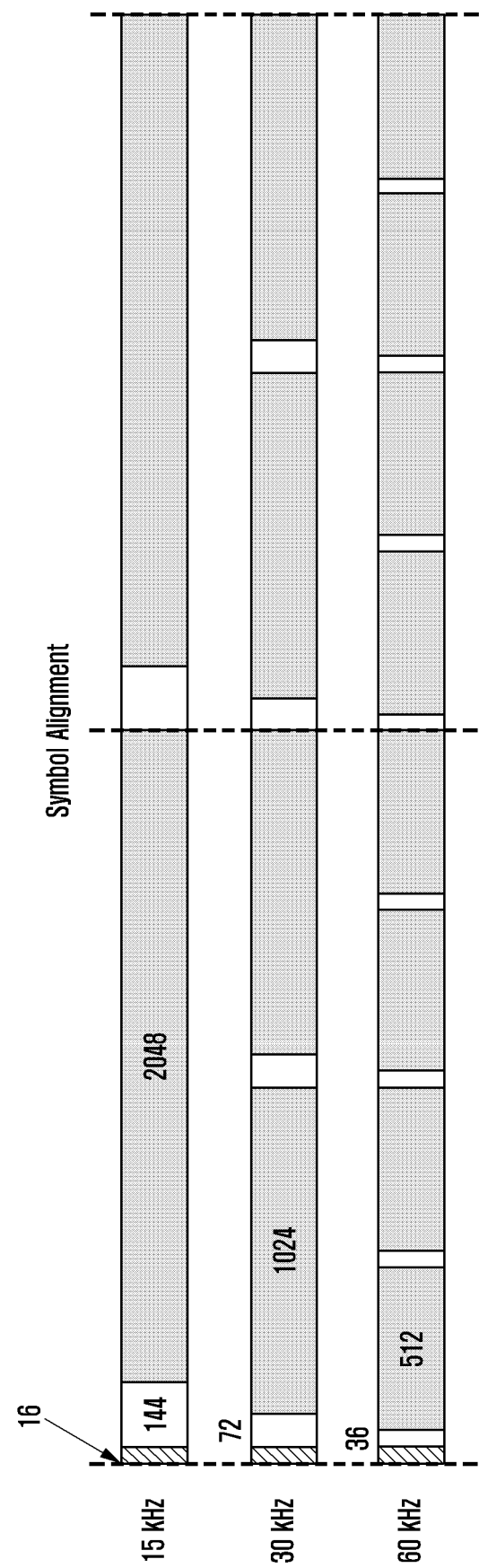
Figure 26:
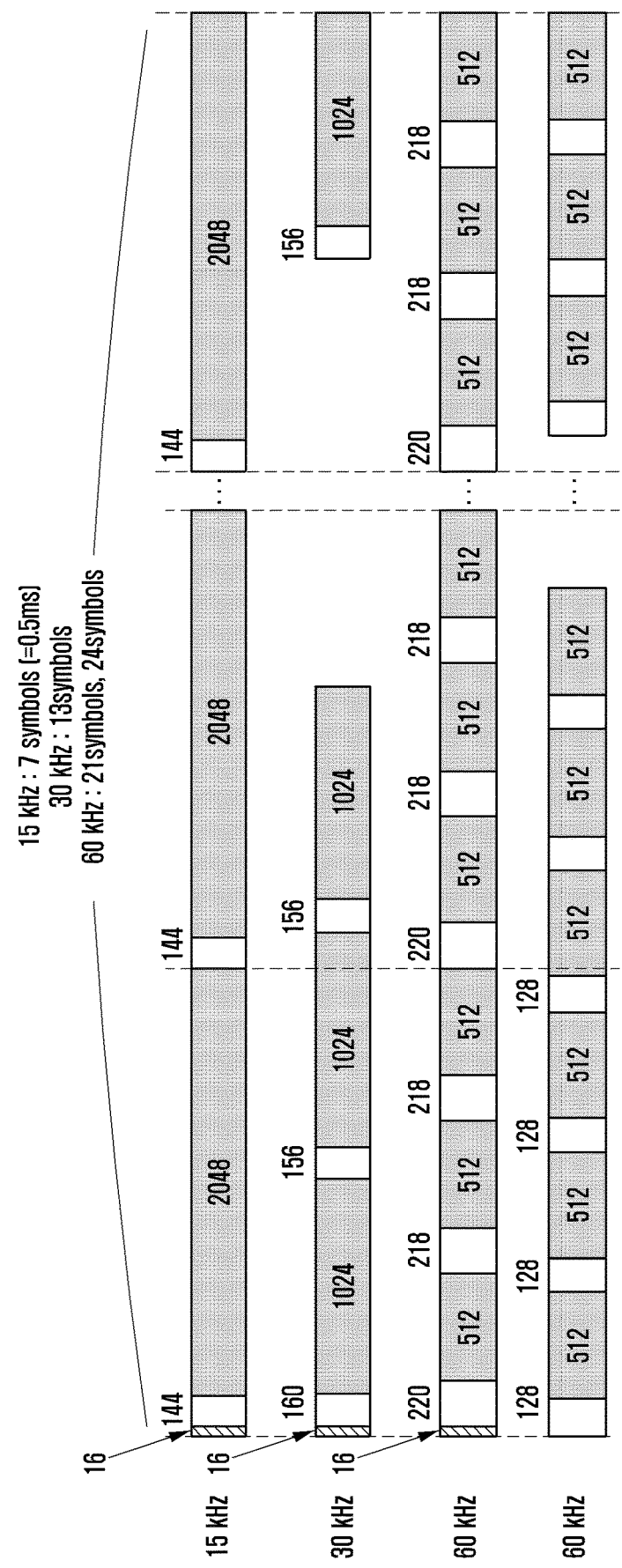
Figure 27:
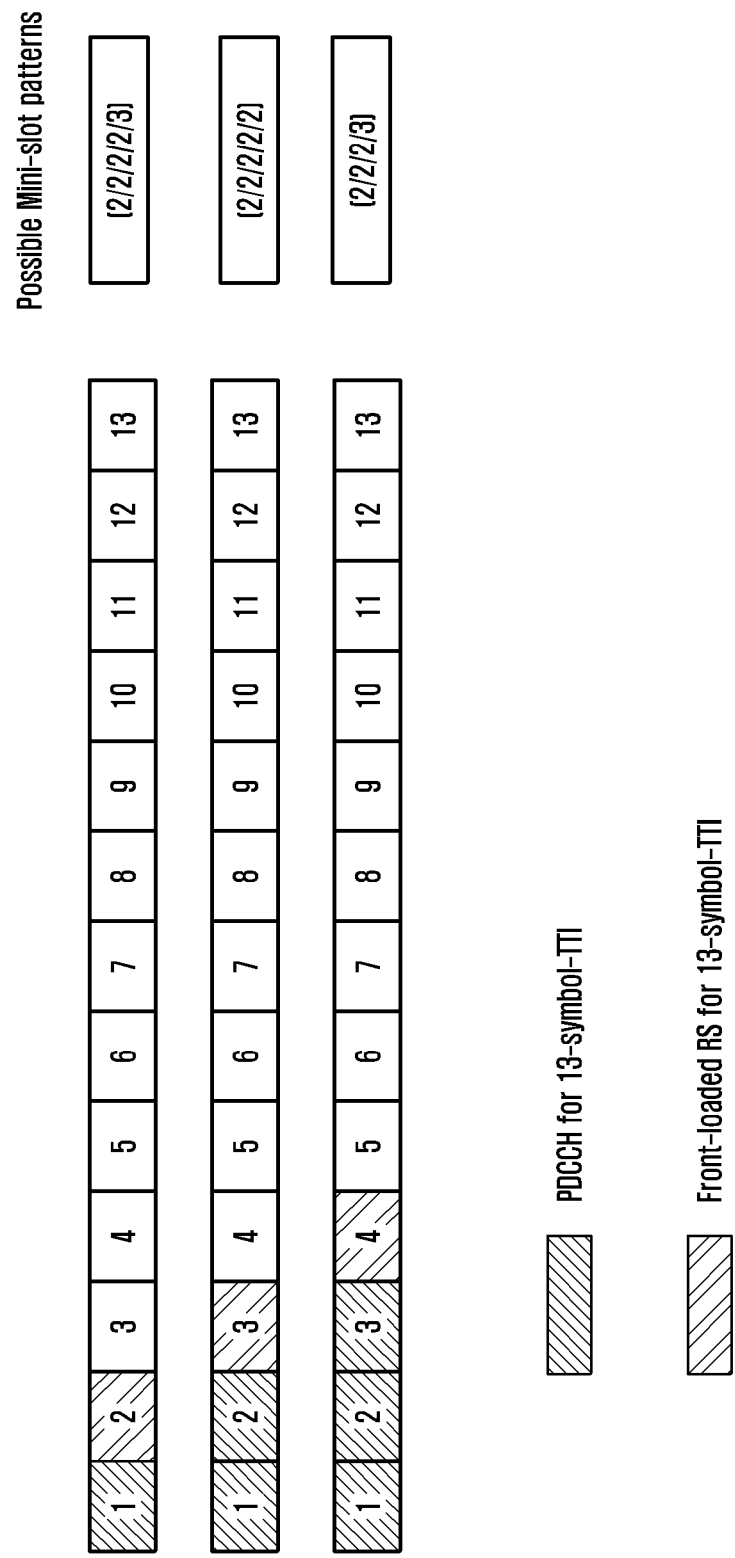
Figure 28:
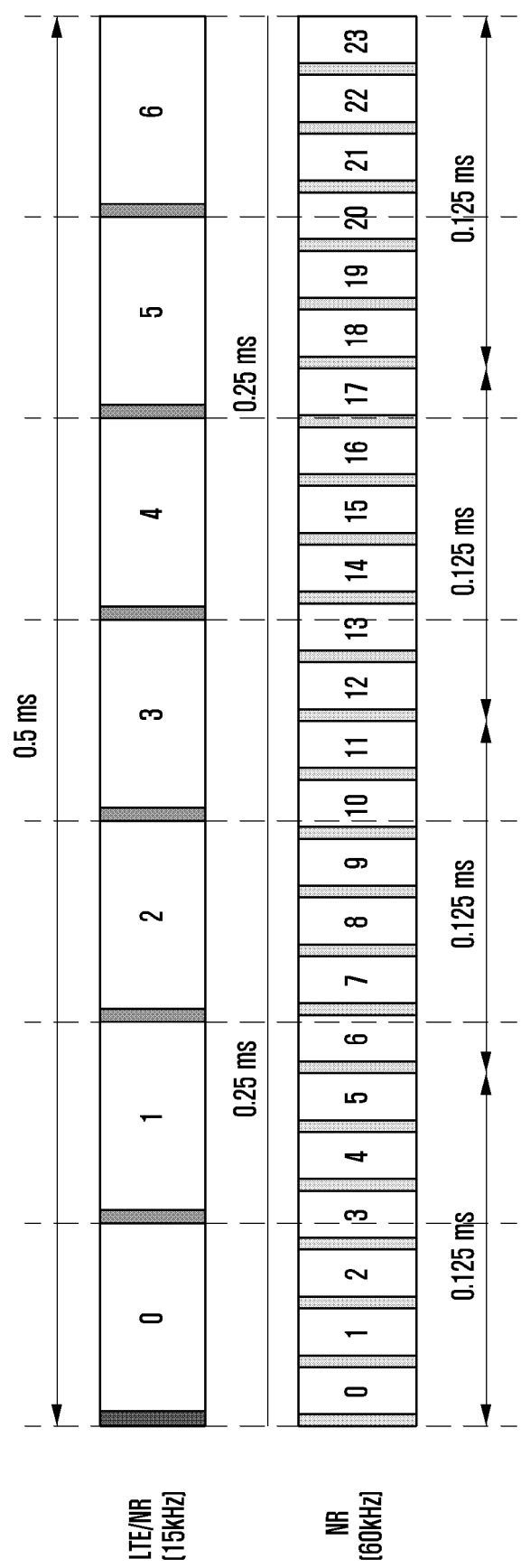
Figure 29A:
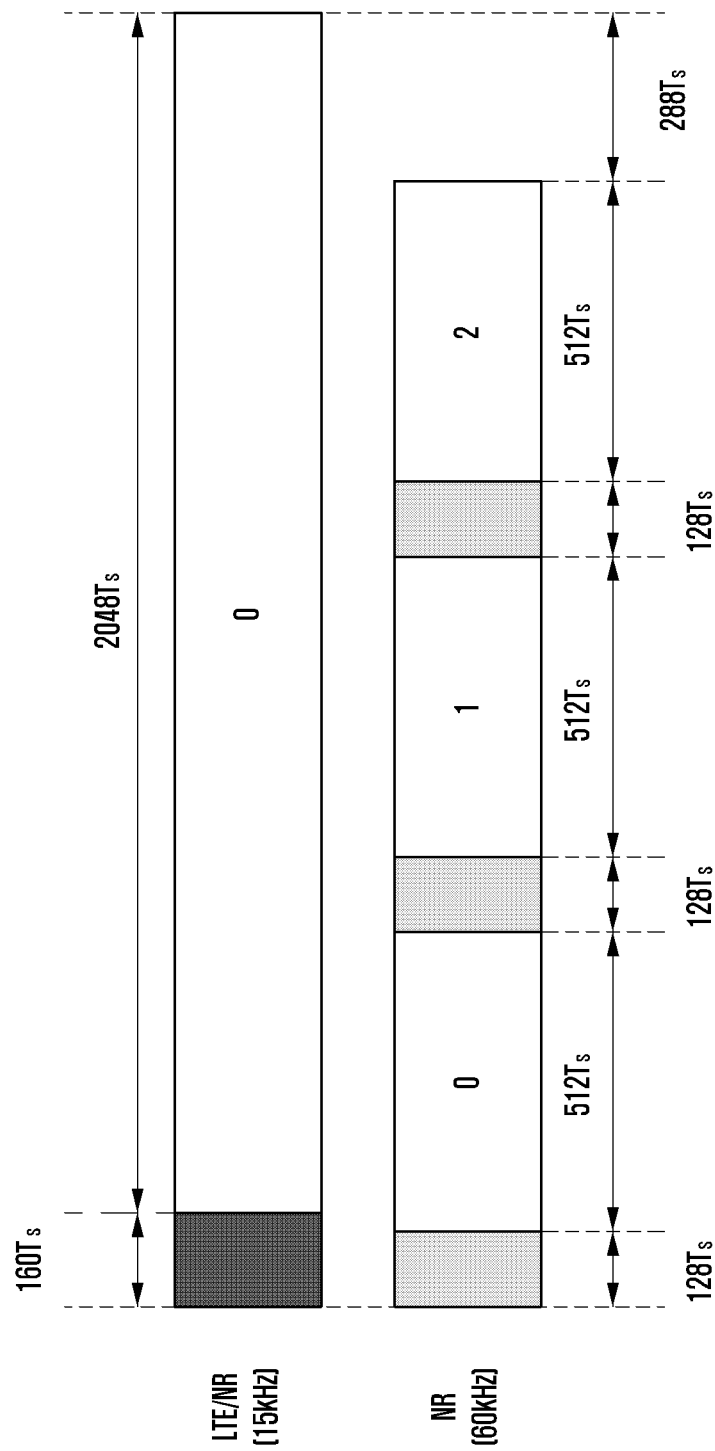
Figure 29B:
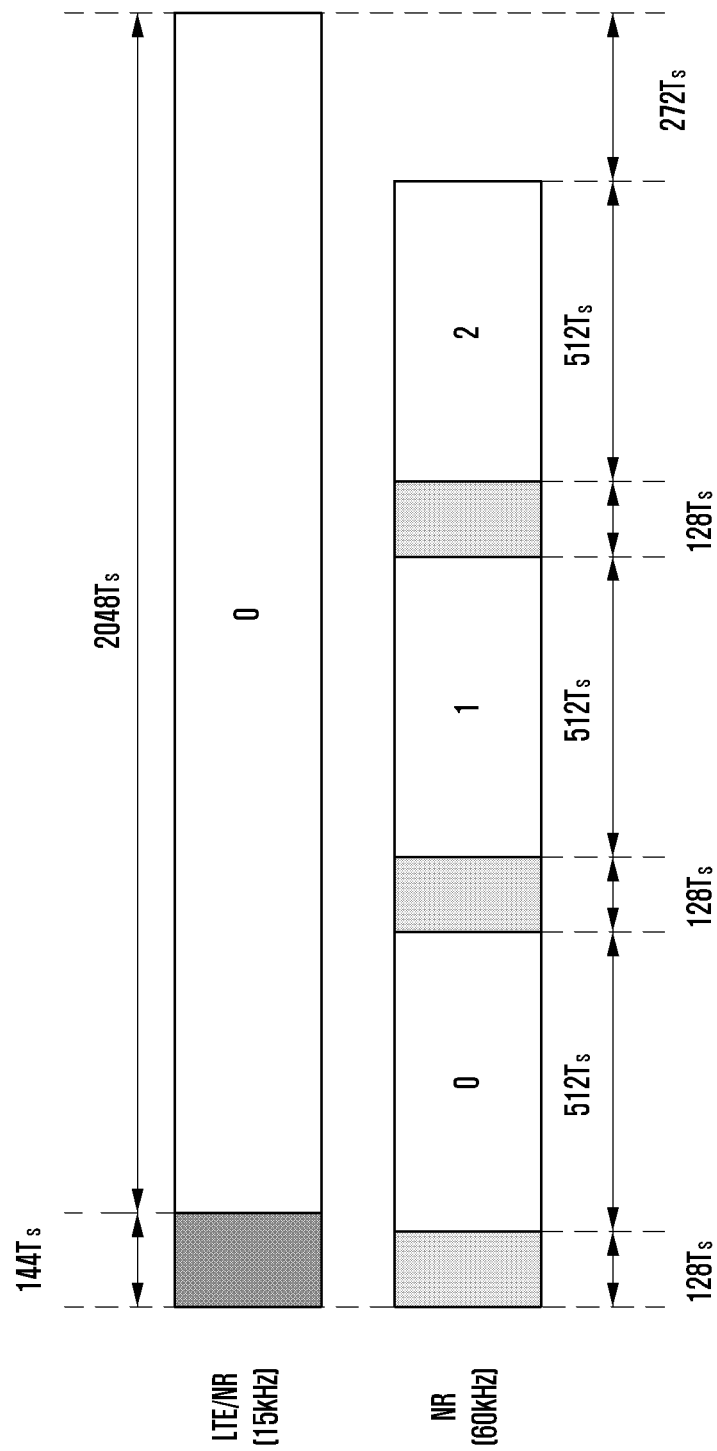
Figure 30A:
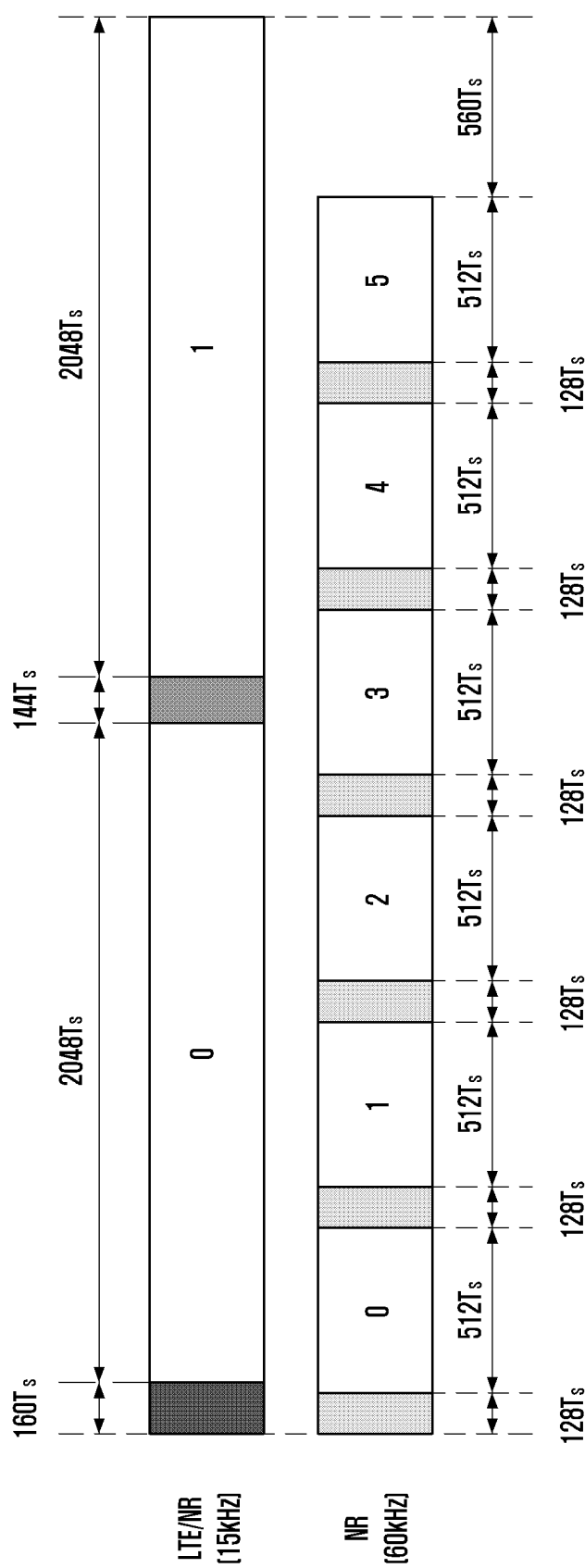
Figure 30B:
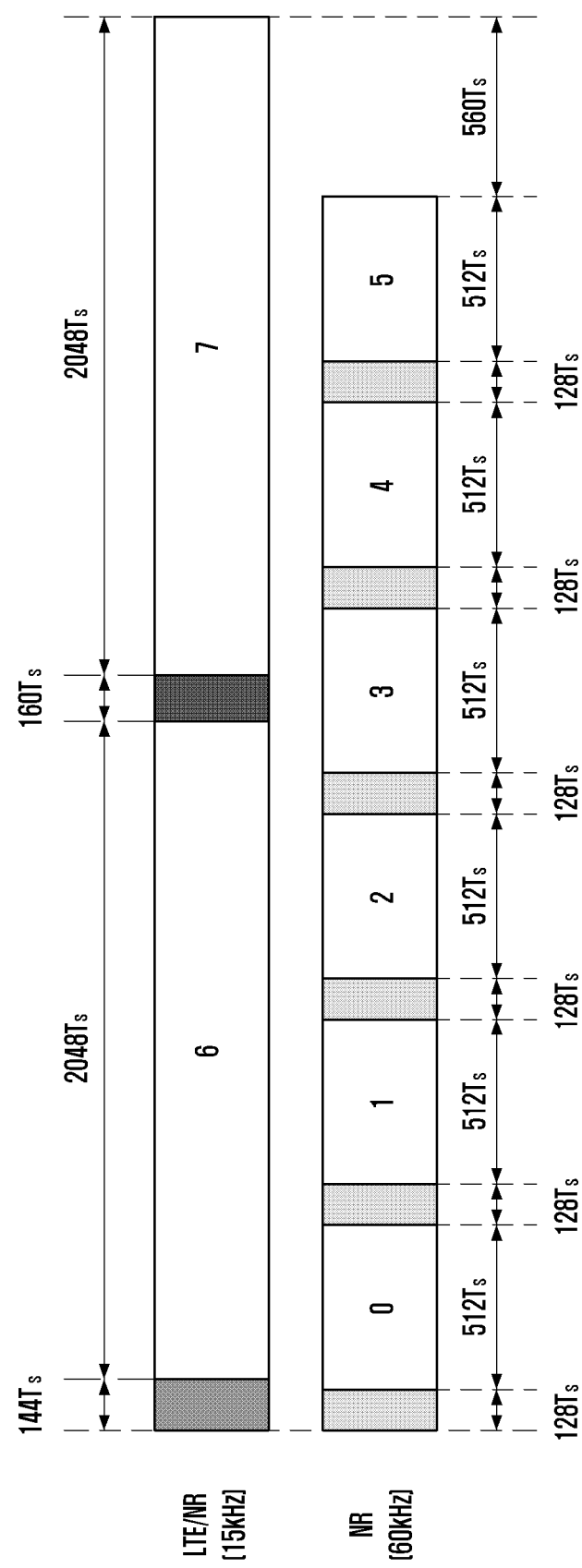
Figure 30C:
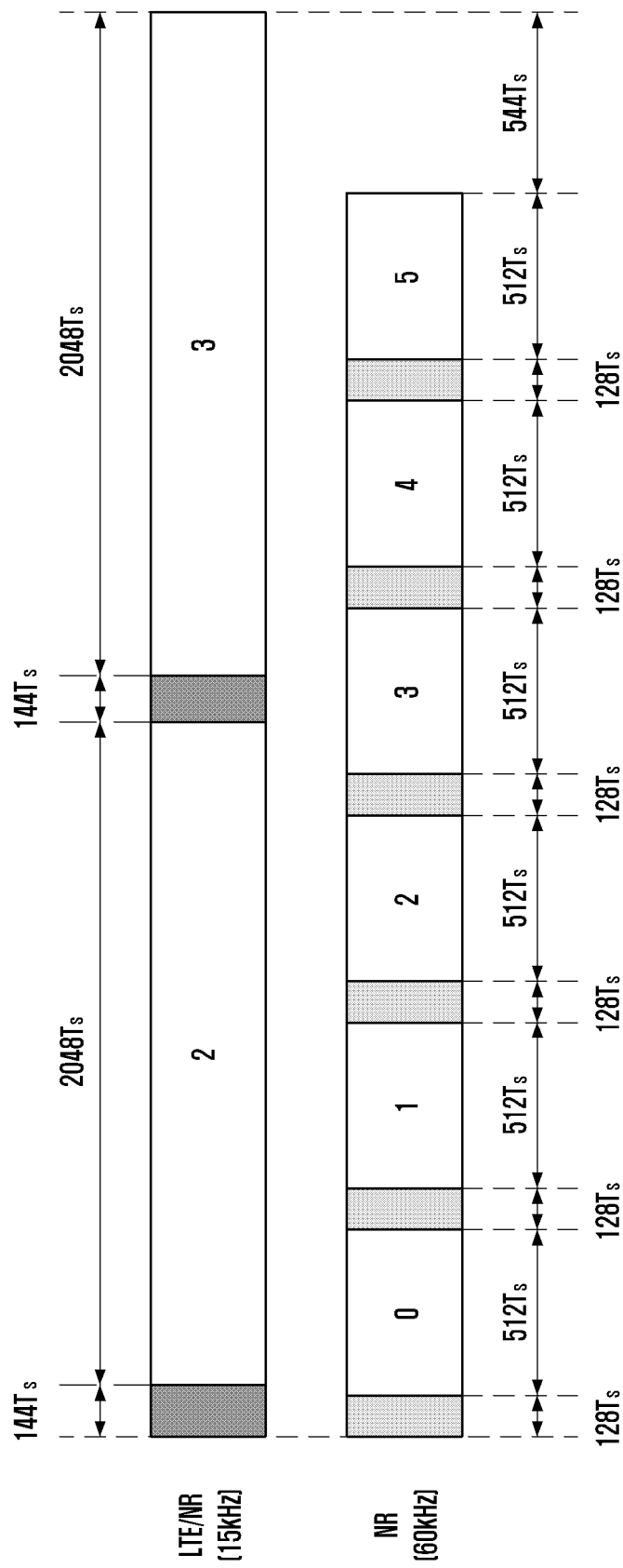
Figure 31A:
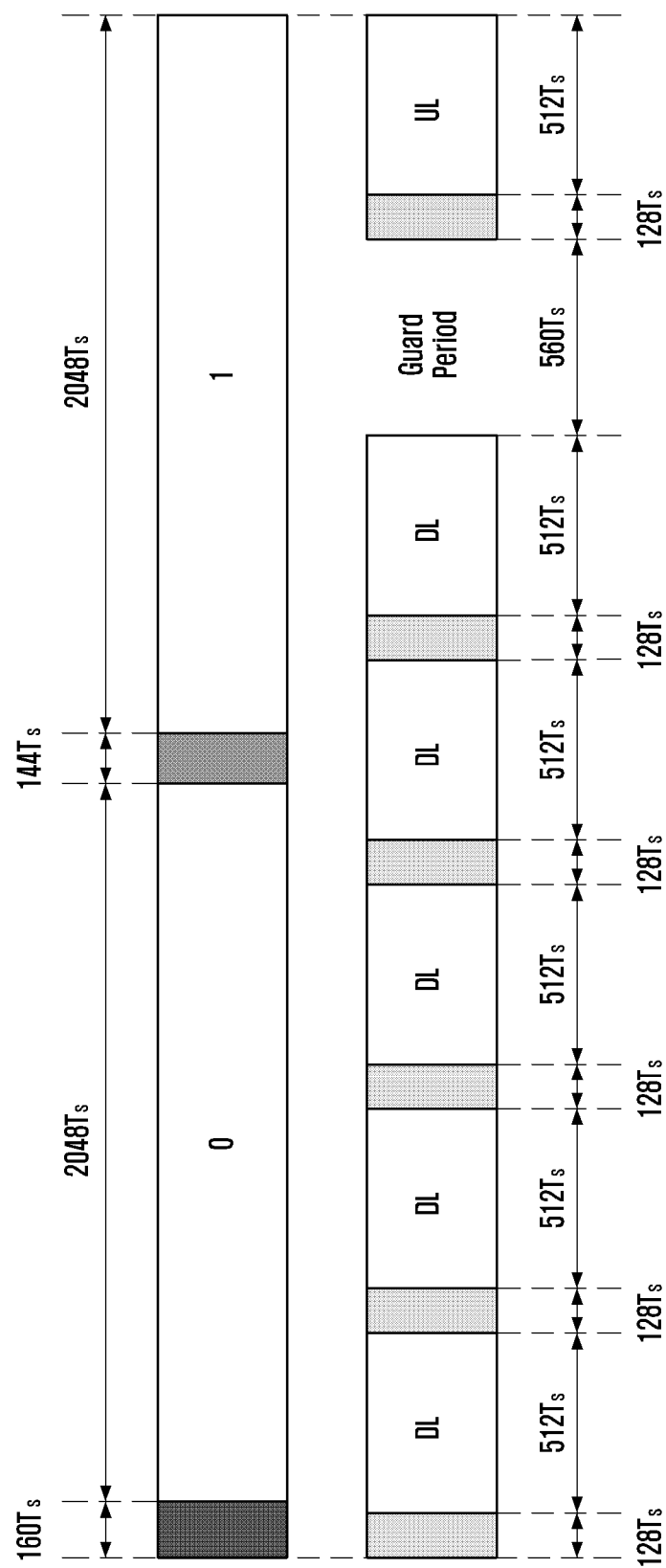
Figure 31B:
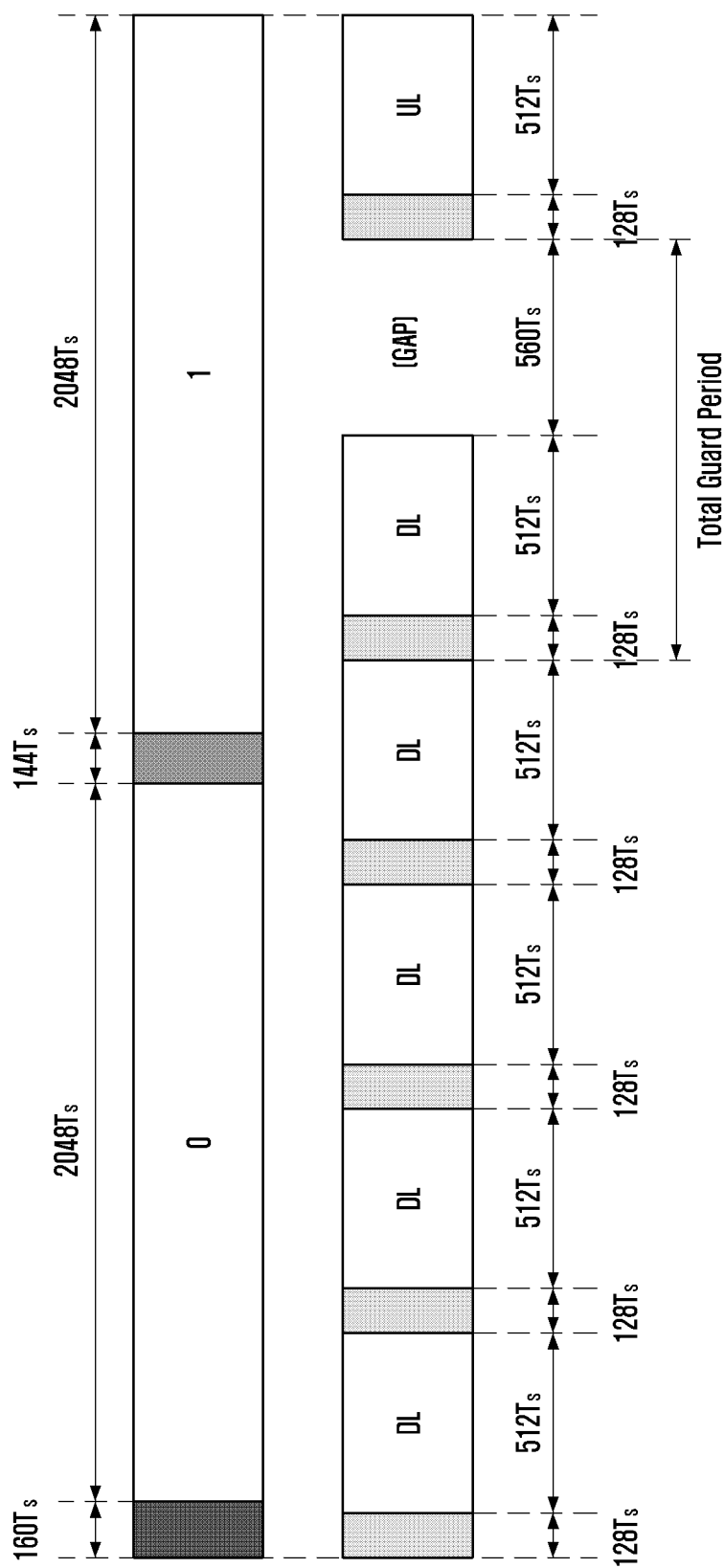

FIG. 6B is a diagram illustrating an example of a frame structure that satisfies a normal CP length based symbol/slot/subframe alignment having a CP ratio of 1/14 with respect to 60 kHz, 120 kHz, 240 kHz, and 480 kHz while maintaining a CP pattern of LTE as it is on the basis of 15 kHz with the purpose of a millimeter wave (mmWave) band of T_s according to an embodiment of the present disclosure;

FIG. 7 is a diagram illustrating an example of a frame structure that satisfies a normal CP length based symbol/slot/subframe alignment having a CP ratio of 1/14 with respect to 3.75 kHz, 7.5 kHz, 15 kHz, 30 kHz, and 60 kHz with the purpose of a 5$^{th}$ generation (5G) standalone system that is not mixedly used with LTE according to an embodiment of the present disclosure;

FIG. 8 is a diagram illustrating an example of a frame structure that satisfies a normal CP length based symbol/slot/subframe alignment having a CP ratio of 1/14 with respect to certain 2$^m$ reference subcarrier spacings on the basis of 75 kHz with 0.2 T_s according to an embodiment of the present disclosure;

FIG. 9 is a diagram illustrating an example of a frame structure that satisfies a normal CP length based symbol/slot/subframe alignment having a CP ratio of 1/14 with respect to subcarrier spacings of 150 kHz and 300 kHz that can be applied to a mmWave band on the basis of 75 kHz with 0.2 T_s according to an embodiment of the present disclosure;

FIG. 10 is a diagram illustrating an example of a frame structure that satisfies a normal CP length based symbol/slot/subframe alignment having a CP ratio of 1/14 with respect to subcarrier spacings of 120 kHz and 240 kHz that can be applied to a mmWave band on the basis of 60 kHz with 0.25 T_s according to an embodiment of the present disclosure;

FIG. 11 is a diagram illustrating an example of a frame structure that enables an integer number of symbols to be deployed even in a state where subcarrier spacings of 30 kHz and 60 kHz have the same CP length as a normal CP length of 15 kHz in a subframe of 15 kHz with a reference subcarrier spacing of 15 kHz according to an embodiment of the present disclosure;

FIG. 12 is a diagram illustrating an example of a frame structure in which a symbol of 60 kHz satisfies a symbol alignment with a normal CP symbol of 15 kHz in a subframe of 15 kHz with a reference subcarrier spacing of 15 kHz according to an embodiment of the present disclosure;

FIG. 13A is a diagram illustrating an example of a RB corresponding to a normal CP of a reference subcarrier spacing of 7.5 kHz according to an embodiment of the present disclosure;

FIG. 13B is a diagram illustrating an example of a RB corresponding to a normal CP of a reference subcarrier spacing of 15 kHz according to an embodiment of the present disclosure;

FIG. 13C is a diagram illustrating an example of a RB corresponding to a normal CP of a reference subcarrier spacing of 30 kHz according to an embodiment of the present disclosure;

FIG. 13D is a diagram illustrating an example of a RB corresponding to a normal CP of a reference subcarrier spacing of 60 kHz according to an embodiment of the present disclosure;

FIG. 14A is a diagram illustrating an example of a RB corresponding to an extended CP of a reference subcarrier spacing of 7.5 kHz according to an embodiment of the present disclosure;

FIG. 14B is a diagram illustrating an example of a RB corresponding to an extended CP of a reference subcarrier spacing of 15 kHz according to an embodiment of the present disclosure;

FIG. 14C is a diagram illustrating an example of a RB corresponding to an extended CP of a reference subcarrier spacing of 30 kHz according to an embodiment of the present disclosure;

FIG. 14D is a diagram illustrating an example of a RB corresponding to an extended CP of a reference subcarrier spacing of 60 kHz according to an embodiment of the present disclosure;

FIG. 15A is a diagram illustrating an example of a RB of a subcarrier spacing of 30 kHz having the same CP length as a normal CP length of a reference subcarrier spacing of 15 kHz according to an embodiment of the present disclosure;

FIG. 15B is a diagram illustrating an example of a RB of a subcarrier spacing of 60 kHz having the same CP length as a normal CP length of a reference subcarrier spacing of 15 kHz according to an embodiment of the present disclosure;

FIG. 16 is a diagram illustrating an example of a RB of a subcarrier spacing of 60 kHz that can perform a symbol alignment with a normal CP symbol of a reference subcarrier spacing of 15 kHz according to an embodiment of the present disclosure;

FIG. 17A is a diagram illustrating an example in which RBs such as in FIGS. 13A to 13D coexist in a frequency division multiplexing (FDM) type in a scalable frame structure like that in FIG. 6A according to an embodiment of the present disclosure;

FIG. 17B is a diagram illustrating an example in which RBs such as in FIGS. 14A to 14D coexist in a FDM type in a scalable frame structure like that in FIG. 4 according to an embodiment of the present disclosure;

FIG. 18 is a diagram illustrating an example in which RBs such as in FIGS. 13B, 15A and 15B coexist in a FDM type in a scalable frame structure as shown in FIG. 11 according to an embodiment of the present disclosure;

FIG. 19 is a diagram illustrating an example in which RBs such as in FIGS. 13B and 16 coexist in a FDM type in a scalable frame structure as shown in FIG. 12 according to an embodiment of the present disclosure;

FIG. 20A is a diagram explaining a procedure in which a terminal performs an initial connection and communication with a base station in the case where the terminal determines a reference subcarrier spacing and the base station configures an initial connection channel with respect to all subcarrier spacings to be compulsorily supported according to an embodiment of the present disclosure;

FIG. 20B is a diagram explaining a procedure in which a terminal performs an initial connection and communication with a base station in the case where the terminal determines a reference subcarrier spacing and the base station configures an initial connection channel with respect to a default subcarrier spacing pre-engaged with all terminals according to an embodiment of the present disclosure;

FIG. 20C is a diagram explaining a procedure in which a terminal performs an initial connection and communication with a base station in the case where the base station determines a reference subcarrier spacing and configures an initial connection channel with respect to all subcarrier spacings to be compulsorily supported according to an embodiment of the present disclosure;

FIG. 20D is a diagram explaining a procedure in which a terminal performs an initial connection and communication with a base station in the case where the base station determines a reference subcarrier spacing and configures an initial connection channel with respect to a default subcarrier spacing pre-engaged with all terminals according to an embodiment of the present disclosure;

FIG. 20E is a diagram explaining a procedure in which a terminal performs an initial connection and communication with a base station in the case where a reference subcarrier spacing is fixed to a single value in accordance with a frequency band and even an initial connection channel is configured with respect to the corresponding subcarrier spacing according to an embodiment of the present disclosure;

FIG. 21 is a diagram explaining a procedure performed by a base station and a terminal if the base station variably operates a frequency/time resource region for each numerology set in accordance with situations according to an embodiment of the present disclosure;

FIG. 22A is a diagram illustrating an example of a 5G network environment in which multi-transmission and reception points (TRP) is installed for each cell that is suitable to operation of a scalable frame structure like that in FIG. 4 or 6A according to an embodiment of the present disclosure;

FIG. 22B is a diagram illustrating an example of a 5G network environment in which single TRP is installed for each cell that is suitable to operation of a scalable frame structure like that in FIG. 11 or 12 according to an embodiment of the present disclosure;

FIG. 23 is a diagram illustrating the configuration of a terminal according to an embodiment of the present disclosure according to an embodiment of the present disclosure;

FIG. 24 is a diagram illustrating the configuration of a base station according to an embodiment of the present disclosure according to an embodiment of the present disclosure;

FIG. 25 is a diagram illustrating an example of a frame structure that satisfies a symbol/0.5 ms (LTE slot length) alignment by scaling an LTE short CP length for a normal CP length having a CP ratio of 1/14 and allocating a residual time of 16 $T_s$ to a first symbol having a period of 0.5 ms with respect to 30 kHz and 60 kHz while maintaining an LTE CP pattern as it is on the basis of 15 kHz with $T_s$ according to an embodiment of the present disclosure;

FIG. 26 is a diagram illustrating an example of a frame structure having a similar CP length to a normal CP length of LTE and having an extended CP length having different overheads with respect to 30 kHz and 60 kHz on the bases of 15 kHz with $T_s$ according to an embodiment of the present disclosure;

FIG. 27 is a diagram illustrating an example of a slot/mini-slot structure that can support enhanced mobile broadband (eMBB) and ultra-reliable and low latency communication (URLLC) with different transmit time interval (TTIs) in a frame structure having an extended CP length in a subcarrier spacing of 30 kHz according to an embodiment of the present disclosure;

FIG. 28 is a diagram illustrating an example of a scalable frame structure for 60 kHz subcarrier spacings having an extended CP length having different CP overheads so that subcarrier spacings have a similar length to an LTE normal CP length and coexist with a coverage that is the same as or similar to that of a normal CP of 15 kHz subcarrier spacing according to an embodiment of the present disclosure;

FIGS. 29A and 29B illustrate an example of such a mini-slot structure according to an embodiment of the present disclosure;

FIGS. 30A, 30B, and 30C illustrate an example of a mini-slot structure in the case where two normal CP OFDM symbols of the 15 kHz subcarrier spacing are respectively configured as long CP+short CP, short CP+long CP, and short CP+short CP in the case where the mini-slot length is defined as normal CP 2 OFDM symbol duration of the 15 kHz subcarrier spacing according to various embodiments of the present disclosure;

FIG. 31A illustrates an example in which the mini-slot of 60 kHz subcarrier spacing is composed of 5 symbols for a downlink (DL), a surplus time period used as a guard period for downlink-uplink (DL-UL) switching, and one symbol for an uplink (UL) according to an embodiment of the present disclosure; and FIG. 31B illustrates an example in which the mini-slot of 60 kHz subcarrier spacing is composed of 4 symbols for a downlink (DL), one symbol and a surplus time period used as a guard period for DL-UL switching, and one symbol for an uplink (UL) according to an embodiment of the present disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, preferred various embodiments of the present disclosure will be described in detail with reference to the accompanying drawings.

In explaining various embodiments of the present disclosure, explanation of technical contents which are well known in the art to which the present disclosure pertains and are not directly related to the present disclosure will be omitted. This is to transfer the subject matter of the present disclosure more clearly without obscuring the same through omission of unnecessary explanations.

For the same reason, in the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

The aspects and features of the present disclosure and methods for achieving the aspects and features will be apparent by referring to the embodiments to be described in detail with reference to the accompanying drawings. However, the present disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the present disclosure is only defined within the scope of the appended claims. In the entire description of the present disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps or operations to be performed on the computer or other programmable apparatus to produce a computer implemented process such that the instructions that execute on the computer or other programmable apparatus provide operations for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~unit", as used in an embodiment, means, but is not limited to, a software or hardware component, such as field-programmable gate array (FPGA) or application-specific integrated circuit (ASIC), which performs certain tasks. However, "~unit" does not mean to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more central processing unit (CPUs) in a device or a security multimedia card.

Further, in an embodiment, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In describing the present disclosure, a detailed description of related functions or configurations will be omitted if it is determined that it obscures the disclosure in unnecessary detail. Further, all terms used in the description are general terms that are widely used in consideration of their functions in the present disclosure, but may differ depending on intentions of a person skilled in the art to which the present disclosure belongs, customs, or appearance of new technology. Accordingly, they should be defined on the basis of the contents of the whole description of the present disclosure. Hereinafter, the base station is the subject that performs resource allocation to the terminal, and may be at least one of an eNode B, Node B, next-generation node B (gNB), new radio (NR) access technology node, base station (BS), NR BS, radio connection unit, base station controller, and node on a network. The terminal may include user equipment (UE), mobile station (MS), cellular phone, smart phone, computer, or multimedia system that can perform a communication function. In the present disclosure, a downlink (DL) is a radio transmission path of a signal that is transmitted from the base station to the terminal, and an uplink (UL) means a radio transmission path of a signal that is transmitted from the terminal to the base station. Further, an embodiment of the present disclosure may be applied to even other communication systems having similar technical backgrounds or channel types. Further, the embodiment of the present disclosure may also be applied to other communication systems through partial modifications thereof in a range that does not greatly deviate from the scope of the present disclosure through the judgment of those skilled in the art.

The system bandwidth for a single carrier in long term evolution (LTE) and LTE-advanced (LTE-A) is limited to 20 MHz at maximum, whereas the main target of a $5^{th}$ generation (5G) system is to support an ultrahigh-speed data service that reaches several Gbps using an ultra-broadband that is incredibly wider than the system bandwidth. Accordingly, the 5G system considers a band of several to 100 GHz at maximum, in which an ultra-broadband frequency can be secured relatively easily, as a candidate frequency. In each country, it is intended to secure a broadband frequency for the 5G system through frequency deployment or new allocation among frequency bands included in a range of several hundred MHz to several GHz that a mobile communication system uses.

The ultrahigh frequency band of several tens of GHz has the wavelength of a radio wave at the level of several millimeters (mm), and thus it may be called a millimeter wave (mmWave). In general, as the frequency is heightened, a path loss of the radio wave is increased, and thus a mobile communication system using the ultrahigh frequency band has reduced cell coverage as compared with the existing band of several GHz. In order to overcome such drawbacks, a beamforming technology has become important, which increases an arrival distance of the radio wave through concentration of radiation energy of the radio wave on a specific target point using a plurality of array antennas. The beamforming technology can be applied to not only a transmission end but also a reception end, and in order for the beamforming technology to operate properly, a method for achieving an accurate measurement of a transmitted/received beam direction and a feedback of the measured direction is necessary. In order for a base station to perform sweeping of a plurality of beams in a short time so that the base station can find out the transmitted/received beam direction for a terminal in a cell, it is advantages that a symbol for beam measurement has a short length.

As another requirement of the 5G system, an ultra-low latency service having about 1 ms or less of transmission delay between the transmission end and the reception end is required. As one scheme for reducing the transmission delay, it is necessary to design a frame structure based on transmit time interval (TTI) that is shorter than that of LTE and LTE-A. The TTI is a reference unit to perform scheduling, and the TTI of the LTE and LTE-A systems is 1 ms corresponding to the length of one subframe. For example, TTIs that are short enough to satisfy the requirements of the ultra-low latency service of the 5G system may be 0.5 ms, 0.25 ms, 0.125 ms, and 62.5 μs that are shorter than those of the LTE and LTE-A systems.

In the case of the OFDM based 5G system, there is a reciprocal relationship between an OFDM symbol duration and a subcarrier spacing, and if the subcarrier spacing is lengthened twice as compared with the existing one (e.g., in the case of the LTE, 15 kHz), the symbol duration can be reduced twice, and thus it becomes possible to make a short OFDM symbol duration corresponding to the above-described requirements.

On the other hand, in the 5G system, a massive machine-type communication (mMTC) service for enabling wireless connections with massive Internet of things (IoT) terminals should also be considered. In the case of the mMTC, a transmission method is necessary, which can maintain a long battery use time with wide coverage rather than increasing the data rate. In this case, it is possible to lengthen the symbol duration so that transmission energy of a terminal can be concentrated on a narrow band through reduction of the OFDM subcarrier spacing several times as compared with the existing one.

Accordingly, in order to satisfy the various requirements as described above in one carrier frequency band, it is necessary to design a scalable frame structure that can simultaneously support subcarrier spacings having various sizes rather than the fixed subcarrier spacing like LTE. In designing the OFDM based frame structure, setting of a cyclic prefix (CP) length of an OFDM symbol is very important, and this is because there is a trade-off relationship between a cell coverage and a time domain overhead of an OFDM system to overcome multi-path fading of a wireless channel. For example, although the CP length supporting an inter-site distance (ISD) of 500 m should be longer than the CP length supporting an ISD of 200 m, the overhead of the system is increased as the CP length becomes longer. In addition, the reason why the setting of the CP length becomes more important in designing the frame structure of the 5G system is that time alignment in the unit of a CP-OFDM symbol, a slot, or a subframe may be performed or not between the subcarrier spacings depending on how to set the OFDM symbol durations that are different from each other due to plural subcarrier spacings and the CP lengths that are added to the respective OFDM symbols. Since such time alignment can minimize an inter-cell interference problem that occurs due to synchronization mismatch and facilitate adjustment of a scheduling time unit of a base station, it is one of main consideration factors in designing a scalable frame structure of the 5G system.

First, an OFDM based frame structure of LTE and LTE-A systems and may system parameters, such as a subframe, slot, and subcarrier spacing, will be described.

Figure 1:
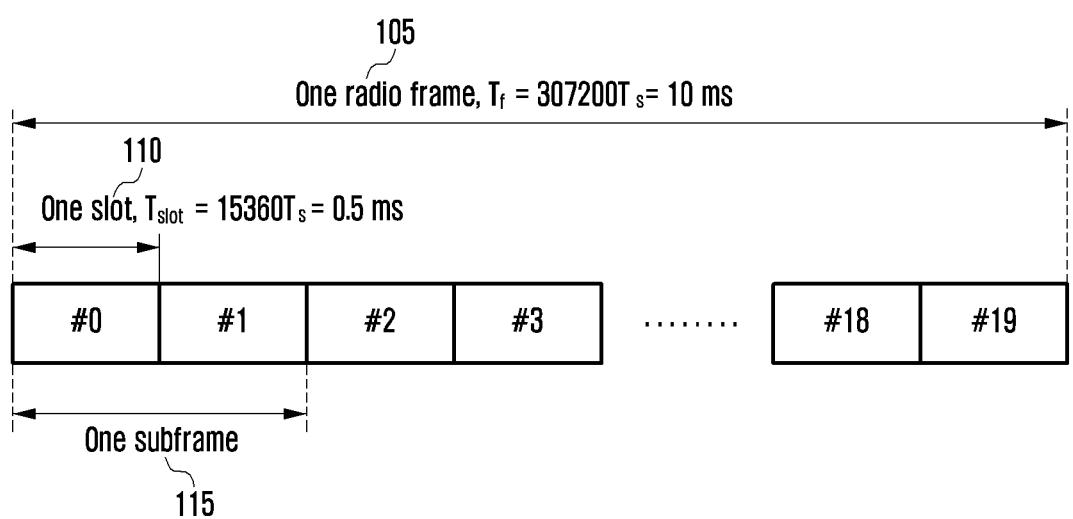
FIG. 1 is a diagram explaining definition of a frame structure of a long-term evolution (LTE) system, a radio frame that is a time unit, a subframe, and a slot according to an embodiment of the present disclosure.

FIG. 1 is a diagram illustrating a frame structure for frequency division duplex (FDD) of LTE and LTE-A systems according to an embodiment of the present disclosure.

Referring to FIG. 1, an FDD frame structure is disclosed. Even in the case of a time division duplex (TDD) frame, since the basic structure is the same as that of the FDD except for a special subframe, and definition of time units, such as a radio frame 105, a subframe 115, and a slot 110, is the same regardless of the duplex, explanation will be hereinafter made on the basis of the FDD frame structure.

In the LTE and LTE-A systems, in consideration of an OFDM system in which a subcarrier spacing is 15 kHz and a fast Fourier transform (FFT) size is 2048 in a system bandwidth of 20 MHz having the maximum size that is supportable for one carrier, a reference time unit is set to $$T_s = 1 + (2048 \cdot 15 \text{ kHz}) = \frac{1}{3073000} \sec$$

that is a reciprocal number of a sampling rate of the system, a slot length is defined as $T_{slot}=15360 \cdot T_s=0.5$ ms, two slots 110 are gathered to constitute one subframe 115, and 10 subframes are gathered to constitute one radio frame 105. Accordingly, the length of a subframe is given to $T_{sf}=2T_{slot}=1$ ms, and the length of a radio frame is given to $T_f=10T_{sf}=10$ ms. Further, in an embodiment, the length of a subframe is not limited to 1 ms, the length may be lengthened or shortened, and such a change of the length may be flexibly provided in accordance with the system design.

Figure 2A:
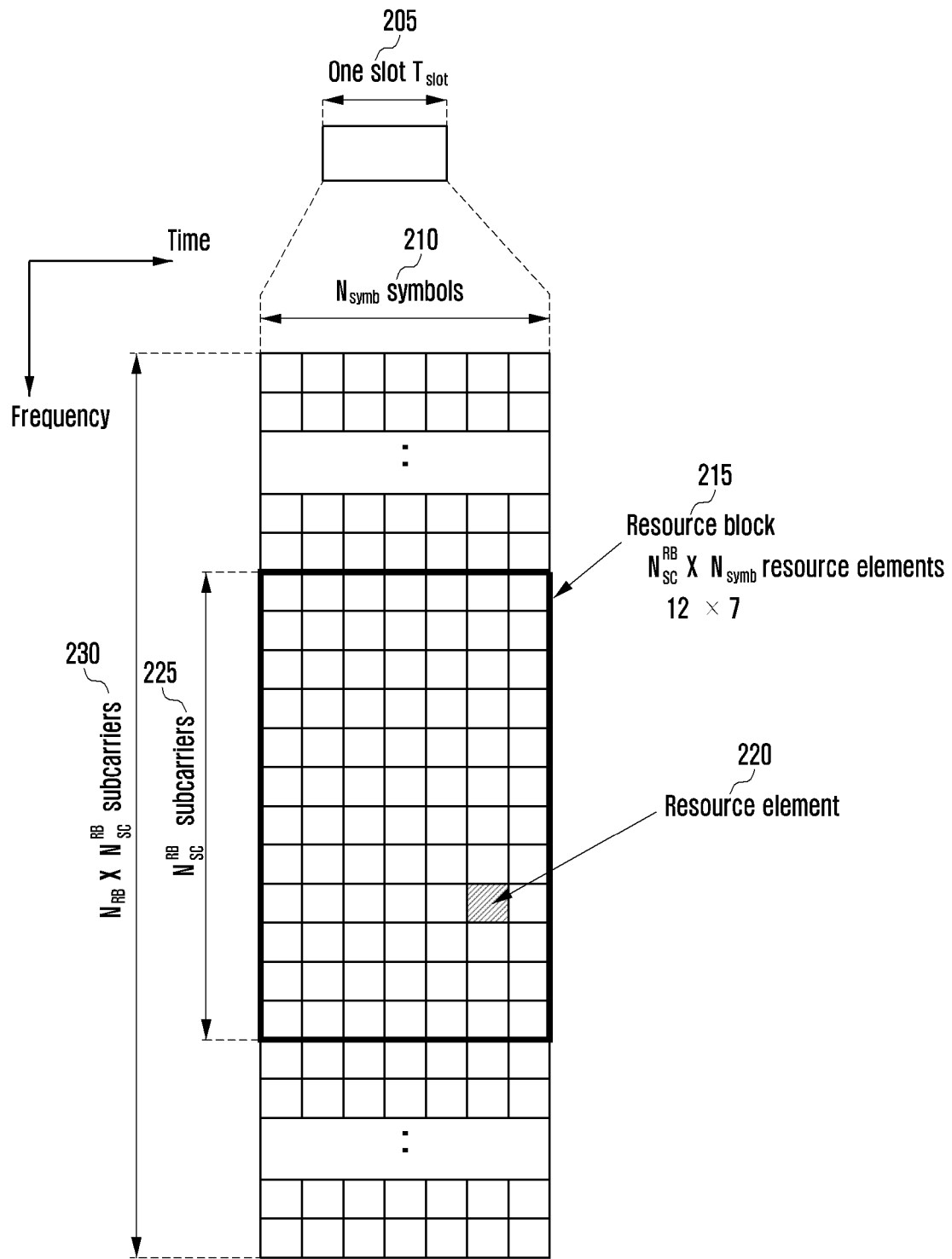
FIG. 2A is a diagram explaining definition of a slot structure using a normal cyclic prefix (CP), a resource block (RB), and a resource element (RE) in an LTE system according to an embodiment of the present disclosure.
Figure 2B:
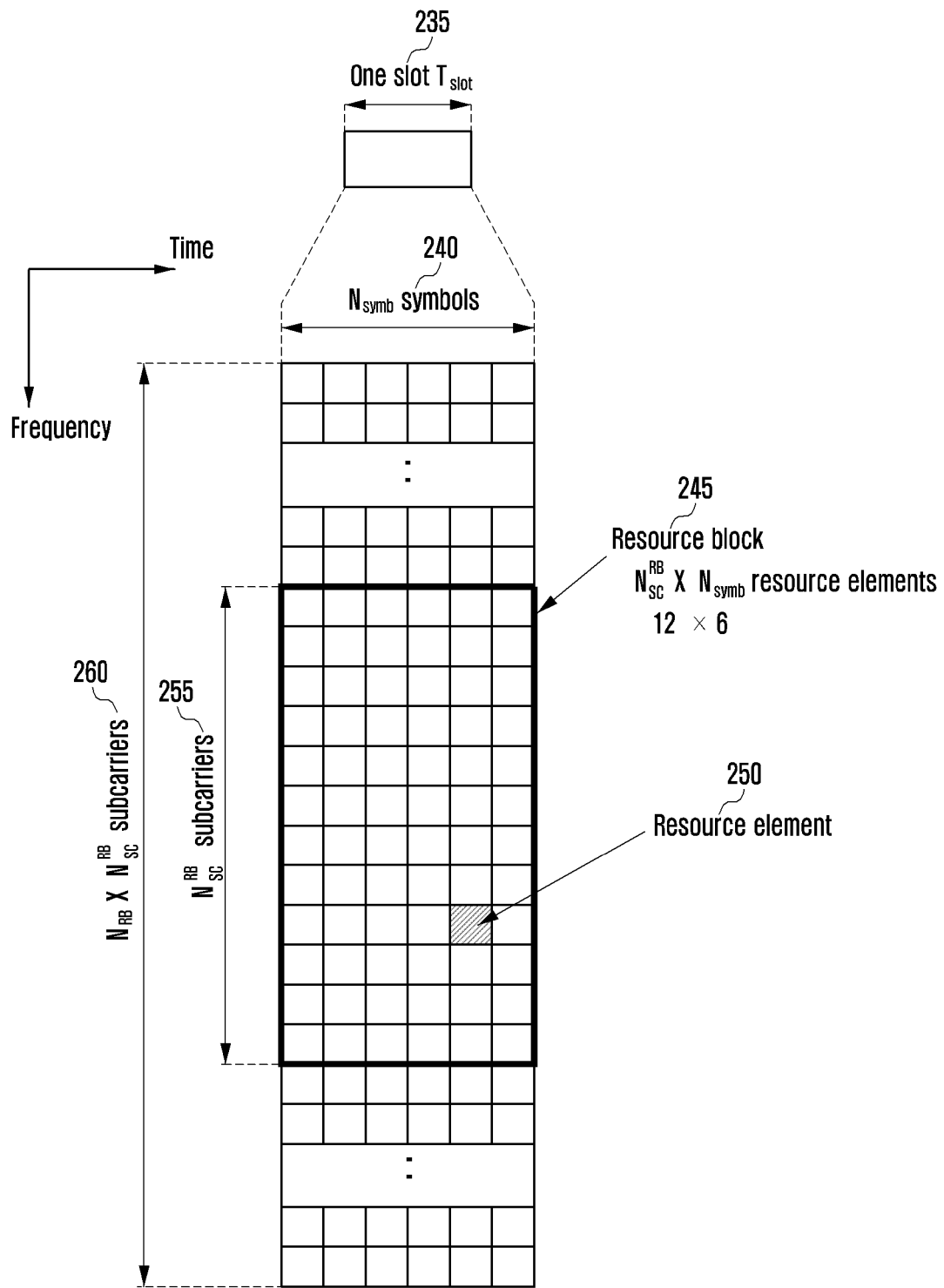
FIG. 2B is a diagram explaining definition of a slot structure using an extended CP, a RB, and a RE in an LTE system according to an embodiment of the present disclosure.

FIGS. 2A and 2B are diagrams illustrating a basic structure of a frequency-time resource region that is a radio resource region in which data or a control channel of LTE and LTE-A systems is transmitted according to various embodiments of the present disclosure.

Referring to FIGS. 2A and 2B, a horizontal axis represents a time domain, and a vertical axis represents a frequency domain. In the time domain, the minimum transmission unit is one OFDM symbol in the case of a downlink (DL), and it is one SC-FDMA symbol in the case of an uplink (UL), and $N_{symb}$ symbols 210 and 240 are gathered to constitute one slot 205 or 235. Since the OFDM symbol duration and the SC-FDMA symbol duration may correspond to each other, only the OFDM symbol duration will be described hereinafter. In the frequency-time domain, the reference unit of a resource is a resource element (RE) 220 or 250, and it may be indicated as an OFDM subcarrier index or a symbol index. A resource block (RB) 215 or 245 or a physical resource block (PRB) is defined as $N_{sc}^{RB}$ successive subcarriers 225 or 255 in a frequency domain and $N_{symb}$ successive OFDM symbols in a time domain. Accordingly, one RB is composed of $N_{sc}^{RB} \times N_{symb}$ REs. In LTE and LTE-A systems, data is mapped in the unit of an RB, and the base station performs scheduling in the unit of an RB-pair, that is, in the unit of two successive slots, with respect to a specific terminal. The number of OFDM symbols $N_{symb}$ (210 or 240) is determined in accordance with the length of a cyclic prefix (CP) that is added for each symbol to prevent inter-symbol interference. If a normal CP as illustrated in FIG. 2A is applied, the number of OFDM symbols becomes $N_{symb}=7$ (210), whereas if an extended CP as illustrated in FIG. 2B is applied, the number of OFDM symbols becomes $N_{symb}=6$ (240). As compared with the normal CP, the extended CP is applied to a system having a relatively large radio wave transmission distance to maintain inter-symbol orthogonality. Since the number of subcarriers that constitute one RB is defined as a fixed value of $N_{sc}^{RB}=12$, the bandwidth of a system transmission band is increased in proportion to the number of RBs $N_{RB}$. For example, values $N_{RB}$ corresponding to the system bandwidths of 1.4 MHz, 3 MHz, 5 MHz, 10 MHz, 15 MHz, and 20 MHz that are supported in LE or LTE-A are 6, 12, 25, 50, 75, and 100, respectively. Parts of both end regions of the system bandwidth include a protection bandwidth that does not transmit data in consideration of interference with adjacent bandwidths. For example, in the case of a downlink (DL) having a system bandwidth of 20 MHz, a bandwidth of about 18 MHz is used as a transmission band using 1200 ($=N_{RB} \times N_{sc}^{RB}=100 \times 12$) subcarriers (e.g., 230 or 260) excluding a direct current (DC) as a subcarrier spacing of 15 kHz, and the remaining 2 MHz is dividedly provided to both ends to be used as protection bands each having 1 MHz. Even in the case of the downlink having other bandwidths, respective protection bands may exist.

The CP ratio may be defined as $$\frac{T_{CP}}{(T_{CP}+T_{OFDM})}$$

that is a ratio of the CP length to the sum of the CP length and the OFDM symbol duration. In the case of a normal CP having the CP ratio of 1/14, it is difficult to control an integer number of samples as large as the corresponding CP ratio on the basis of $T_s$ only with the length of one CP, and thus the CP length for each symbol is additionally controlled. For example, the first symbol duration of each slot is 160 $T_s \approx 5.21$ μs, and the CP length of the remaining 6 symbols in the slot is $144T_s \approx 4.69$ μs. Through this method, one slot may be made to be composed of 7 OFDM symbols through making the number of samples based on $T_s$ that constitute a slot $T_{slot}=15360 \cdot T_s=0.5$ ms be $1 \times (160+2048)+6 \times (144+2048)=15360$. Accordingly, in the case of a normal CP of an LTE or LTE-A system, the length of the first OFDM symbol of each slot is $(160+2048)T_s \approx 71.88$ μs, and the length of the remaining 6 OFDM symbols is $(144+2048)T_s \approx 71.35$ μs.

In the case of an extended CP having a CP ratio of 1/4, if it is intended to configure one subframe with 12 OFDM symbols, the integer number of samples as large as the corresponding CP ratio may be controlled using only one CP length. For example, one slot may be composed of 6 OFDM symbols by making the CP length of all 6 symbols in the slot $6 \times (512+2048)=15360$. Accordingly, in the case of an extended CP of the LTE or LTE-A system, all the OFDM symbol durations may be equally applied as $(512+2048)T_s 83.33$ μs.

As a result, for the CP length of the LTE or LTE-A system as described above, it is required to determine the CP ratio that can configure a subframe reference time of 1 ms with the integer number of OFDM symbols if the OFDM subcarrier spacing is given as 15 kHz, and in order to determine the CP ratio, all the system sampling rate and the FFT size that facilitates implementation in the form of $2^n$ may be considered. In other words, the reference time becomes $T_{sf}=15 \cdot 2048 \cdot T_s=(1+14) \cdot 2048 \cdot T_s=(3+12) \cdot 2048 \cdot T_s=1$ ms, and in the case of a normal CP, the CP ratio becomes 1/14, whereas in the case of an extended CP, the CP ratio becomes 3/12=1/4. The control of the CP length in the form of the integer number of times such a sampling period (e.g., in the case of a normal CP, $160T_s$ and $144T_s$, whereas in the case of an extended CP, $512T_s$) and the control of the CP length so that the total sum of the CP lengths in the subframe becomes the integer number of times the OFDM symbol durations (e.g., in the case of a normal CP, the total sum of the CP lengths in the subframe becomes $2048 \cdot T_s=T_{OFDM}$, whereas in the case of an extended CP, the total sum of the CP lengths in the subframe becomes $3 \cdot 2048 \cdot T_s=3T_{OFDM}$) may be factors to be essentially considered in facilitating the system implementation and making a regular frame structure, and even in the case of designing an extended frame structure for the 5G system, they should be considered in the same manner. Further, such an extended frame structure may be applied to other systems in addition to the 5G system in the same manner or with a partial configuration modified.

In a general wireless communication system, in addition to the reference time unit, such as $T_s$, the subcarrier spacing and the CP length are essential information for OFDM transmission and reception, and a base station and a terminal should recognize them as common values for smooth transmission and reception thereof. The base station may transmit such information to the terminal through separate signaling, or predetermined information may be used between the terminal and the base station.

As described above, the operating frequency band of the 5G system is wide to reach a range of several hundred MHz to 100 GHz, operation of a single frame structure over the whole frequency band may cause difficulty in achieving transmission/reception that is suitable to a channel environment for each frequency band. That is, it is necessary to make efficient signal transmission/reception possible by subdividing the operating frequency band and operating the frame structure spaced apart from the subcarrier to match the subdivided operating frequency bands. For example, it is preferable to perform an operation with short OFDM symbol duration through relative enlargement of the subcarrier spacing so as to overcome performance deterioration due to phase noises and to shorten a beam sweeping period. Further, even in the case of supporting a high-mobility terminal having high speed or an ultra-low latency service terminal, it is preferable to relatively enlarge the subcarrier spacing. In contrast, in the case of supporting an mMTC terminal in a sub-1 GHz band, it is preferable to perform an operation for wide coverage and energy-efficient low-speed transmission using a long OFDM symbol duration through relative shortening of the subcarrier spacing. In addition to the operating frequency band and the service type, the cell size may also be main considerations defining the frame structure. For example, if the cell size is large, it is preferable to apply a relatively long CP length in order to avoid inter-symbol interference due to a path propagation signal. Hereinafter, for convenience in explanation, a frame structure that is defined in accordance with various scenarios, such as the operating frequency band, service characteristics, and cell size, is called a scalable frame structure in the following description.

According to one of subject matters of embodiments disclosed in the description, alignment in the unit of time is performed with respect to at least one of a subframe, slot, and symbol to be defined for each subcarrier spacing through making the CP length have a specific pattern when the scalable frame structure is designed, and compatibility between essential parameter sets is maintained as large as possible when the essential parameter sets differ from each other in accordance with various scenarios, such as the operating frequency band, service type, and cell size, so that an efficient system operation becomes possible. The essential parameter set as described above includes the subcarrier spacing, CP length, and the like.

Method for Configuring a Reference Time Unit

The subcarrier spacing and the CP length are essential parameters for OFDM transmission/reception. In order to configure the CP length, the digital wireless communication system should first configure a reference time unit (e.g., $T_s$ as described above), and the reference time unit may be related to a sampling period. With the shift of generation, the mobile communication system has been generally developed to be optimized in accordance with the purpose thereof intended to be achieved (e.g., the first generation has been developed for the purpose of analog voice communication, the second generation has been developed for the purpose of digital voice communication, and the third generation has been developed for the purpose of packet based voice/data communications) without maintaining compatibility with the previous generations. Wide-band processing has become possible with the help of digital signal processing technology developed through the generations, and since the development of the 4G LTE system, the sampling period of the LTE system has been selected to become $2^n$ (n is an integer) times 3.8 MHz that is the sampling period of the 3G broadband code division multiple access (WCDMA) system so as to make the 3G WCDMA system and the 4G LTE system easily coexist (e.g., so as to facilitate production of a 3G/4G dual modem and a 1-chip modem) in consideration of a smooth migration from the previous-generation system.

For example, a reciprocal of $T_s$ that is the reference time unit of the 20 MHz LTE system becomes 30.72 MHz, and this value is $2^3$ (=8) times 3.84 MHz. Since it is assumed that the 5G system considers the same OFDM as that of the 4G LTE or LTE-A system as a reference transmission type, there is a very high possibility that the system design will be made in a state where the reference time unit is limited to be the integer number of times, and further, $2^n$ times $T_s$ that is the LTE reference time unit, for efficient coexistence with the 3G/4G systems during the initial 5G system deployment. For example, configuration may be made so that the reference time unit of the 100 MHz 5G system becomes $$T_{s5} = \frac{1}{159.6 \text{ MHz}} \approx 6.51 \text{ ns}$$

that is 5 times shorter than the reference time unit of the 20 MHz LTE system, and the reference time unit of the 80 MHz 5G system becomes $$T_{s4} = \frac{1}{122.00 \text{ MHz}} \approx 8.14 \text{ ns}$$

that is 4 times shorter than the reference time unit of the LTE system. Such numerical values are values selected for easy design, and other values may be applied in consideration of the system compatibility.

Even the subcarrier spacing may be determined to be the integer number of times the reference subcarrier spacing, and further, it may be determined to be $2^m$ (m is a certain integer) times the reference subcarrier spacing. This is because the subcarrier spacing has a reciprocal relationship with the OFDM symbol duration, and if it is limited to $2^m$ times the reference subcarrier spacing, the FFT size can be extended in the form of $2^{-m}$. As an example, the LTE subcarrier spacing of 15 kHz may be considered as a baseline subcarrier of the NR OFDM, and if the 30 kHz subcarrier spacing is extended to be supported, the pure OFDM symbol duration excluding the 30 kHz CP may accurately be a half of the pure OFDM symbol duration excluding the 15 kHz CP.

Figure 3:
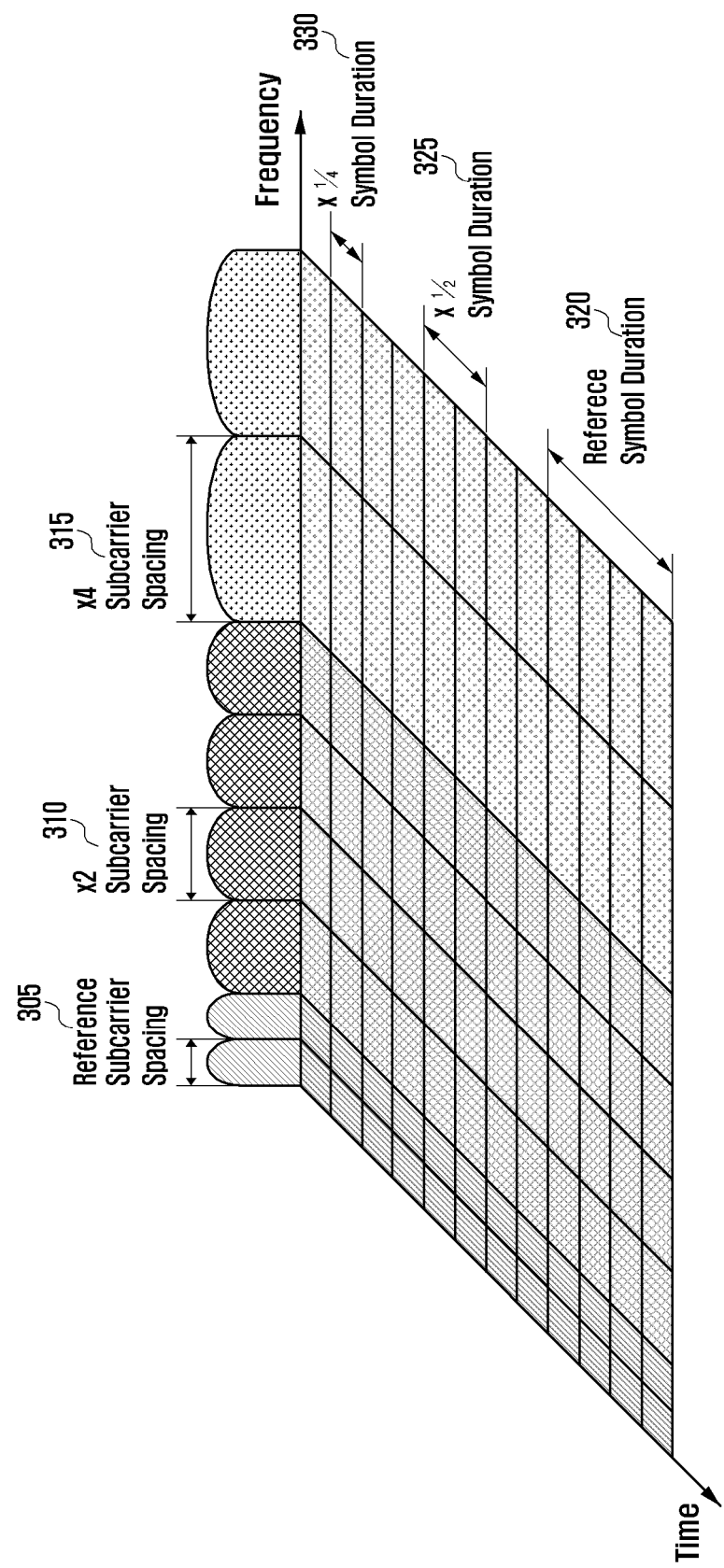
FIG. 3 is a diagram explaining that time alignment can be well performed with respect to OFDM symbols of subcarrier spacing scaled to ×2 and ×4 on the basis of a specific subcarrier spacing except for a CP according to an embodiment of the present disclosure.

FIG. 3 is a diagram illustrating OFDM symbols of a subcarrier spacing scaled twice and four times a specific subcarrier spacing according to an embodiment of the present disclosure.

Referring to FIG. 3, time alignment may be performed with respect to the OFDM symbols of the subcarrier spacing scaled twice (310) and four times (315) the specific subcarrier (305) spacing if no CP exists (e.g., 15 kHz, 30 kHz, and 60 kHz may be considered). In an embodiment, the specific subcarrier 305 may be a reference subcarrier. Because of such an advantage, configuration may be made to support the subcarrier spacings having the $2^m$ scaling relationship with the LTE subcarrier spacing, that is, subcarriers having the bands of 7.5 kHz (×½), 15 kHz(×1), 30 kHz(×2), 60 kHz(×4), 120 kHz(×8), 240 kHz(×16), and 480 kHz(×32).

In the case of the subcarrier spacing as described above, it may have symbol durations 325 and 330 that are in proportion to a reciprocal of the subcarrier spacing on the basis of the reference symbol duration 320.

The application range of the present disclosure is not limited to 15 kHz and the subcarrier spacing scaled $2^m$ (m is a certain integer) times 15 kHz, but due to the above-described reason, a reference time unit which is N times shorter than $$T_s = \frac{1}{30720000} \sec$$

that is the reference time unit of the LTE and LTE-A systems is defined as $T_{s,N}=T_s/N$. Hereinafter, explanation will be made with respect to a method for configuring time units, such as a subframe length of a scalable frame structure, slot length, OFDM subcarrier spacing, and CP length, and a method for configuring a CP length capable of achieving a time alignment between subcarrier spacings. Further, since a specific subcarrier spacing has various CP lengths, the subframe length and the slot length in association with the normal OFDM symbol number may be changed, and thus the 5G system requires definition of the subframe length and the slot length to be considered as references for each subcarrier spacing. According to the present disclosure, in the same frame structure as that of LTE on the basis of $T_{s,N}$ as described above, the length of 15 OFDM symbols in the case where no CP exists is defined as a subframe length of a reference subcarrier spacing, and in this case, the slot length is defined as a half of the subframe length. For example, in the case of N=1 (i.e., in the case of the same $T_s$ as that of LTE), if the reference subcarrier spacing is 15 kHz, the subframe length is 1 ms corresponding to the length of 15 pure OFDM symbols, and the slot length is 0.5 ms in the same manner as defined in LTE. In the case where the reference subcarrier spacing is 30 kHz, the subframe length and the slot length become twice reduced as compared with the reference subcarrier spacing of 15 kHz. That is, the subframe length becomes 0.5 ms corresponding to the length of 15 pure 30 kHz OFDM symbols, and the slot length becomes 0.25 ms. In the same manner, the subframe length of the $2^m \times 15$ kHz reference subcarrier spacing is defined as $2^{-m} \times 1$ ms, and the slot length is defined as $2^{-m} \times 0.5$ ms.

In an embodiment, the meaning of the reference subcarrier spacing may be diversely defined. That is, the reference subcarrier spacing may be a subcarrier spacing that the terminal acquired during the initial connection, a subcarrier spacing determined by the base station so that the terminal operates in consideration of this as a reference, or a subcarrier spacing that the base station considers as a reference. As described above, the reference subcarrier spacing may be differently defined in accordance with the embodiment, and respective determination methods may be mixedly used.

In an embodiment, a resource scalable time unit is called TTI, and the length of the TTI may differ in accordance with the service type. For example, the TTI for an eMBB service may be 1 ms, whereas the TTI for an ultra-reliable and low latency communication (URLLC) service may be 62.5 μs that is different from that for the eMBB. However, for an efficient system operation using such a scheduling unit, the scalable frame structure to be described in the description of the present disclosure should be set to match a time alignment unit, and even in the scalable frame structure, the system can be operated through designation of different TTIs.

Definition of Time Unit and Time Alignment

As described above, the relationship among the subcarrier spacing, the FFT size (=the number of samples corresponding to the pure OFDM symbol duration), and the subframe length has been described through $T_s$ of the LTE and LTE-A systems. Similarly, the relationship among the reference subcarrier spacing, the FFT size, and the subframe length in consideration of $2^m$ subcarrier spacing scaling in the reference time unit of the 5G system will be described. First, the baseline subcarrier spacing at $T_{s,N}$ may be defined as N×15 kHz, and based on this the subframe length $T_{sf,N,m}$ of the $2^m$ scaled reference subcarrier spacing may be defined as in mathematical expression 1.

$$T_{sfNm} = \frac{1}{N \times 2^m} \text{ms} \quad \text{Mathematical expression 1}$$

Hereafter, at the initial stage where the 5G system is introduced, at least one of coexistence with the LTE and LIE-A system and dual-mode operation is expected in a band that is equal to or lower than 4 GHz in which LTE band plan is defined, and thus the scalable frame structure of the 5G system is required to include at least one of the frame structure of the LTE and LTE-A systems and an essential parameter set. This may include configuration of the OFDM symbol duration and the CP length so as to have the relationship as in the following mathematical expression if the reference subcarrier spacing is 15 kHz.

$$T_{sf,1,0}=15 \cdot 2048 \cdot T_{s,1}=(1+14) \cdot 2048 T_{s,1}=(3+12) \cdot 2048 \cdot T_{s,1}=1 \text{ ms} \quad \text{Mathematical expression 2}$$

Here, (1+14) means that the CP length is determined to be one OFDM symbol duration, that is, 2048 samples, corresponding to the total sum of the CP lengths of 14 OFDM symbols existing within the subframe length corresponding to 15 pure OFDM symbol duration suing 2048-FFT. This is the same as a rule for determining a normal CP length having the CP ratio of 1/14 in the LTE. In the same manner, the meaning of (3+12) is the same as a rule for determining an extended CP length having the CP ratio of 1/4 in the LTE. Further, 2048 is $2^{11}$ that is a numeral easily implementing the FFT. In the case of performing $2^m$ times scaling of the reference subcarrier spacing on the basis of mathematical expression 2, the normal CP length and the extended CP length of each subcarrier spacing may be determined to have the same CP overhead as that of the LTE while the subframe length matches $2^{-m} \times 1$ ms as in mathematical expression 3.

$$T_{sf1,m} = 15 \cdot 2^m \cdot 2^{11-m} \cdot T_{s,1,0} =$$
$$2^m \cdot (1+14) \cdot 2^{11-m} \cdot T_{s,1,0} =$$
$$2^m \cdot (3+12) \cdot 2^{11-m} \cdot T_{s,1,0} = 2^{-m} \times 1 \text{ ms}$$

Mathematical expression 3

Here, $15 \cdot 2^m$ means a scaled subcarrier spacing (kHz), $2^{11-m}$ means the FFT size for the corresponding subcarrier spacing, and $2^{11-m} \cdot T_{s,1}$ means a pure OFDM symbol duration in the corresponding subcarrier spacing. That is, the OFDM symbol of the subcarrier spacing that is $2^m$ times scaled has reduced symbol duration as large as $2^m$ times. This is self-evident reason because the subcarrier spacing and the OFDM symbol duration are in a reciprocal relationship with each other. The relationship as in mathematical expression 4 is materialized with respect to the subframe length between the reference subcarrier spacings through the rule as in mathematical expression 3, and this is defined as a subframe alignment between $(2^m, 2^{m+1})$ reference subcarrier spacings.

$$T_{sf,1,m}=2T_{sf,1,m+1} \quad \text{Mathematical expression 4}$$

In other words, the subframe alignment condition between the ($2^m$, $2^{m+1}$) reference subcarrier spacings can satisfy mathematical expression 4. Since the slot length of each reference subcarrier spacing has been defined as a half of the subframe length, the slot alignment condition between the ($2^m$, $2^{m+1}$) reference subcarrier spacings is also the same as that in mathematical expression 4. Last, the TTI may be composed of the integer number of OFDM symbols, and the number thereof may be variously defined in accordance with the service type or the like. However, it is preferable that the sum of TTI lengths existing in one subframe is maintained to be the same as the subframe length. For reference, it is defined in the present disclosure that the slot and the TTI that are time units in the subframe, but it should be noted that the time unit having the above-described properties may be defined as another name. For example, in the related standardization process, the subframe length for the reference subcarrier spacing has been defined, but the clear definition for a slot, mini-slot, minimum scheduling unit, and TTI has not yet been made. However, the system can be designed through applying the subcarrier spacings as described above.

Next, the symbol alignment condition between ($2^m$, $2^{m+1}$) reference subcarrier spacings will be described. If the subcarrier spacing is twice enlarged, the symbol duration is twice reduced by the reciprocal relationship between the subcarrier spacing and the OFDM symbol duration. Accordingly, if the sum of two successive CP-OFDM symbol durations of $2^{m+1}$ reference subcarrier spacings coincides with one CP-OFDM symbol duration of $2^m$ reference subcarrier spacings, this condition may be defined as the symbol alignment between ($2^m$, $2^{m+1}$) reference subcarrier spacings. More specifically, If the same transmission reference time is configured with respect to OFDM symbols including CPs of all reference subcarrier spacings (e.g., t=0), the index of the CP-OFDM symbol of each $2^m$ reference subcarrier spacing that starts transmission on the basis of the corresponding time is defined as [m, n], and the CP-OFDM symbol duration of [m, n] is defined as $T_{CP\text{-}OFDM}[m,n]$, the symbol alignment condition between ($2^m$, $2^{m+1}$) reference subcarrier spacings may be defined as in the following mathematical expression.

$$T_{CP\text{-}OFDM}[m,n] = T_{CP\text{-}OFDM}[m+1,2n] + T_{CP\text{-}OFDM}[m+1, 2n+1] \quad (m,n \in Z) \quad \text{Mathematical expression 5}$$

Here, if it is defined that the pure OFDM symbol duration of [m, n] is $T_{OFDM}[m,n]$, and the CP length is $T_{CP}[m,n]$, a relationship expression $T_{CP\text{-}OFDM}[m,n] = T_{CP}[m,n] + T_{OFDM}[m,n]$ is materialized, and the reciprocal relationship is materialized between the subcarrier spacing and the pure OFDM symbol duration, so that a relationship expression $T_{OFDM}[m,n] = 2T_{OFDM}[m+1,n]$ is materialized. Accordingly, using the two expressions, the symbol alignment condition between ($2^m$, $2^{m+1}$) reference subcarrier spacings as in mathematical expression 5 may be expressed as only the CP length excluding the pure OFDM symbol duration as in mathematical expression 6.

$$T_{CP}[m,n] = T_{CP}[m+1,2n] + T_{CP}[m+1,2n+1] \quad (m,n \in Z) \quad \text{Mathematical expression 6}$$

Through extension of the above-described condition, a specific subcarrier spacing may be considered as a reference, and if it is assumed that the CP length of the reference subcarrier spacing corresponding to the symbol index n is $T_{CP,base}[n]$ and the CP length of the positive integer N times subcarrier spacing is $T_{CP,N}[n]$, the symbol alignment condition between the reference subcarrier spacing and the N times subcarrier spacing may be expressed as in mathematical expression 7.

$$T_{CP,base}[n] = \sum_{k=0}^{N-1} T_{CP,N}[Nn+k] \quad \text{Mathematical expression 7}$$

Hereinafter, a method for designing a CP length pattern capable of satisfying the symbol/slot/subframe alignment will be described.

First, a method for designing a pattern for a CP length is proposed, which can satisfy the symbol/slot/subframe alignment condition while following the definition of the slot length and the subframe length of $2^m \times 15$ kHz reference subcarrier spacing on the basis of $T_{s,1}$ as described above is proposed. This is the same subject as searching for the CP length that simultaneously satisfies the mathematical expressions 3 and 6. Since there exist innumerable CP lengths that satisfy the corresponding expressions in a real number range, the range of such CP lengths could be narrowed in consideration of efficiency of system operation and ease of implementation. Additional rules that are applied to configure the CP length even in the LTE/LTE-A system are enumerated as follows.

(1) The CP length is limited to the integer number of samples on the basis of $T_s$.

(2) The number of kinds of CP lengths of respective OFDM symbols in a subframe is reduced as much as possible, and the difference in CP length is minimized (e.g., in the LTE/LTE-A system, there are two kinds of CP lengths in a normal CP, whereas all symbols have the same CP length in an extended CP. In the normal CP, the difference between two kinds of CP lengths is $(160-144)T_s$.

(3) The number of CP samples on the basis of $T_s$ is configured to have factor 2 as many as possible through prime factorization so that the bandwidth can be scaled through adjustment of the FFT size.

For example, the numbers of normal CP samples are 160 and 144, and through prime factorization, 160 becomes $160=2^5 \times 5$, and 144 becomes $144=2^4 \times 3^2$. Since the greatest common measure of two numbers is 24, the number of times capable of decreasing the bandwidth by two times while maintaining the integer number of samples is four times in total. This means that the CP length of the integer number of samples can be maintained even if down-sampling is done to reach 10 MHz-bandwidth/1024-FFT/15.36 MHz, 5 MHz-bandwidth/512-FFT/7.68 MHz, 3 MHz-bandwidth/256-FFT/3.84 MHz, and 1.4 MHz-bandwidth/128-FFT/1.92 MHz by continuously reducing the sampling rate of the 20 MHz-bandwidth/2048-FFT/30.72 MHz system to half. For example, the numbers of normal CP samples of the 128-FFT LTE system are 10 and 9. If the down-sampling is performed further than that as described above, the OFDM symbols are unable to be expressed at sampling intervals to cause a time synchronization problem.

(4) The normal CP has a slot unit, that is, 7-symbol periodicity (in the case of an extended CP, all CP lengths are equal to each other, and the extended CP may be considered to have 1-symbol periodicity at minimum).

Accordingly, even in the scalable frame structure supporting $2^m \times 15$ kHz reference subcarrier spacing, it is preferable to satisfy the above-described rule for each subcarrier spacing from the viewpoint of compatibility with the LTE and easy implementation.

First, a method for determining a CP length will be hereinafter described, in which the symbol/slot/subframe alignment is possible while following the above-described rule with respect to an extended CP having the CP ratio of 1/4 in the scalable frame structure supporting $2^m \times 15$ kHz reference subcarrier spacing. As the most intuitive method, it may be considered to control the CP length in the ratio of $2^{-m}$ during $2^m$ scaling on the basis of the extended CP length of the 15 kHz subcarrier spacing of the LTE/LTE-A. As described above, the extended CP length of the LTE/LTE-A corresponds to 512 $T_s$, that is, 29 integer samples. Accordingly, in the case of scaling the subcarrier spacing as much as $2^m$, both the symbol duration and the CP length can be accurately reduced $2^m$ times, and both the symbol durations and the CP lengths become equal to each other for each subcarrier spacing to satisfy mathematical expressions 3 and 6. That is, in the case of the extended CP, the symbol/slot/subframe alignment can be easily performed.

FIG. 4 is a diagram illustrating a scalable frame structure in which the symbol/slot/subframe are aligned during scaling of the subcarrier spacing up to 4 times downward and 16 times upward on the basis of the LTE/LTE-A 15 kHz according to an embodiment of the present disclosure.

Referring to FIG. 4, frame structures of a plurality of subcarriers 405, 410, 415, 420, 425, 430, and 435 that are scaled on the basis of an LTE subcarrier 415 are illustrated. Numerals attached to respective subcarrier spacings correspond to OFDM symbol indexes included in one slot. A horizontal length of each index block means one CP-OFDM symbol duration obtained by adding one CP length and a pure OFDM symbol duration to each other, and it is equal to the value $T_{CP-OFDM}[m,n]$ as defined above. As the subcarrier spacing is scaled by two times from 3.75 kHz to 120 kHz, it can be confirmed that the subframe length is reduced by two times from 4 ms to 0.125 ms, and the slot length is also reduced by two times from 2 ms to 62.5 ms. Since all the CP-OFDM symbol durations are equal to each other for each subcarrier spacing, periodicity for a CP pattern may be "1". Such properties are all extendable with respect to a normal $2^m$ subcarrier spacing scaling, and satisfy all CP conditions ①, ②, and ④ as described above for each subcarrier spacing. With respect to condition ③, the extended CP length of the subcarrier 15 kHz is $512T_s$ and has 9 factors 2, the CP length having the integer number of samples can be maintained even if the subcarrier spacing is scaled up to $2^9$ times (i.e., 15 kHz$\times 2^9$=7.68 MHz). In other words, during scaling of the bandwidth through adjustment of the FFT size, the minimum FFT size for maintaining the CP length having the integer number of samples may become very small, and thus it can be known that not only the subcarrier spacing scalability but also bandwidth adjustment scalability can be excellent.

Next, a method for determining a CP length will be hereinafter described, in which the symbol/slot/subframe alignment is possible while following the above-described rule with respect to a normal CP having the CP ratio of 1/14 in the scalable frame structure supporting $2^m \times 15$ kHz reference subcarrier spacing.

In the case of the normal CP, different from the extended CP, when the CP length is adjusted as much as $2^{-m}$ during $2^m$ scaling on the basis of the extended CP length of 15 kHz subcarrier spacing of the LTE/LTE-A, mathematical expression 6 for the symbol alignment can be satisfied with respect to m>1, but mathematical expression 3 for the subframe alignment cannot be satisfied with respect to m>1. The reason is that the CP pattern of the LTE/LTE-A has the 7-symbol periodicity of (L, S, S, S, S, S, S) (here, L means a CP having the length of $160T_s$ corresponding to a longer CP in a normal CP, and S means a CP having the length of $144T_s$ corresponding to a shorter CP), and if the CP length is reduced simply in the form of 2-m during scaling of the subcarrier spacings by two times to 30 kHz and 60 kHz, the CP pattern becomes a pattern having a 14-symbol periodicity in the form of (L, L, S, S, S, S, S, S, S, S, S, S, S, S) in the case of 30 kHz, whereas the CP pattern becomes a pattern having a 28-symbol periodicity in the form of (L, L, L, L, S, S, S, S, S, S, S, S, S, S, S, S, S, S, S, S, S, S, S, S, S, S, S, S). As described above, in accordance with the subframe length alignment condition, it is required to obtain accurately $2^{-m}$ ms through addition of the 14-symbol duration for each reference subcarrier spacing. However, from 60 kHz, due to the 28-symbol periodicity, if the fore 14-symbol duration is added, the CP length becomes larger than 0.25 ms, whereas if the back 14-symbol duration is added, the CP length becomes smaller than 0.25 ms to violate the subframe length alignment condition. In the mmWave band or in a small cell supporting low latency, there is a high possibility that the subcarrier spacing, such as 60 kHz or 120 kHz, becomes a reference subcarrier spacing that becomes a reference for system operation, and such uneven subframe lengths may be an obstacle to the time alignment performed by the base station and the terminal.

First, in reflecting the subframe alignment condition in a pattern or sequence for the CP length, it can be known that the length of a slot (7-symbol)/subframe (14-symbol) becomes constant if the sequence for the CP length of each subcarrier spacing has the 7-symbol periodicity. As described above, as the number of kinds of different CP lengths becomes larger, implementation becomes more advantageous, and thus it is preferable to use maximally two kinds of CP lengths. In accordance with embodiments, two or more kinds of CP lengths may be taken, but even in this case, it is necessary to perform symbol-unit alignment on time. With such a condition, a sequence for the CP length having the 7-symbol periodicity is first derived. If the two different lengths are L and S, as combinations having the sequence length of "7", sequences in which 1L and 6S, 2L and 5S, and 3L and 4S are selected and enumerated may be considered (here, in the case where 4L and 3S, 5L and 2S, or 6L and 1S are selected, they can be enumerated in the same manner with changes of L and S to each other, and explanation thereof will be omitted). Sequences satisfying mathematical expression 6 that is the symbol alignment condition expression among the above-described sequences are derived as in table 1. More specifically, table 1 shows a CP length pattern sequence list (in which total 42 sequences exist in consideration of even a case where L and S are flipped) satisfying the symbol alignment condition between subcarrier spacings that are scaled by $2^m$ (m is a certain integer) and have the 7-symbol periodicity and two different lengths L and S only.

TABLE 1

| No. | Sequence in case of m = 3 k | Sequence in case of m = 3 k + 1 | Sequence in case of m = 3 k + 2 |
|---|---|---|---|
| 1 | (L, S, S, S, S, S, S) | (L, L, S, L, S, L, S) | (L, S, S, L, S, S, S) |
| 2 | (S, L, S, S, S, S, S) | (L, S, L, L, S, L, S) | (L, S, S, S, L, S, S) |
| 3 | (S, S, L, S, S, S, S) | (L, S, L, S, L, L, S) | (S, L, S, S, L, S, S) |
| 4 | (S, S, S, L, S, S, S) | (L, S, L, S, L, S, L) | (S, L, S, S, S, L, S) |
| 5 | (S, S, S, S, L, S, S) | (S, L, L, S, L, S, L) | (S, S, L, S, S, L, S) |
| 6 | (S, S, S, S, S, L, S) | (S, L, S, L, L, S, L) | (S, S, L, S, S, S, L) |
| 7 | (S, S, S, S, S, S, L) | (S, L, S, L, S, L, L) | (S, S, S, L, S, S, L) |
| 8 | (L, L, S, L, S, L, S) | (L, S, L, S, L, S, S) | (L, S, S, S, S, S, S) |
| 9 | (S, L, L, S, L, S, L) | (S, S, L, S, L, S, S) | (S, S, S, S, L, S, S) |
| 10 | (L, S, L, L, S, L, S) | (L, S, S, L, S, S, S) | (S, L, S, S, S, S, S) |
| 11 | (S, L, S, L, L, S, L) | (S, S, L, S, S, S, L) | (S, S, S, S, S, L, S) |
| 12 | (L, S, L, S, L, L, S) | (S, L, S, S, L, S, S) | (S, S, L, S, S, S, S) |

TABLE 1-continued

| No. | Sequence in case of m = 3 k | Sequence in case of m = 3 k + 1 | Sequence in case of m = 3 k + 2 |
|---|---|---|---|
| 13 | (S, L, S, L, S, L, L) | (S, S, S, L, S, S, L) | (S, S, S, S, S, S, L) |
| 14 | (L, S, L, S, L, S, L) | (S, L, S, S, S, L, S) | (S, S, S, L, S, S, S) |
| 15 | (L, S, S, L, S, S, S) | (L, S, S, S, S, S, S) | (L, L, S, L, S, L, S) |
| 16 | (S, L, S, S, L, S, S) | (S, S, L, S, S, S, S) | (L, S, L, S, L, L, S) |
| 17 | (S, S, L, S, S, L, S) | (S, S, S, S, L, S, S) | (S, L, L, S, L, S, L) |
| 18 | (S, S, S, L, S, S, L) | (S, S, S, S, S, S, L) | (S, L, S, L, S, L, L) |
| 19 | (L, S, S, S, L, S, S) | (S, L, S, S, S, S, S) | (L, S, L, L, S, L, S) |
| 20 | (S, L, S, S, S, L, S) | (S, S, S, L, S, S, S) | (L, S, L, S, L, S, L) |
| 21 | (S, S, L, S, S, S, L) | (S, S, S, S, S, L, S) | (S, L, S, L, L, S, L) |

In table 1, it can be known that the first, eighth, and 15$^{th}$ sequence sets are sequence sets obtained by circularly shifting three kinds of sequences existing in the sets, and the first to seventh sequence sets are sequence sets obtained by circularly shifting again sequence elements in the sets. Further, if elements in m=3k sequences are circularly shifted as much as n (n=1, 2, 3, 4, 5, 6, and 7), it can be known that m=3k+1 sequences are circularly shifted as much as 2n, and m=3k+2 sequences are circularly shifted as much as 4n. For example, if (L, S, S, S, S, S, S) is circularly shifted by "1" in the first sequence set, it becomes (S, L, S, S, S, S, S), and this becomes the first sequence of the second sequence set. In this case, (L, L, S, L, S, L, S) of the first sequence set becomes (L, S, L, L, S, L, S) circularly shifted by "2" in the second sequence set, and (L, S, S, L, S, S, S) of the first sequence set becomes (L, S, S, S, L, S, S) circularly shifted by "4" in the second sequence set.

If the CP length pattern is circularly used along m=3k, m=3k+1, and m=3k+2 in accordance with the rule of table 1 during scaling of the subcarrier spacing by 2m through selection of one of sequence sets in table 1, the symbol alignment and the subframe alignment can be simultaneously satisfied even in the case of a normal CP having the CP ratio of 1/14.

Figure 5:
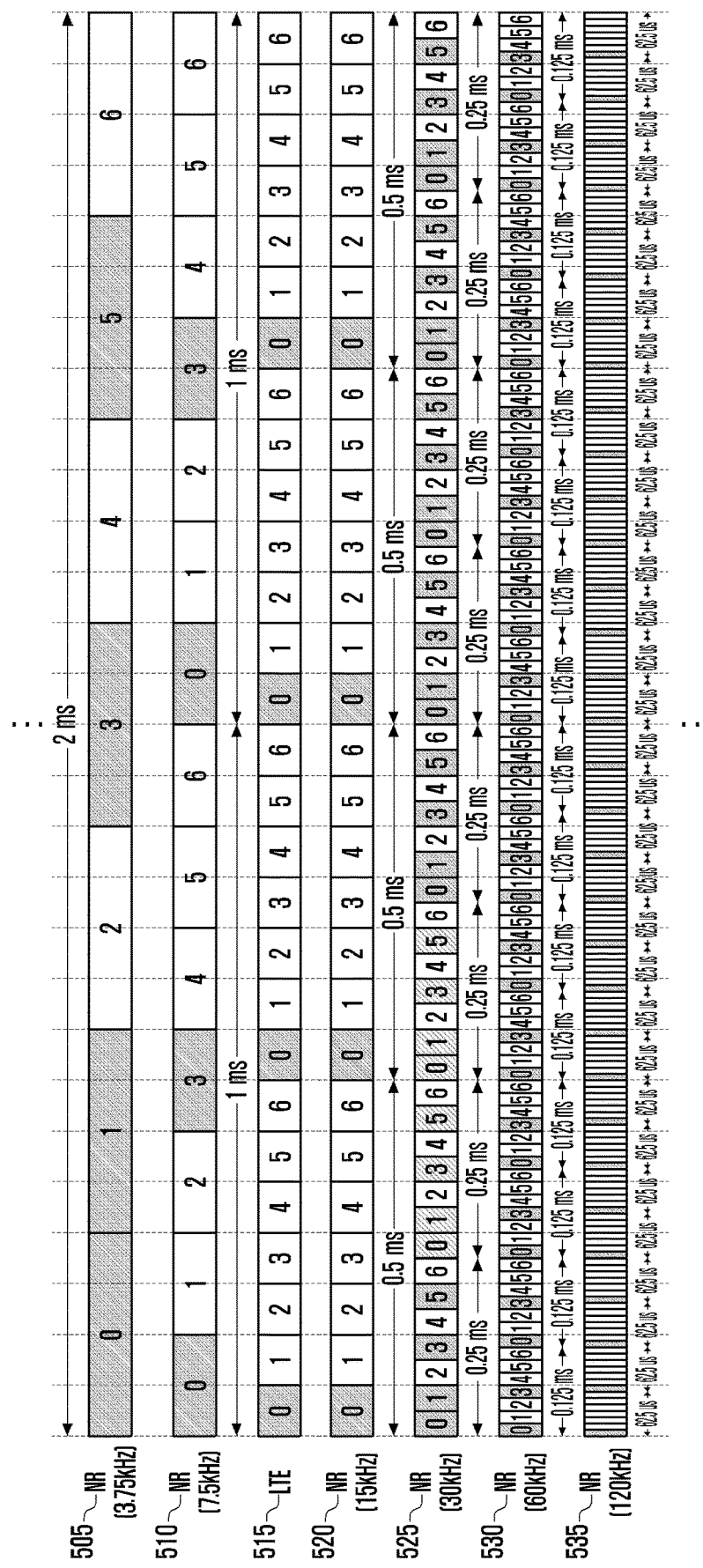
FIG. 5 is a diagram illustrating an example of a frame structure that satisfies a normal CP length based symbol/slot/subframe alignment having a CP ratio of 1/14 with respect to certain $2^m$ reference subcarrier spacings on the basis of 15 kHz according to an embodiment of the present disclosure.

FIG. 5 is a diagram illustrating an example of a scalable frame structure that satisfies a symbol/slot/subframe alignment during scaling of the subcarrier spacing by $2^m$ while maintaining compatibility with the LTE/LTE-A in the case of a normal CP having a CP ratio of 1/14 according to an embodiment of the present disclosure.

Referring to FIG. 5, frame structures of a plurality of subcarriers 505, 510, 515, 520, 525, 530, and 535 that are scaled on the basis of an LTE subcarrier 515 are illustrated. A dark gray block (e.g., indexes 0 and 1 in the subcarrier 505) means one CP-OFDM symbol duration using a longer CP length in a normal CP, and other blocks mean one CP-OFDM symbol duration using a shorter CP length in the normal CP. This may be obtained by selecting a first sequence set in table 1, and scaling $2^m$ subcarrier spacing on the basis of the first sequence (L, S, S, S, S, S) in the set in consideration of the first sequence as a CP length pattern of 15 kHz subcarrier spacing. Through this, a normal CP of the 15 kHz subcarrier spacing of new radio (NR) access technology becomes the same as a normal CP length pattern of the LTE/LTE-A to be able to maintain compatibility with the LTE/LTE-A.

Now, it is intended to reflect elements additionally considered in determining the CP length in the LTE/LTE-A even in a scalable frame structure for the 5G system. Among four consideration elements (i.e., conditions ①, ②, ③ and ④) in the LTE/LTE-A as described above, condition ④ has been satisfied. In order to satisfy condition ①, it is necessary that two times the sum of elements of 7-symbol periodicity sequences in the sequence set becomes the integer number of pure OFDM symbol durations as indicated in mathematical expression 3, that is, the integer number of FFT sizes of $2^n$ on the basis of $T_{s,1,m}$ and in order to maintain the CP ratio of 1/14, the length should be accurately as large as the FFT size. This may be expressed as in mathematical expression 8 below.

$$Lp+Sq-2^n (L,S,p,q,n \in M, p+q=7) \quad \text{Mathematical expression 8}$$

Since the sequences in the sequence set in table 1 are all circularly shifted sequences with respect to three sequences in the first sequence set, a natural number solution that satisfies mathematical expression 8 with respect to the first sequence set may be applied to all sequence sets in table 1. Here, in additional consideration of the conditions ② and ③, the smallest natural number solution that satisfies mathematical expression 8 and has the smallest difference between L and S is searched for to determine the natural number solution as a normal CP pattern of the corresponding subcarrier spacing, and $2^n$ values at this time are selected as FFT sizes supporting the minimum bandwidth.

For example, if the solution of the above-described conditions is searched for with respect to (L, S, S, S, S, S, S) that is a sequence in the case of m=3k in the sequence set in table 1, the solution in which L=2, S=1, and n=3 in the situation of p=1 and q=6 can be searched for ($2\times1+1\times6=2^3$). In the same manner, if the solution of the above-described conditions is searched for with respect to (L, S, S, L, S, S, S) that is a sequence in the case of m=3k+2, the solution in which L=3, S=2, and n=4 in the situation of p=2 and q=5 can be searched for in the situation of p=2 and q=5 ($3\times2+2\times5=2^4$). The integer number of sequences as described above is entirely enumerated as in table 2. More specifically, table 2 indicates an example of a natural number sequence that satisfies mathematical expression 8 and has the smallest difference between L and S (i.e., L−S=1) with respect to the first sequence set in table 1.

TABLE 2

| Natural number sequence | Corresponding sequence |
|---|---|
| (2, 1, 1, 1, 1, 1, 1) | (L, S, S, S, S, S, S) |
| (3, 2, 2, 3, 2, 2, 2) | (L, S, S, L, S, S, S) |
| (5, 5, 4, 5, 4, 5, 4) | (L, L, S, L, S, L, S) |
| (10, 9, 9, 9, 9, 9) | (L, S, S, S, S, S, S) |
| (19, 18, 18, 19, 18, 18, 18) | (L, S, S, L, S, S, S) |
| (37, 37, 36, 37, 36, 36, 36) | (L, L, S, L, S, L, S) |
| (74, 73, 73, 73, 73, 73, 73) | (L, S, S, S, S, S, S) |
| (147, 146, 146, 147, 146, 146, 146) | (L, S, S, L, S, S, S) |
| . . . Infinite generation is possible using mathematical expression 6 | . . . |

Now, a CP pattern for a scalable frame structure using a normal CP having the CP ratio of 1/14 with respect to $2^m$ subcarrier spacing capable of maintaining compatibility with the LTE/LTE-A can be derived through table 2, and mathematical expression 6. The FFT size that is used in 1.4 MHz that is the minimum support system band size of the LTE/LTE-A of 15 kHz subcarrier spacing is 128, and in this case, a normal CP length is $2^4$=16 times down-sampled on the basis of 20 MHz/2048-FFT/$T_s$ to correspond to 10 samples and 9 samples on the basis of 1.4 MHz/128-FFT/$16T_s$ and this is the same as the sequence (10, 9, 9, 9, 9, 9, 9) in table 2 ($10\times2+9\times12=128$). The $2^m$ subcarrier spacing scheduling is performed on the basis of this sequence, and in accordance with the circular shift rule in mathematical expression 6 or table 1, the sequence becomes (5, 5, 4, 5, 4, 5, 4) on the basis of 1.4 MHz/64-FFT/$16T_s$ in the case of 30 kHz (5×8+4×6=64), and the sequence becomes (3, 2, 2, 3, 2, 2, 2) on the basis of 1.4 MHz/32-FFT/16$T_s$ in the case of 60 kHz (3×4+2×10=32). In an opposite direction, the sequence becomes (19, 18, 18, 19, 18, 18, 18) on the basis of 1.4 MHz/256-FFT/16$T_s$ the case of 7.5 kHz (19×4+18×12=256), and the sequence becomes (37, 37, 36, 37, 36, 37, 36) on the basis of 1.4 MHz/512-FFT/16$T_s$ in the case of 3.75 kHz (37×8+36×6=512). As described above, it is possible to configure the CP length to match the minimum system bandwidth and the reference time unit (such as the sampling rate), and in the case of scaling the bandwidth two times or four times, all the CP length sequences can be grown two times or four times in the same manner.

If it is considered to match the CP length with the integer number of times the reference time unit, the minimum system bandwidth that can be supported for each subcarrier spacing may differ. In the example as described above, if the subcarrier spacing is 120 kHz, the sequence becomes (2, 1, 1, 1, 1, 1, 1) to reach the minimum natural number sequence, and thus the CP length having the integer number of samples on the basis of 16$T_s$ is unable to be generated with respect to the subcarrier spacing, such as 240 kHz or 480 kHz, that is larger than the subcarrier spacing of 120 kHz. Accordingly, although an upper limit of the subcarrier spacing in which the symbol/slot/subframe alignment is possible while maintaining compatibility with the LTE/LTE-A is up to 120 kHz, the CP length difference reaches up to two times (2=1×2), and there may be a difficulty in performing the system operation.

FIG. 6A is a diagram illustrating a scalable frame structure of up to 60 kHz subcarrier spacing in which the symbol/slot/subframe alignment is possible while maintaining compatibility with the LTE/LTE-A, and FIG. 6B is a diagram illustrating a scalable frame structure in which the symbol/slot/subframe alignment is made when an additional scaling is performed on the basis of the 60 kHz CP pattern of FIG. 6A according to an embodiment of the present disclosure.

Referring to FIGS. 6A and 6B, frame structures of a plurality of subcarriers 605, 610, 615, 620, 625, 630, 635, 640, 645, and 650 that are scaled on the basis of an LTE subcarrier 615 are illustrated.

In this structure, with respect to all subcarrier spacings in the form of $2^m$×15 kHz up to 60 kHz, the CP length of the integer number of samples is maintained in the same manner as the LTE/LTE-A, and the minimum system bandwidth may be lowered to 1.4 MHz. However, as described above, the CP length of 240 kHz or 480 kHz is unable to make the CP of the integer number of samples on the basis of 16$T_s$.

FIG. 7 illustrates a scalable frame structure that forms a symbol/slot/subframe alignment with respect to 3.75 kHz, 7.5 kHz, 15 kHz, 30 kHz, and 60 kHz using the fourth sequence set in table 1 while breaking compatibility with LTE according to an embodiment of the present disclosure.

Referring to FIG. 7, a frame structure of a plurality of subcarriers 705, 710, 715, 720, and 725 is illustrated.

In an embodiment, the corresponding frame structure is featured so that symbol durations are symmetrical about the third symbol with respect to all subcarrier spacings. Through this, a reference signal (RS) is uniformly arranged, and thus when interpolation is performed during channel estimation, estimation performance can be improved due to symmetry of the CP lengths. Further, using the uniformly arranged long symbol locations, a start point of a short TTI that is shorter than the subframe length or a start point of a control channel through which a terminal should perform blind reception can be recognized. In the embodiment as described above, since symbol durations are time-symmetrical about the third symbol in each subcarrier, a reference signal (RS) deployment and channel estimation can be performed on the basis of this.

As described above, in order to satisfy the CP length condition of the integer number of samples in the given reference time unit, the range of the subcarrier spacing that simultaneously satisfies the symbol/slot/subframe alignment conditions may be limited. Accordingly, it is not possible to accommodate all $2^m$ subcarrier spacings in one carrier frequency. Further, if the subcarrier spacings differ from each other for respective frequency bands, interference may not occur even if two systems that operate in different frequency bands do not satisfy the symbol/slot/subframe alignment. Accordingly, rather than making a scalable frame structure that satisfies the symbol/slot/subframe alignment conditions with respect to all $2^m$ subcarrier spacings, it may be preferable to make a scalable frame structure so as to satisfy the symbol/slot/subframe alignment conditions since subcarrier spacings existing in one subcarrier spacing set can be simultaneously used in one carrier frequency in a state where the types of subcarrier spacings that can be used in one carrier frequency are somewhat limited, and several supportable subcarrier spacing type sets are made in consideration of various situations, such as service types, cell deployment, and frequency bands, so that an operator can select them. For example, as illustrated in FIG. 6A, the subcarrier spacing set to be used in a sub-6 GHz band may be limited to {3.75 kHz, 7.5 kHz, 15 kHz, 30 kHz, 60 kHz} to be operated, and the subcarrier spacing set of {60 kHz, 120 kHz, 240 kHz, 480 kHz} or {75 kHz, 150 kHz, 300 kHz, 600 kHz} may be operated in a mmWave band. In this case, the symbol/slot/subframe alignment may be performed between the subcarrier spacings in the subcarrier spacing set. In the above-described example in which a numerology set of {3.75 kHz, 7.5 kHz, 15 kHz, 30 kHz, 60 kHz} is used in the sub-6 GHz band and a numerology set of {60 kHz, 120 kHz, 240 kHz, 480 kHz} is used in the above-6 GHz (mmWave) band, in the case of 60 kHz subcarrier spacing included in each numerology set with the same value, the CP patter, the same CP pattern or a different CP pattern may be used. For example, the frame structure of the 60 kHz subcarrier spacing having a normal CP pattern as shown in FIG. 6A may be equally used regardless of the frequency band, and in the 60 kHz subcarrier spacing in the mmWave band numerology set as shown in FIG. 10, the symbol/slot/subframe alignment in the numerology set may be sought through configuration of a CP pattern that is different from the CP pattern as shown in FIG. 6A. As described above, since a plurality of subcarriers are tied to constitute a set and subcarriers in the set are temporarily aligned in at least one unit of a symbol, slot, and subframe, adjacent cells may use the subcarriers in the same set, and cells apart from each other may use the subcarriers in different sets, thereby achieving efficient communications.

Since there is almost no advantage that can be obtained through unreasonably performing a time alignment up to in a symbol unit if the frequency bands are different from each other, sufficient system performance efficiency can be obtained by easily satisfying the CP lengths of the integer number of samples having great limitations through setting of a new reference time unit to match each frequency band and by performing the time alignment to the extent of several bundles of subframes in consideration of co-scheduling between the frequency bands. For example, in accordance with the subframe length defined in mathematical expression 1, the time alignment can be always made on the basis of 1 ms. Further, in consideration of the broadband, such as mmWave, the scalable frame structure that forms the symbol/slot/subframe alignment proposed up to now can be used as it is in the subcarrier spacing set having a broad subcarrier spacing on the basis of a new time unit (at least shorter than LTE/LTE-A).

FIG. 8 illustrates a scalable frame structure in which 75 kHz (N=5) defined in mathematical expression 1 is determined as a reference subcarrier spacing to be used in the mmWave band and a symbol/slot/subframe (0.2 ms) alignment is made with respect to all $2^m \times 75$ kHz subcarrier spacings, and FIG. 9 illustrates an example of a frame structure that satisfies a normal CP length based symbol/slot/subframe alignment having a CP ratio of 1/14 with respect to subcarrier spacings of 150 kHz and 300 kHz that can be applied to a mmWave band on the basis of 75 kHz with 0.2 T_s according to an embodiment of the present disclosure.

FIG. 9 illustrates a frame structure of a plurality of subcarriers 805, 810, 815, 820, 825, and 830, and FIG. 9 illustrates a frame structure of a plurality of subcarriers 905, 910, and 915 according to an embodiment of the present disclosure.

In the same manner as described above, a pattern corresponding to the CP pattern that was used in {15 kHz, 30 kHz, 60 kHz} of FIG. 6A may be used in consideration of the symbol/slot/subframe alignment only in the limited subcarrier spacings of {75 kHz, 150 kHz, 300 kHz} (905, 910, 915) as in FIG. 9 in consideration of the constraint condition of the integer number of CP samples. Based on the 75 kHz/2048-FFT/0.8$T_s$ (i.e., 1/153.6 MHz), the number of CP samples is 160 in the case of a long CP, and it is 144 in the case of a short CP, which are the same as the sample numbers on the basis of 15 kHz/2048-FFT/$T_s$. In this case, although symbol alignment is unable to be achieved between the {75 kHz, 150 kHz, 300 kHz} subcarrier spacing set and the {15 kHz, 30 kHz, 60 kHz} subcarrier spacing set, the 15 kHz subframe length becomes 1 ms through tying of 5 subframes of 75 kHz, so that the time alignment in the unit of 1 ms can be achieved, and the scheduling can be performed based on this.

FIG. 10 illustrates, different from FIGS. 6A and 6B, a frame structure in which the reference time unit is set as 60 kHz/2048-FFT/0.25$T_s$ with respect to {60 kHz, 120 kHz, 240 kHz} subcarrier spacings to be used for the mmWave band without compatibility with the LTE/LTE-A, and the CP length pattern of {15 kHz, 30 kHz, 60 kHz} in FIG. 6A is applied as it is.

Referring to FIG. 10, a fame structure of a plurality of subcarriers 1005, 1010, and 1015 is illustrated. In this case, the number of CP samples of 60 kHz becomes 160/144 that is the same as that of the LTE/LTE-A according to an embodiment of the present disclosure.

FIG. 25 illustrates a frame structure satisfying a symbol/0.5 ms alignment with respect to $15 \times 2^m$ kHz (m is a non-negative integer) subcarrier spacings, in which a normal CP is made by performing $2^{-m}$ scaling of a short CP (corresponding to $144T_s$) in an LTE normal CP with respect to $2^m$ scaling subcarrier spacings, such as 30 kHz and 60 kHz, while maintaining compatibility with the LTE/LTE-A on the basis of 15 kHz subcarrier spacing in a state where the symbol/slot/subframe alignment is not simultaneously satisfied with respect to all subcarrier spacings intended to be supported in the system, and a long CP is made by adding residual $16T_s$ to the first symbol only in the period of 0.5 ms (LTE slot, 7-symbol). In an embodiment, an LTE normal CP may be a CP having a size typically used in the LTE and LTE-A, but is not limited thereto, and a partial modification thereof may be possible. Further, in an embodiment, the residual $16T_s$ value may be called an offset value, and by applying a CP pattern in accordance with the offset value, symbol alignment may be performed for each subcarrier spacing on the basis of the period of 0.5 ms. In this case, as compared with the frame structures in FIGS. 6A and 6B, alteration of the long CP/short CP is reduced, and when a terminal removes the CP and takes the FFT, it is possible to change the timing configuration only in the unit of 0.5 ms to reduce the terminal implementation complexity. However, since a 14-symbol duration is not uniform in each subcarrier spacing, the time unit, such as a subframe, may be defined only on the basis of the 15 kHz subcarrier spacing, and in other subcarrier spacings, the time synchronization configuration may be performed with reference to this time unit. In the drawing, a CP structure proposed in the embodiment with respect to the subcarrier spacings of 15 kHz, 30 kHz, and 60 kHz is illustrated, and the symbol alignment can be performed at a point indicated in the drawing.

Since various subcarrier spacing sets to which the same CP pattern can be applied are supported and the integer number of times scaling is supported on the basis of the reference time unit of 15 kHz, the system operation becomes possible without great change of the frame structure even in accordance with the frequency band and the support bandwidth size, and thus the complexity of the system implementation can be greatly lowered even with securing the flexibility/extension on the frame structure.

Hereinafter, a method for designing a CP length pattern that can satisfy the same cell coverage for each subcarrier spacing will be described.

In the scalable frame structure of the 5G system as described above, time alignment between the subcarrier spacings may be regarded as important with the same CP overhead. On the other hand, it is also necessary to consider a method for making the same coverage at one transmission point by maintaining the same or similar absolute CP length with a different CP overhead for each subcarrier spacing for various cell deployment scenarios. As an example, a certain communication service provider may desire to maintain the same cell coverage as that of the LTE/LTE-A through installation of a 5G base station together at a base station site of the LTE/LTE-A at an initial stage of 5G entrance. In this case, it is required to consider a scalable frame structure having a similar CP length to the normal CP length of the LT/LTE-A with respect to the subcarrier spacings of 30 kHz and 60 kHz to be newly operated for the 5G base station/terminal. In an embodiment, in the case of the same coverage, it may include the same coverage of a signal to which each subcarrier spacing is applied or a coverage that is within a predetermined range. An example of the predetermined range may be 90 to 110% coverage range of the signal to which a specific subcarrier spacing is applied, but the numerical value of the range may be variable.

First, a frame structure of 30 kHz and 60 kHz having completely the same CP length as that of a normal CP of the LTE is designed. Since the CP design conditions ①, ②, and ③, such as the condition of the integer number of samples in the above-described reference time unit and two or less CP types, are still important (the condition ④ is a feature for achieving the CP ratio of 1/14, and may not be considered hereinafter), mathematical expression 8 may be extended as follows so as to obtain the solution for a normal CP ratio.

$$Lp+Sq=x2^n (L,S,p,q,n,x,y \in N, p+q=15y-x) \quad \text{Mathematical expression 9}$$

More specifically, this expression means that it is intended to divide a duration of x-numbered pure OFDM symbols in a duration corresponding to y times 15 pure OFDM symbols having no CP into CP lengths of (15y−x)-numbered OFDM symbols using L and S p times and q times, respectively. The numeral "15" is generated in consideration of a time unit $T_s$ on the basis of 15 kHz. If a different subcarrier spacing is used as a reference, mathematical expression 9 may be changed accordingly.

As described above, since it is desired to bring the normal CP length of the LTE/LTE-A as it is, L and S become L=10 and S=9 on the basis of 15 kHz/1.4 MHz/128-FFT/16$T_s$. In this case, since 64-FFT may be used for 30 kHz and 32-FFT may be used for 60 kHz, n becomes 6 and 5, respectively. Solutions of p, q, x, and y that satisfy them may be p=11, q=2, x=2, and y=1 in the case of 30 kHz, and 11 symbols having a CP of length 10 and 2 symbols having a CP of length 9 are provided. In this case, total 13 symbols may make time alignment with the LTE/LTE-A 15 kHz frame structure with periodicity of 15×64×16$T_s$, that is, in the unit of 0.5 ms, and at this time, the CP ratio is 2/13, and the time overhead is 2/(2+13)=2/15. In the same manner, in the case of 60 kHz, solutions may be p=17, q=6, x=7, and y=2, and 17 symbols having a CP of length 10 and 6 symbols having a CP of length 9 are provided. In this case, total 23 symbols may make time alignment with the LTE/LTE-A 15 kHz frame structure with periodicity of 30×32×16$T_s$, that is, in the unit of 0.5 ms, and at this time, the CP ratio is 7/23, and the time overhead is 7/(7+23)=7/30. In this case, since patterns of a long symbol and a short symbol are not unique (in the case of 30 kHz, the number of cases becomes $_{11}C_2$, and in the case of 60 kHz, the number of cases becomes $_{23}C_7$), long CP symbols that are relatively stronger in multi-path fading may be deployed in OFDM symbol indexes in which a control channel or RS is to be located within the 0.5 ms periodicity in consideration of the implementation complexity (reduction of the number of times of alternation as many as possible) and a self-contained subframe structure. As described above, the deployment of the long CP symbols can be adjusted on the basis of the king of information being transmitted. In the case of the control information, scheduling may be performed so that it is preferentially deployed in the long CP symbol. As described above, by deploying information that requires securing of reliability in the long CP symbol, more effective signal transmission becomes possible.

FIG. 11 is a diagram illustrating a scalable frame structure in which a long CP symbol is deployed in first and second symbols in which a front-loaded RS and downlink control channel are deployed in consideration of a self-contained subframe structure in the unit of 0.5 ms, a protection time domain in consideration of a downlink and an uplink is arranged to be included in a short CP symbol period, and the long CP symbol is deployed again in the last symbol in which an uplink control channel is to be deployed according to an embodiment of the present disclosure.

Referring to FIG. 11, a frame structure of a plurality of subcarriers 1110, 1115, 1115, and 1120 scaled on the basis of an LTE subcarrier 1105 is illustrated. In this case, a long CP symbols are deployed in front of a radio frame, and control information may be reliably transferred through the corresponding long CP symbol.

Further, similarly to this, for a specific purpose, deployment of the long CP symbol and the short CP symbol may be variously changed.

The above-described example refers to a structure in which symbol alignment between 15 kHz/30 kHz/60 kHz subcarrier spacings is unable to be performed. That is, satisfaction of the conditions ①, ②, and ③ in a situation that the CP length is maintained completely the same as the CP length of the LTE/LTE-A is unable to coexist with the symbol alignment condition. It is more important to process interference due to the time alignment problem, and if it is intended to perform time alignment with respect to 15 kHz and 60 kHz although the CP overhead is somewhat increased, designs may be made as follows.

As described above, the long CP symbol of the LTE/LTE-A has (10+128) samples, and the short CP symbol has (9+128) samples. Since the 60 kHz symbol may use the 32-FFT, in consideration of the CP overhead that can be aligned with the symbol having 15 kHz 138/137 samples, only three symbols can be included in 138 and 137 samples, and 42 and 41 samples corresponding to the remainders (138−32×3) and (137−32×3) may be properly distributed to the three symbols using only two kinds of lengths. The corresponding CP lengths may be 14 and 13 that satisfy 14×3=42 and 14×2+13=41. Accordingly, the CP pattern that can maintain the symbol alignment with the LTE/LTE-A is only (14, 14, 14) in the case of a long symbol, and one of three patterns (14, 14, 13), (14, 13, 14), and (13, 14, 14) may be selected in the case of a short symbol.

FIG. 12 illustrates a scalable frame structure in which symbol alignment with the LTE/LTE-A is performed using a pattern (13, 14, 14) for a short symbol among the above-described symbols.

Referring to FIG. 12, a frame structure of a plurality of subcarriers 1210 and 1215 scaled on the basis of an LTE subcarrier 1205 is illustrated. In this case, a time overhead of 60 kHz is (15×14+6×13)/(138+6×137)=288/960=0.3=3/(3+7), and the CP ratio becomes 3/7. Through the above-described symbol deployment, efficient communication becomes possible.

FIG. 26 is a diagram illustrating an example of a scalable frame structure having an extended CP length having different CP overheads so that subcarrier spacings of 30 kHz and 60 kHz have a similar length to an LTE normal CP length and coexist with a coverage that is the same as or similar to that of a normal CP of 15 kHz subcarrier spacing according to an embodiment of the present disclosure.

Referring to FIG. 26, the normal CP pattern and length of 15 kHz subcarrier spacing are the same as those of the LTE/LTE-A to maintain compatibility. In the case of the extended CP of 30 kHz subcarrier spacing, if it is designed by reducing the extended CP of the 15 kHz LTE to a half, it has quite a length of 256$T_s$ as compared with the 15 kHz LTE normal CP length 160$T_s$ or 144$T_s$ and only 12 symbols can go into 0.5 ms to increase the overhead. Since a case where 14 symbols are put into 0.5 ms is equal to a case where the 15 kHz LTE normal CP length is reduced to a half, the CP length of 30 kHz is reduced to a half of the 15 kHz CP length, and thus it is difficult to secure the same coverage. Accordingly, as shown in FIG. 26, the CP length is distributed so that 13 symbols go into 0.5 ms, and thus the same coverage as that of the 15 kHz LTE normal CP can be secured as well as reducing the overhead. Further, in the case of a normal CP as shown in FIG. 25, the rule in which the CP is lengthened only in the first symbol within 0.5 ms may be applied in the same manner even in designing the extended CP, and the extended CP length of the 30 kHz subcarrier spacing may be configured with respect to 13 symbols in a manner that the first symbol has 176$T_s$, and the remaining 12 symbols have an equal length of 156$T_s$. In the case of the 60 kHz subcarrier spacing, the extended CP may be designed in two methods in which an alignment is performed with respect to 15 kHz symbols although the overhead is accepted and in which the overhead is reduced although the alignment is not made with respect to the 15 kHz symbols. First, according to the method for configuring the extended CP of 60 kHz symbols to be equal to or longer than the 15 kHz normal CP length while achieving the symbol alignment with the 15 kHz symbols, 21 symbols go into 0.5 ms as shown in FIG. 26, first three symbols 236$T_s$(16$T_s$+220$T_s$), 218$T_s$, and 218$T_s$ configure the extended CP length in order to make an alignment with the 15 kHz long CP symbol, and the length is configured to hold the rule in which only the first symbol duration is lengthened while minimizing the difference among the lengths 220$T_s$, 218$T_s$, and 218$T_s$ for the three remaining successive symbols. On the other hand, according to the method for reducing the overhead without making the symbol alignment, the 15 kHz LTE extended CP length is reduced to 1/4 (i.e., 128$T_s$), and 24 symbols of 60 kHz having the uniform length go into 0.5 ms. In the former case, an eMBB service is supported by a long TTI of the 15 kHz subcarrier spacing, and a URLLC service is supported by a short TTI of the 60 kHz subcarrier spacing corresponding to the 15 kHz 1-symbol or 2-symbol duration, thereby providing a useful frame structure. In particular, if it is intended to dynamically support frequency resources, such as eMBB and URLLC, an empty time resource that is generated due to misalignment of symbols of 15 kHz and 60 kHz can be made as "0" to heighten the system operation efficiency. In the latter case, in semi-statically dividing and operating the eMBB service and the URLLC service in the form of frequency division multiplexing (FDM), the time overhead of sub bands of the 60 kHz subcarrier spacing can be greatly reduced while maintaining the cell coverage of the 15 kHz subcarrier spacing to efficiently use the resources.

On the other hand, if it is intended to dynamically support the frequency resources, such as the eMBB and URLLC, a mini-slot that is shorter than the slot length may be defined and the URLLC resources may be scheduled in the corresponding unit. For example, if the eMBB and URLLC are operated with the same subcarrier spacing, such as 15 kHz, the slot length is set to 7 or 14 OFDM symbols, and the mini-slot length is set to less than 7 (in consideration of the URLLC latency, it is preferable to operate through 1 or 2 OFDM symbols), so that the user scheduling can be dynamically performed in the unit of a slot in the case of the eMBB and in the unit of a mini-slot in the case of the URLLC. As another example, the eMBB may be operated using 7 or 14 OFDM symbols of the 15 kHz subcarrier spacing as a slot, and the URLLC may be operated using 4 or 8 OFDM symbols of the 60 kHz subcarrier spacing as a mini-slot. In the case where the frequency resources having different time units dynamically coexist, there may occur a case in which resources in the unit of a slot are allocated to eMBB users and resources in the unit of a mini-slot are then allocated to URLLC users. That is, in order to satisfy the URLLC latency conditions, rather than waiting for the URLLC transmission until the next eMBB scheduling timing in the unit of a slot, symbols corresponding to the mini-slot length are removed from the pre-allocated eMBB resources through puncturing, and URLLC data symbols are transmitted to the corresponding location.

FIG. 28 is a diagram illustrating an example of a scalable frame structure for 60 kHz subcarrier spacings having an extended CP length having different CP overheads so that subcarrier spacings have a similar length to an LTE normal CP length and coexist with a coverage that is the same as or similar to that of a normal CP of 15 kHz subcarrier spacing according to an embodiment of the present disclosure.

Referring to FIG. 28, the normal CP pattern and length of 15 kHz subcarrier spacing are the same as those of the LTE/LTE-A to maintain compatibility. In the case of the extended CP of 60 kHz subcarrier spacing, it has a length of 128$T_s$ that corresponds to 1/4 of the 15 kHz LTE extended CP length as illustrated in FIG. 4. In this case, if it is intended to perform mini-slot operation of 60 kHz extended CP OFDM symbols in the unit of 3 to 7 symbols, symbol alignment is not performed, and thus the start point and the mini-slot length may occur non-uniformly in the case of allocating resources to different users in the unit of a mini-slot. As an example, if the mini-slot length is 15 kHz, it is configured as 1 symbol duration, and if the mini-slot length is 60 kHz, it is configured as two or three symbol durations. Accordingly, referring to FIG. 28, if it is intended to transmit a 60 kHz mini-slot to a first symbol location of the 15 kHz subcarrier spacing, the fourth and fifth symbols of the 60 kHz subcarrier spacing may be the mini-slots. If the OFDM symbols (such as third and sixth symbols) located in a region where the symbol alignment is mismatched are not used as the mini-slots, 60 kHz mini-slot configurations may be (0/1/2), (4/5), (7/8/9), (11/12), (14/15/16), (18/19), and (21/22/23)-th OFDM symbols.

As described above, since the start point and the length of the mini-slot may be variable in accordance with the coexistence situations, such information is essential for a terminal to read the control channel and to succeed in demodulation of its data. Accordingly, the mini-slot configuration information may be semi-statically transmitted through RRC signaling, or may be dynamically transmitted through Downlink Control Information (DCI) signaling. Further, the mini-slot configuration may be limited to several kinds in accordance with the subcarrier spacings, and this may be notified through bit indexing in the control information. The mini-slot configuration information may be included in an essential parameter set, such as the OFDM CP length, to be transmitted through the control channel. For example, if the initially connected terminal completes a connection with the base station (is in a connected state) after it receives system information such as master information block (MIB)/system information block (SIB) through default or reference numerology and performs a random access, the base station may transfer the corresponding OFDM essential parameter set and a currently operating slot/mini-slot structure type to a terminal that requires usage of numerology (e.g., 60 kHz extended CP) other than reference numerology (e.g., 15 kHz normal CP OFDM) through the SIB or the like, and thereafter, the terminal may receive the corresponding information, grasp the OFDM demodulation timing for new numerology and the location of the control channel, and demodulate data corresponding to the terminal itself.

Now, a scheme for operating more efficiently than the above-described example through redefining the start point and the length of the mini-slot in the case where the different subcarrier spacings having different CP overheads do not make the symbol alignment as shown in FIG. 28 will be described. If the mini-slot is defined in the unit of the integer number of normal CP symbols of the 15 kHz subcarrier spacing, the start point of the mini-slot of the 60 kHz subcarrier spacing is equal to the start point of the 15 kHz mini-slot, and the length thereof is shorter than the mini-slot length of the 15 kHz subcarrier spacing at maximum so as to be defined as the integer number of extended CP symbols. For example, if the 0-th/seventh symbols of normal CP OFDM symbols of the 15 kHz subcarrier spacing have the length of (160+2048) $T_s$ on the basis of 20 MHz system bandwidth $T_s$, other symbols have the length as long as (144+2048) $T_s$, and the extended CP OFDM symbols of the 60 kHz subcarrier spacing have a uniform length as long as (128+512) $T_s$. If it is defined that one symbol of the 15 kHz subcarrier spacing is the mini-slot length, the mini-slot length of the 60 kHz subcarrier spacing may be defined as maximum floor [(144+2048)/(128+512)]=3 OFDM symbols. FIGS. 29A and 29B illustrate an example of such a mini-slot structure. The start point of the mini-slot of the 60 kHz subcarrier spacing is equal to the start point of the symbol of the 15 kHz subcarrier spacing, and a time period in which no signal is transmitted (288$T_s$ in the case of a long CP in FIG. 29A, and 272$T_s$ in the case of a short CP in FIG. 29B) exists in accordance with the long/short CP length of a normal CP. FIGS. 30A to 30C illustrate an example of a mini-slot structure in the case where two normal CP OFDM symbols of the 15 kHz subcarrier spacing are respectively configured as long CP+short CP, short CP+long CP, and short CP+short CP in the case where the mini-slot length is defined as normal CP 2 OFDM symbol duration of the 15 kHz subcarrier spacing. In the same method, the mini-slot length that can be defined as up to −1 of the slot length can be extended in the same manner. In this case, with respect to the mini-slot having the lengths corresponding to one to seven normal CP OFDM symbols of the 15 kHz subcarrier spacing, the maximum numbers of extended CP OFDM mini-slot symbols of the 60 kHz subcarrier spacing are 3, 6, 10, 13, 17, 20, and 24, respectively.

The surplus time period occurring due to symbol misalignment may be used as a guard period during DL-UL switching or UL-DL switching in the dynamic TDD operation. FIG. 31A illustrates an example in which the mini-slot of 60 kHz subcarrier spacing is composed of 5 symbols for a downlink, a surplus time period used as a guard period for DL-UL switching, and one symbol for an uplink. Further, the surplus time period may also be used as the guard period together with the length of the integer number of CP-OFDM symbols. FIG. 31B illustrates an example in which the mini-slot of 60 kHz subcarrier spacing is composed of 4 symbols for a downlink, one symbol and a surplus time period used as a guard period for DL-UL switching, and one symbol for an uplink.

Hereinafter, a method for configuring a short TTI in the case of supporting TTIs having different lengths in a scalable frame structure will be described. The TTI that is a time unit for resource scheduling may be normally indicated as the integer number of OFDM symbols. For example, in the case of the LTE/LTE-A, the TTI has a 14-symbol duration in the case of a normal CP, and this is equal to 2 slots, 1 subframe length. In an NR system, an ultra-low latency service, such as an URLLC service, and an ultra-high speed/large capacity service, such as an eMBB service, may coexist, and thus it is preferable to support the TTI having an optimized length.

FIG. 27 illustrates an example of a method for configuring a short TTI (or mini-slot) so as to support TTIs having different lengths using an extended CP of 30 kHz subcarrier spacing as shown in FIG. 26 in consideration of a deployment scenario in which eMBB and URLLC services are simultaneously supported by the same subcarrier spacing and the same cell coverage as that of LTE/LTE-A is maintained. The eMBB service is supported by the TTI having a length of 13 CP symbols in the unit of 0.5 ms, and a part of a downlink (DL) control channel (PDCCH), a downlink (DL) data channel (PDSCH), a demodulation reference signal (DMRS) for channel estimation, a time gap, an uplink control channel (PUCCH), and uplink data channel (PUSCH) may be allocated into the corresponding TTI according to an embodiment of the present disclosure.

For example, referring to FIG. 26, a PDCCH for eMBB may be deployed in the first to third symbols, a DMRS for receiving eMBB data may be deployed in the next symbol, and a PDSCH for transmitting eMBB data may be deployed in the very next symbols. Further, in order to reduce HARQ round-trip time (RTT) for downlink transmission data, a time gap (guard period) for DL-to-UL switching may be deployed in the 12$^{th}$ symbol, and a PUCCH may be deployed in the 13$^{th}$ symbol. In the TTI for the EMBB, the TTI for the URLLC has a 2-symbol or 3-symbol duration so as to deploy as many short TTIs as possible, and in this case, symbols corresponding to the remaining region excluding the control channel for the eMBB and the RS symbol, that is, the PDSCH or PUSCH region, may be deployed to be divided by two or three symbols.

For example, referring to FIG. 27, in the case where the PDCCH for the eMBB is located in the first symbol among 13 symbols, a front-loaded RS (DMRS) for eMBB downlink data demodulation is located in the second symbol, and the remaining third to 13$^{th}$ symbols are used as the PDSCH region, the short TTI may be configured using one pattern of 2/2/2/2/3, 2/2/2/3/2, 2/2/3/2/2, 2/3/2/2/2, and 3/2/2/2/2. As an example, configuration of the short TTI using 2/2/2/2/3 means that total 5 short TTIs can be configured in one 0.5 ms long TTI in a manner that the third and fourth symbols constitute one TTI, the fifth and sixth symbols constitute one TTI, and 11$^{th}$, 12$^{th}$, and 13$^{th}$ symbols constitute one TTI. According to the above-described configuration method, the number of short TTIs that can be configured may differ in accordance with existence/nonexistence of the number of OFDM symbols according to normal/extended CP configuration in a long TTI, the number of PDCCH symbols, an RS location, a timing gap, and uplink channel. Further, the PDCCH and the RS of the eMBB may be reused as a control channel and an RS of the short TTI for the URLLC.

In addition to the embodiment as illustrated in FIG. 27, the short TTI may be configured by applying the same rule even in the scalable frame structure for a normal CP as illustrated in FIG. 6A. Further, in the case where different subcarrier spacings coexist as shown in FIG. 6A, the length corresponding to the integer number of symbols of a narrow subcarrier spacing may be defined as the short TTI, and the integer number of symbols of a wide subcarrier spacing may be transmitted in the period. For example, it may be possible to configure the length of 14 normal CP symbols as the long TTI to support a service, such as eMBB, and to configure the time unit corresponding to the 15 kHz 2-symbol duration in the long TTI as the short TTI to support the URLLC with the 15 kHz 2-symbol TTI, to support the URLLC with the 30 kHz 4-symbol TTI, or to support the URLLC with the 60 kHz 8-symbol TTI. In this case, if the symbol alignment condition as illustrated in FIG. 6A is satisfied, effects of reducing a standby time due to a scheduling unit difference and removing an unused time resource that is shorter than 1-symbol can be obtained.

Hereinafter, a method for configuring a resource block for a scalable frame structure will be described.

Up to now, a scalable frame structure on time axis has been described. Now, in order to describe a scalable frame structure on frequency axis, a resource block (RB) that may be a basic unit of resource allocation will be described.

FIGS. 13A to 13D illustrate an example of a resource block configuration for each subcarrier spacing for a scalable frame structure for a normal CP that can maintain compatibility with LTE/LTE-A as shown in FIG. 6A and perform a symbol/slot/subframe alignment between subcarrier spacings according to various embodiments of the present disclosure.

Referring to FIGS. 13A to 13D, a method for configuring a resource block for a scalable frame structure for a normal CP in 7.5 kHz (1305), 15 kHz (1310), 30 kHz (1315), and 60 kHz (1320) is disclosed. In an embodiment, colored symbols are symbols having a relatively long CP length, and this time interval may be indicated as $T_{CP\text{-}OFDM,L}$, and uncolored symbols are symbols having a relatively short CP length, and may be indicated as $T_{CP\text{-}OFDM,S}$.

In order to make the numbers of resource elements (REs) in one resource block equal to each other even if the subcarrier spacing differs, the number of subcarriers on frequency axis×the number of OFDM symbols on time axis becomes 12×14 in all, and a CP pattern for satisfying the symbol/slot/subframe alignment is applied.

FIGS. 14A to 14D illustrate an example of a resource block configuration for each subcarrier spacing for a scalable frame structure for an extended CP that can maintain a compatibility with LTE/LTE-A and perform a symbol/slot/subframe alignment between subcarrier spacings according to various embodiments of the present disclosure.

Referring to FIGS. 14A to 14D, a method for configuring a resource block for a scalable frame structure for an extended CP in 7.5 kHz (1405), 15 kHz (1410), 30 kHz (1415), and 60 kHz (1420) is disclosed. The extended CPs have the same CP length, and may be indicated as $T_{CP\text{-}OFDM}$.

In the same manner, FIGS. 14A to 14D show an example of resource block configuration that can be used in the scalable frame structure for the extended CP as illustrated in FIG. 4. Here, 12 subcarriers on frequency axis are configured for compatibility with the LTE, and it is also possible to configure 16 or another number of subcarriers unless the compatibility with the LTE is considered. However, since the same number of subcarriers is maintained in accordance with the subcarrier spacings, the RB alignment can be made well even on frequency axis as shown in FIGS. 17A and 17B, and thus easy expansion can be obtained even if the system operation is performed in any one of FDM and TDM methods.

FIGS. 15A and 15B are diagrams illustrating a resource block type that can be used in a frame structure of subcarrier spacings of 30 kHz (1505) and 60 kHz (1510) having the same CP length as that of the LTE/LTE-A as described above with reference to FIG. 11 according to various embodiments of the present disclosure.

Here, if the resource block (RB) type 15N of FIG. 14B is used, the alignment on time/frequency axes can be facilitated as shown in FIG. 18.

FIG. 16 is a diagram illustrating an example of a resource block type that can be used in a frame structure of 60 kHz (1605) capable of performing a symbol alignment with a cell coverage that is similar to that of the LTE/LTE-A as described above with reference to FIG. 12. In the same manner, if the resource block (RB) type 15N of FIG. 14B is used, the alignment on time/frequency axes can be facilitated as shown in FIG. 19 according to an embodiment of the present disclosure.

FIG. 17A is a diagram illustrating an example in which resource blocks (RBs) such as in FIGS. 13A to 13D coexist in a frequency division multiplexing (FDM) type in a scalable frame structure like that in FIG. 6A, and FIG. 17B is a diagram illustrating an example in which resource blocks such as in FIGS. 14A to 14D coexist in a frequency division multiplexing (FDM) type in a scalable frame structure as shown in FIG. 4. FIG. 18 is a diagram illustrating an example in which resource blocks such as in FIGS. 13B, 15A and 15B coexist in a frequency division multiplexing (FDM) type in a scalable frame structure as shown in FIG. 11, and FIG. 19 is a diagram illustrating an example in which resource blocks such as in FIGS. 13B and 16 coexist in a frequency division multiplexing (FDM) type in a scalable frame structure as shown in FIG. 12 according to an embodiment of the present disclosure.

Another reason why the alignment on frequency axis is necessary as shown in FIGS. 17A, 17B, 18, and 19 is that in supporting various subcarrier spacings, a hierarchy structure, in which two successive RBs 1715 for 15 kHz become one RB 1730 of 30 kHz and two successive RBs 1730 of 30 kHz become one RB of 60 kHz (1735), is introduced to reduce overhead for control information, to make a terminal easily grasp a resource mapping in accordance with the subcarrier spacing, and to facilitate the procedure if switching to another subcarrier spacing is necessary, since if a separate RB mapping/indexing rule is configured for each subcarrier spacing when performing information task for resource scheduling, control information overhead may be increased during a resource operation. Such a hierarchy structure may be applied in a similar manner to the examples as shown in FIGS. 17B, 18, and 19. FIGS. 17A, 17B, 18 and 19 illustrate radio frames 1705, 1735, 1805 and 1905, as well as various RBs 1710, 1715, 1720, 1730, 1740, 1745, 1750, 1755, 1810, 1815, 1820, 1910 and 1915.

Hereinafter, items related to parameter set definition for generating an OFDM baseband signal will be described.

In order for a base station or a terminal to correctly transmit and receive an OFDM (or SC-FDMA, since the SC-FDMA may be considered as a pre-coded OFDM, explanation will be made around the OFDM) during uplink or downlink transmission/reception, it is necessary to define a time-continuous OFDM signal in a baseband. In a 5G system, OFDM signals of two or more different subcarrier spacings may be included in an FDM form in one baseband, time-continuous definition in the baseband of a multi-numerology OFDM signal of the 5G system may be expressed as in the following expression.

$$s_{l,m}^{(p)}(t) = \sum_{k_m=K_{N,M}}^{K_{N,M}} a_{k_m,l}^{(p)} \cdot g^{j2\pi(k_m+\delta_m)\Delta f_m(t-N_{CP,l,m}T_s)},$$

for $0 \leq t < (N_{CP,l,m} + N +_m)T_s$

Mathematical expression 10

Here, $\delta_{l,m}^{(p)}(t)$ denotes the l-th time-continuous OFDM signal to be transmitted to an antenna port of the subcarrier spacing $\Delta f_m(=2^m \cdot \Delta f_0)$ that is $2^m$ times scaled on the basis of a baseline subcarrier spacing $\Delta f_0$. Further, $k_m$ means a subcarrier index corresponding to $\Delta f_m$, and $-K_{L,m}$ and $K_{H,m}$ respectively mean a subcarrier index having the lowest frequency and a subcarrier index having the highest frequency in $\Delta f_m$. These values may be expressed as a function of the number of supported RBs in accordance with the number of subcarriers in the RB and the system bandwidth for each subcarrier spacing in a similar manner to the LTE/LTE-A. Further, $a_{k_m,l}^{(p)}$ denotes a complex symbol to be mapped on the subcarrier index $k_m$ corresponding to $\Delta f_m$, the antenna port p, and the l-th OFDM symbol, and may be a data symbol, such as RS or QAM, or a symbol that is spread/pre-coded for the SC-FDMA. Further, $\delta_m$ denotes a subcarrier spacing offset value corresponding to $\Delta f_m$, and the range thereof becomes $$-\frac{\Delta f_m}{2} < \delta_m \leq \frac{\Delta f_m}{2}.$$

This value may differ depending on how an RB grid of each subcarrier spacing is configured, and if the RB grid is configured in a nested manner that all subcarrier frequency values corresponding to $\Delta f_m$ belong to subcarrier frequency values corresponding to $\Delta f_{m-1}$, the subcarrier spacing offset value becomes $\delta_m=0(\forall m)$. As another example, if the RB grid is configured to have an equal subcarrier spectrum other than the subcarrier frequency value itself, the subcarrier spacing offset value becomes $$\delta_m = \frac{\Delta f_m}{2},$$

and in this case, the RB spectrum forms a symmetrical shape around the DC. Further, $N_{CP,l,m}$ denotes a value that indicates a CP length of the l-th OFDM symbol of the subcarrier spacing $\Delta f_m$ in terms of a reference time of the system, that is, the integer number of samples in the unit of $T_s$, and this value may differ in accordance with various scalable frame structures as proposed above. Further, $N_m$ corresponds to an FFT size on the basis of $T_s$ corresponding to the subcarrier spacing $\Delta f_m$, and may be $N_m=2^m \cdot N_0$. For example, in the 20 MHz/15 kHz/2048-FFT reference system, the 30 kHz FFT size is 1024, and the 60 kHz FFT size is 512.

For each subcarrier spacing, OFDM signal transmission starts from l=0. The final baseband signal may be a signal that is added after pulse shaping, such as sub-band filtering or windowing, for several subcarrier spacing signals. In the case of the pulse shaping, it generally depends on its implementation, and the baseband signal that is added without considering this may be expressed as in the following expression.

$$s_l^{(p)}(t) = \sum_{m=M_1}^{M_2} s_{l,m}^{(p)}(t) \qquad \text{Mathematical expression 11}$$

Referring to mathematical expression 11, one symbol length differs for each subcarrier spacing, and in the case of adding different subcarrier spacing signals to each other, it may be considered that OFDM signals that are repeatedly generated in accordance with periodicity of the CP pattern of each subcarrier spacing are added to each other. For example, 14 normal CP-OFDM symbols for 1 ms of 15 kHz may be added to 28 normal CP-OFDM symbols of 30 kHz to be transmitted. Further, $M_1$ and $M_2$ are integer values indicating a lower limit and an upper limit of subcarrier spacing scaling, and on the basis of 15 kHz as shown in FIG. 6A, they become $M_1=-2$, $M_2=2$.

Now, a method for expressing a CP length as $N_{CP,l,m}$ in the scalable frame structure as described above will be considered. In the 5G system as described above, a plurality of numerology sets supporting several subcarrier spacings are brought up, and a baseband signal such as in mathematical expression 11 may be defined on the basis of the maximum system bandwidth that can be supported for the corresponding numerology set. For example, in the case of supporting a set of {3.75 kHz, 7.5 kHz, 15 kHz, 30 kHz, 60 kHz} corresponding to FIG. 6A with the maximum 80 MHz system bandwidth through compatibility with the LTE/LTE-A, $T_s$ becomes $$T_s = \frac{1}{(4 \times 80 \text{ MHz})},$$

and in this case, if 15 kHz is configured as a baseline subcarrier spacing $\Delta f_0$, $N_0$ becomes $N_0=8192$, and $N_{CP,l,m}$ may be derived using table 1, table 2, and mathematical expression 6, and may be defined as a table with respect to all subcarrier spacings, or only the number of CP samples of the reference subcarrier spacing may be expressed, and the number of CP samples of the remaining scaled subcarrier spacing may be defined as a circulation movement rule of the first sequence set in table 1 and an expression utilizing mathematical expression 6.

First, in the case of defining all the subcarrier spacings as a table in the above-described example, they may be expressed as in the following table. Table 3 below indicates an example of an OFDM parameter set supporting the maximum 80 MHz system bandwidth and corresponding to the scalable frame structure as in FIGS. 6A and 4.

TABLE 3

| Configuration | | Cyclic prefix length $N_{CP,l,m}$ |
|---|---|---|
| Normal cyclic prefix | $\Delta f_{-2}$ = 3.75 kHz | 2368 for l = 0, 1, 3, 5 |
| | | 2304 for l = 2, 4, 6 |
| | $\Delta f_{-1}$ = 7.5 kHz | 1216 for l = 0, 3 |
| | | 1152 for l = 1, 2, 4, 5, 6 |
| | $\Delta f_0$ = 15 kHz | 640 for l = 0 |
| | | 576 for l = 1, 2, 4, 5, 6 |
| | $\Delta f_1$ = 30 kHz | 320 for l = 0, 1, 3, 5 |
| | | 256 for l = 2, 4, 6 |
| | $\Delta f_2$ = 60 kHz | 192 for l = 0, 3 |
| | | 128 for l = 1, 2, 4, 5, 6 |
| Extended cyclic prefix | $\Delta f_{-2}$ = 3.75 kHz | 8192 for l = 0, 1, 2, 3, 4, 5, 6 |
| | $\Delta f_{-1}$ = 7.5 kHz | 4096 for l = 0, 1, 2, 3, 4, 5, 6 |
| | $\Delta f_0$ = 15 kHz | 2048 for l = 0, 1, 2, 3, 4, 5, 6 |
| | $\Delta f_1$ = 30 kHz | 1024 for l = 0, 1, 2, 3, 4, 5, 6 |
| | $\Delta f_2$ = 60 kHz | 512 for l = 0, 1, 2, 3, 4, 5, 6 |

In table 3, it can be known that values provided as normal CP lengths are values 64 times sequences of (3, 2, 2, 3, 2, 2, 2), (5, 5, 4, 5, 4, 5, 4), (10, 9, 9, 9, 9, 9, 9), (19, 18, 18, 19, 18, 18, 18), (37, 37, 36, 37, 36, 36, 36), and (74, 73, 73, 73, 73, 73, 73) (15 kHz is 64 times increased from 128-FFT to 8192-FFT) (the corresponding sequences are enumerated in order from 60 kHz to 3.75 kHz).

As another method, instead of enumerating CP values for all subcarrier spacings as a table, only a CP length value for a reference subcarrier spacing may be indicated using the regularity as described above, and CP values for the remaining subcarrier spacings may be expressed as a table in the form below. Table 4 below indicates an example of an OFDM parameter set supporting the maximum 80 MHz system bandwidth and corresponding to the scalable frame structure as shown in FIGS. 6A and 4.

TABLE 4

| Configuration | | Cyclic prefix length $N_{CP,l,m}$ |
|---|---|---|
| Normal CP | $\Delta f_0 = 15$ kHz | 640 for l = 0 |
| | | 576 for l = 1, 2, 3, 4, 5, 6 |
| | $\Delta f_m = 2^m \cdot 15$ kHz (m = −2, −1, 0, 1, 2) | $N_{CP,l,m-1} = N_{CP,l,m} + N_{CP,l,m+1,m}$ for l ≥ 0 |
| | | Length pattern for integer k, |
| | | (L, S, S, S, S, S) for m = 3 k |
| | | (L, L, S, L, S, L, S) for m = 3 k + 1 |
| | | (L, S, S, L, S, S, S) for m = 3 k + 2 |
| Extended CP | $\Delta f_0 = 15$ kHz | 2048 for l = 0, 1, 2, 3, 4, 5, 6 |
| | $\Delta f_m = 2^m \cdot 15$ kHz (m = −2, −1, 0, 1, 2) | $N_{CP,l,m-1} = 2N_{CP,l,m}$ for l ≥ 0 |

Even in the case of other scalable frame structures proposed according to embodiments of the present disclosure, OFDM parameter sets may be indicated using the same method. For example, table 5 below indicates an example of an OFDM parameter set in the case where the scalable frame structure as shown in FIG. 11 is used in an 80 MHz system, and table 6 indicates an example of an OFDM parameter set in the case where the scalable frame structure as shown in FIG. 12 is used in a 80 MHz system.

TABLE 5

| Subcarrier spacing | CP ratio | OFDM duration $N_m$ | Cyclic prefix length $N_{CP,l,m}$ |
|---|---|---|---|
| $\Delta f_0 = 15$ kHz | 1/14 | $N_0 = 8192$ | 640 r l = 0 |
| | | | 576 for l = 1, 2, 3, 4, 5, 6 |
| $\Delta f_1 = 30$ kHz | 2/13 | $N_1 = 4096$ | 640 r l = 0, 1, . . ., 9, 12 |
| | | | 576 for l = 10, 11 |
| $\Delta f_2 = 60$ kHz | 7/23 | $N_2 = 2048$ | 640 r l = 0, 1, . . ., 15, 22 |
| | | | 576 for l = 16, 17, . . ., 21 |

TABLE 6

| Subcarrier spacing | CP ratio | OFDM duration $N_m$ | Cyclic prefix length $N_{CP,l,m}$ |
|---|---|---|---|
| $\Delta f_0 = 15$ kHz | 1/14 | $N_0 = 8192$ | 640 r l = 0 |
| | | | 576 for l = 1, 2, 3, 4, 5, 6 |
| $\Delta f_2 = 60$ kHz | 3/7 | $N_2 = 2048$ | 896 for l = 0, 1, 2 4, 5, 7, 8, 10, 11, 13, 14, 1 6, 17, 19, 20 |
| | | | 832 for l = 3, 6, 9, 12, 15, 18 |

Hereinafter, a numerology set information transfer procedure will be described. In an embodiment, a numerology set may include set information of a frame structure as information including the frame structure described in the above-described embodiment and CP configuration information. By transferring such information between a base station and a terminal, smooth signal transmission/reception becomes possible.

An OFDM CP length and subcarrier spacing may be essential parameters for correct transmission/reception through the base station/terminal. Further, in order to adaptively correspond to various service requirements and to efficiently use resources, the corresponding numerology operation region should be variable. Even in this case, in order for the terminal to operate as desired by the base station, it is necessary to perform an exchange procedure for numerology set information that is operable between the base station and the terminal and a procedure of enabling switching to another numerology to be correctly performed at a time required by the base station or the terminal.

FIGS. 20A to 20D explain procedures of four cases in which processes of configuring a reference numerology that the base station or the terminal operates as a basis and performing communication on the basis of corresponding information may differ depending on a method for configuring an initial connection channel of the base station and which of the base station and the terminal determines the reference numerology. In an embodiment, although operations of the base station and the terminal are simultaneously explained, they may be understood as respective operations of the base station and the terminal, and may be implemented through mutual operations of the base station and the terminal.

FIG. 20A is a diagram explaining a procedure in which a terminal performs an initial connection and communication with a base station in the case where the terminal determines a reference subcarrier spacing and the base station configures an initial connection channel with respect to all subcarrier spacings to be compulsorily supported according to an embodiment of the present disclosure.

Referring to FIG. 20A, the base station may transmit/receive a signal to/from the terminal.

At operation 2002, the base station may configure an initial connection channel for each subcarrier spacing to be supported by the terminal. More specifically, in the case of terminals of a corresponding communication system, there may be subcarrier spacings to be compulsorily supported for transmission/reception of a signal to/from the base station with respect to at least one subcarrier. Each terminal may select one of subcarriers to be compulsorily supported to perform an initial connection with the base station through the corresponding subcarrier, and the base station may configure the initial connection channel so that the terminal can perform an initial connection with respect to the subcarrier to be compulsorily supported.

At operation 2004, the terminal may select one of subcarrier spacings that can be configured by the terminal itself and may configure the selected one as a reference subcarrier spacing. More specifically, at least one of the subcarrier spacing that can be configured by the terminal may be included in the subcarrier spacing to be compulsorily supported by the base station. In an embodiment, the terminal may configure one of the subcarrier spacings to be compulsorily supported on the system among the configurable subcarrier spacings as a reference subcarrier spacing.

At operation 2006, the terminal may acquire system information through detection of the initial connection channel corresponding to the configured reference subcarrier spacing. In an embodiment, the system information may include at least one of a random-access channel location, random access channel configuration, numerology set information supported by the base station, and information related to the subcarrier spacing.

At operation 2008, the terminal may perform a random access to the base station on the basis of information acquired at operation 2006. Further, the terminal may transmit the numerology set information that can be supported by the terminal to the base station, and the terminal may perform the random access to transfer set information selected by the terminal among numerology sets supported by the base station. The set information selected by the terminal may be determined on the basis at least one of information received at operation 2006, the reference subcarrier spacing of the terminal, and the numerology set that can be supported by the terminal.

At operation 2010, the base station may transmit to the terminal at least one resource mapping information of a downlink and an uplink on the basis of the information received at operation 2008. The resource mapping information may include control channels of the uplink and the downlink and data channel information, and may also include reference signal deployment information.

At operation 2012, the terminal may transmit/receive a signal to/from the base station on the basis of the information received at operation 2010. Further, the terminal may analyze the control channels of the uplink and the downlink and the data channel on the basis of the transferred resource mapping information and may exchange information with the base station on the basis of the analyzed information. Further, the terminal may maintain time synchronization with the base station on the basis of the reference subcarrier spacing determined at the previous operation. If the reference subcarrier spacing is determined, the subcarrier spacing used by the terminal may be time synchronous with the reference subcarrier spacing within a specific time during applying of a scalable frame structure, and through this, the terminal can smoothly transmit/receive a signal to/from the base station.

FIG. 20B is a diagram explaining a procedure in which a terminal performs an initial connection and communication with a base station in the case where the terminal determines a reference subcarrier spacing and the base station configures an initial connection channel with respect to one default subcarrier spacing pre-engaged with all terminals according to an embodiment of the present disclosure.

Referring to FIG. 20B, the base station may transmit/receive a signal to/from the terminal.

At operation 2022, the base station may configure an initial connection channel for only one pre-engaged subcarrier spacing. More specifically, the base station may configure a channel for an initial connection only for a specific subcarrier spacing pre-engaged with the terminal. In the above-described system, the terminal may connect to the base station through the pre-engaged specific subcarrier spacing for the initial connection.

At operation 2024, the terminal may acquire system information through detection of the initial connection channel corresponding to the engaged subcarrier spacing. In an embodiment, the system information may include at least one of a random-access channel location, a random-access channel configuration, numerology set information supported by the base station, and information related to the subcarrier spacing.

At operation 2026, the terminal may perform a random access with respect to the base station on the basis of the information received at operation 2024. Further, the terminal may perform the random access to transfer set information that can be supported by the terminal.

At operation 2028, the base station may transmit to the terminal at least one resource mapping information of a downlink and an uplink on the basis of the information received at operation 2026. The resource mapping information may include control channels of the uplink and the downlink and data channel information, and may also include reference signal deployment information.

At operation 2030, the terminal may transmit/receive a signal to/from the base station on the basis of the information received at operation 2028. Further, the terminal may analyze the control channels of the uplink and the downlink and the data channel on the basis of the transferred resource mapping information and may exchange information with the base station on the basis of the analyzed information. Further, the terminal may maintain time synchronization with the base station on the basis of the reference subcarrier spacing determined at the previous operation. If the reference subcarrier spacing is determined, the subcarrier spacing used by the terminal may be time synchronous with the reference subcarrier within a specific time during applying of a scalable frame structure, and through this, the terminal can smoothly transmit/receive a signal to/from the base station.

FIG. 20C is a diagram explaining a procedure in which a terminal performs an initial connection and communication with a base station in the case where the base station determines a reference subcarrier spacing and configures an initial connection channel with respect to all subcarrier spacings to be compulsorily supported according to an embodiment of the present disclosure.

Referring to FIG. 20C, the terminal may transmit/receive a signal to/from the base station.

At operation 2032, the base station may configure an initial connection channel for each subcarrier spacing to be supported by the terminal. More specifically, in the case of terminals of a corresponding communication system, there may be subcarrier spacings to be compulsorily supported for transmission/reception of a signal to/from the base station with respect to at least one subcarrier. Each terminal may select one of subcarrier spacings to be compulsorily supported to perform an initial connection with the base station through the corresponding subcarrier spacing, and the base station may configure the initial connection channel so that the terminal can perform an initial connection with respect to the subcarrier spacing to be compulsorily supported.

At operation 2034, the terminal may detect the initial connection channel corresponding to the subcarrier spacing that can be configured by the terminal itself, and may acquire system information through the detected initial connection channel. In an embodiment, the system information may include at least one of a random-access channel location, a random-access channel configuration, numerology set information supported by the base station, and information related to the subcarrier spacing.

At operation 2036, the terminal may perform a random access to transmit to the base station numerology set information that can be supported by the terminal itself among numerology sets that can be supported by the base station.

At operation 2038, the base station may determine a reference subcarrier spacing corresponding to the terminal on the basis of information received at operation 2036. In an embodiment, the base station may determine the reference subcarrier spacing that is suitable to the terminal in consideration of at least one of a channel state, a terminal kind, and a subcarrier spacing supported by an adjacent base station.

At operation 2040, the base station may transmit to the terminal reference subcarrier spacing information determined at operation 2038 and downlink/uplink resource mapping information corresponding to numerology sets that can be supported by the terminal. The resource mapping information may include control channels of the uplink and the downlink and data channel information, and may further include reference signal deployment information.

At operation 2042, the terminal may transmit/receive a signal to/from the base station on the basis of the information received at operation 2040. Further, the terminal may analyze the control channels of the uplink and the downlink and the data channel on the basis of the transferred resource mapping information and may exchange information with the base station on the basis of the analyzed information. Further, the terminal may maintain time synchronization with the base station on the basis of the reference subcarrier spacing determined at the previous operation. If the reference subcarrier spacing is determined, the subcarrier spacing used by the terminal may be time synchronous with the reference subcarrier spacing within a specific time during applying of a scalable frame structure, and through this, the terminal can smoothly transmit/receive a signal to/from the base station.

FIG. 20D is a diagram explaining a procedure in which a terminal performs an initial connection and communication with a base station in the case where the base station determines a reference subcarrier spacing and configures an initial connection channel with respect to a default subcarrier spacing pre-engaged with all terminals according to an embodiment of the present disclosure.

Referring to FIG. 20D, the base station may transmit/receive a signal to/from the terminal.

At operation 2052, the base station may configure an initial connection channel for only one pre-engaged subcarrier spacing. More specifically, the base station may configure a channel for an initial connection only for a specific subcarrier spacing pre-engaged with the terminal. In the above-described system, the terminal may connect to the base station through the pre-engaged specific subcarrier spacing for the initial connection.

At operation 2054, the terminal may acquire system information through detection of the initial connection channel corresponding to the engaged subcarrier spacing. In an embodiment, the system information may include at least one of a random-access channel location, a random-access channel configuration, numerology set information supported by the base station, and information related to the subcarrier spacing.

At operation 2056, the terminal may perform a random access to transmit to the base station numerology set information that can be supported by the terminal itself among numerology sets that can be supported by the base station.

At operation 2058, the base station may determine a reference subcarrier spacing corresponding to the terminal on the basis of information received at operation 2056. In an embodiment, the base station may determine the reference subcarrier spacing that is suitable to the terminal in consideration of at least one of a channel state, a terminal kind, and a subcarrier spacing supported by an adjacent base station.

At operation 2060, the base station may transmit to the terminal reference subcarrier spacing information determined at operation 2058 and downlink/uplink resource mapping information corresponding to numerology sets that can be supported by the terminal. The resource mapping information may include control channels of the uplink and the downlink and data channel information, and may further include reference signal deployment information.

At operation 2062, the terminal may transmit/receive a signal to/from the base station on the basis of the information received at operation 2060. Further, the terminal may analyze the control channels of the uplink and the downlink and the data channel on the basis of the transferred resource mapping information and may exchange information with the base station on the basis of the analyzed information. Further, the terminal may maintain time synchronization with the base station on the basis of the reference subcarrier spacing determined at the previous operation. If the reference subcarrier spacing is determined, the subcarrier spacing used by the terminal may be time synchronous with the reference subcarrier spacing within a specific time during applying of a scalable frame structure, and through this, the terminal can smoothly transmit/receive a signal to/from the base station.

FIG. 20E is a diagram explaining a procedure in which a terminal performs an initial connection and communication with a base station in the case where a reference subcarrier spacing is fixed to a single value in a specific frequency domain and the base station and the terminal pre-engage to connect to an initial connection channel through the corresponding subcarrier spacing according to an embodiment of the present disclosure.

Referring to FIG. 20E, the base station may transmit/receive a signal to/from the terminal.

At operation 2072, the base station may configure an initial connection channel for only one pre-engaged subcarrier spacing. More specifically, the base station may configure a channel for an initial connection for a single subcarrier spacing pre-engaged with the terminal in a specific frequency domain. For example, in a sub-6 GHz band, 15 kHz is pre-engaged as a subcarrier spacing for an initial connection, and in a 6 to 40 GHz frequency band, 60 kHz is pre-engaged as a subcarrier spacing for an initial connection. In the above-described system, the terminal may connect to the base station through the pre-engaged specific subcarrier spacing for the initial connection. In an embodiment, the pre-engaged signal subcarrier spacing may be a preset value without any separate information exchange, or may be determined as the base station transfers related information to the terminal through upper-layer signaling, such as system information or RRC.

At operation 2074, the terminal may acquire system information through detection of the initial connection channel corresponding to the engaged subcarrier spacing. In an embodiment, the system information may include at least one of a random-access channel location, a random-access channel configuration, numerology set information supported by the base station, and information related to the subcarrier spacing. In particular, information on the subcarrier spacing supported by the base station may be acquired through a master information block (MIB) transmitted through the PBCH.

At operation 2076, the terminal may perform a random access to transmit to the base station numerology set information that can be supported by the terminal itself among numerology sets that can be supported by the base station.

At operation 2078, the base station may determine a subcarrier spacing to be used when transmitting/receiving a signal to/from the terminal on the basis of the information received at operation 2076. In an embodiment, the base station may determine the subcarrier spacing that is suitable to the terminal in consideration of at least one of a channel state, a terminal kind, and a subcarrier spacing supported by an adjacent base station.

At operation 2080, the base station may transmit to the terminal reference subcarrier spacing information determined at operation 2078 and downlink/uplink resource mapping information corresponding to numerology sets that can be supported by the terminal. The resource mapping information may include control channels of the uplink and the downlink and data channel information, and may further include reference signal deployment information.

At operation 2082, the terminal may transmit/receive a signal to/from the base station on the basis of the information received at operation 2080. Further, the terminal may analyze the control channels of the uplink and the downlink and the data channel on the basis of the transferred resource mapping information and may exchange information with the base station on the basis of the analyzed information. Further, the terminal may maintain time synchronization with the base station on the basis of the subcarrier spacing determined at the previous operation and the subcarrier spacing of an initial connection channel including a synchronous signal. If the base station determines a subcarrier spacing that is different from the initial connection channel with respect to the terminal, the subcarrier spacing used by the terminal may be time synchronous with the subcarrier spacing for the initial connection within a specific time during applying of a scalable frame structure, and through this, the terminal can smoothly transmit/receive a signal to/from the base station.

FIG. 21 is a diagram explaining a procedure performed by a base station and a terminal if the base station variably operates a frequency/time resource region for each numerology set in accordance with situations according to an embodiment of the present disclosure.

Referring to FIG. 21, the terminal and the base station may transmit/receive a signal through an initial information exchange, and may maintain time synchronization on the basis of specific numerology information.

At operation 2102, the base station may change a numerology set or frequency and time resource regions for each numerology set in consideration of at least one of a terminal connection situation, a provided service type, a traffic pattern, resource requirements, a communication service (eMBB or URLLC) to be supported, a terminal kind, and a channel state. Further, it is apparent that a CP set related to the subcarrier spacing may also be changed.

At operation 2104, the base station may transmit to the terminal DL/UL resource mapping information corresponding to the information changed at operation 2102.

At operation 2106, the terminal may perform communication with the base station through analysis of uplink/downlink control/data channels on the basis of the received information, and even in this case, it may maintain the time synchronization with the base station on the basis of a reference subcarrier spacing. Through such a procedure, the base station may adaptively change resource deployment related to the subcarrier spacing and may transmit this to the terminal, thereby providing an efficient communication environment. Hereinafter, scalable frame structure operation scenarios will be described through embodiments.

FIG. 22A illustrates an example that can be deployed by a service provider if it is intended to variously support different subcarrier spacings while maintaining a CP overhead in the same ratio as shown in FIG. 6A according to an embodiment of the present disclosure. FIG. 22A illustrates coverage 2210.

Referring to FIG. 22A, one or more micro transmission and reception points (TRP) 2206 and pico TRP 2208 may be deployed around a macro TRP 2202, and may be controlled through a central unit 2204.

An absolute CP length differs for each subcarrier spacing, and as the subcarrier spacing becomes larger, the CP length becomes shortened to deteriorate the reception performance in a multi-path fading channel environment. Accordingly, as shown in FIG. 22A, a central processing unit may possess a cell id, perform dispersed deployment of micro/pico transmission and reception points (TRP) in various locations, and provide services (e.g., vehicle to vehicle/pedestrian/infrastructure/network (V2X) or URLLC) that require 30 kHz/60 kHz subcarrier spacing that cannot be covered by a macro TRP. Further, a basic mobile data service is provided by 15 kHz to secure a coverage similar to that of the existing LTE/LTE-A.

As described above, in the case of using a subcarrier of a high frequency band, the CP length is relatively shortened, and thus it may be deployed to operate a small cell, whereas the low frequency band may be used to operate a relatively large cell.

FIG. 22B illustrates an example in which a TRP in a cell is configured as only one macro TRP by a service provider so as to achieve the same coverage regardless of the subcarrier spacing by maintaining an absolute CP length through different CP overheads set for subcarrier spacings according to an embodiment of the present disclosure. FIG. 22B illustrates coverage 2230.

Referring to FIG. 22B, the macro TRP 2222 may transmit/receive a signal through subcarriers of different frequency bands. A scalable frame structure, such as one in FIG. 11 (overhead is regarded as important) or one in FIG. 12 (time alignment is regarded as important), may be properly selected depending on which one between the system overhead and interference due to time alignment mismatch is more important.

By maintaining the absolute CP length as described above, a cell having the same coverage may be formed using subcarriers of different frequencies.

FIG. 23 is a diagram illustrating the configuration of a terminal according to an embodiment of the present disclosure.

Referring to FIG. 23, a terminal 2300 according to an embodiment includes a transceiver 2302, a storage 2304, and a controller 2306.

The transceiver 2302 may transmit/receive a signal to/from a base station.

The storage 2304 may store therein at least one of information related to the terminal 2300 and information transmitted/received through the transceiver 2302.

The controller 2306 may control the operation of the terminal 2300, and may control the whole operation of the terminal to perform an operation related to the terminal as described above according to the embodiment. The controller 2306 may include at least one processor.

FIG. 24 is a diagram illustrating the configuration of a base station according to an embodiment of the present disclosure.

Referring to FIG. 24, a base station 2400 according to an embodiment includes a transceiver 2402, a storage 2406, and a controller 2406.

The transceiver 2402 may transmit/receive a signal to/from a terminal or another network entity.

The storage 2406 may store therein at least one of information related to the base station 2400 and information transmitted/received through the transceiver 2402.

The controller 2406 may control the operation of the base station 2400 and may control the whole operation of the base station to perform an operation related to the base station as described above according to the embodiment. The controller 2406 may include at least one processor.

As described above, an embodiment of the present disclosure is featured to provide a method for configuring a cyclic prefix (CP) length of OFDM symbols as a specific pattern so that a main time unit of the system, such as a subframe, a slot, or a symbol, can be aligned between the subcarrier spacings supported by a wireless communication system, and a scalable frame structure derived as the result of the method. Further, the present disclosure may provide a method for processing a control signal in a wireless communication system including receiving a first control signal transmitted from a base station, processing the received first control signal, and transmitting a second control signal generated on the basis of the processing to the base station.

Further, an embodiment of the present disclosure may provide a method for designing a CP pattern in which at least one of a symbol, a slot, and a subframe can be aligned between adjacent carriers, and a signal can be transmitted/received through a frame structure using the method. More specifically, the pattern designing method may adopt a method for circulating and moving the pattern in accordance with subcarrier spacing scaling using a sequence set having only two lengths with periodicity of 7-symbol. Further, a frame structure may be configured through a method for configuring a CP pattern using an integer sequence such as in table 2, in which a CP length of the integer number of samples in a reference time unit is made and a difference between different CP lengths becomes the smallest, and a method for extending a system bandwidth through the integer number of times scaling the CP pattern.

Further, an embodiment of the present disclosure may provide a method for designing a CP pattern, in which frames of respective subcarrier spacings are aligned corresponding to a frame of a reference subcarrier spacing so as to support cell coverage of the same or similar range between different frequency carriers, and the CP pattern of $2^m$ subcarrier spacings that is equal to or similar to the CP length of the reference subcarrier spacing is designed, and a frame structure applying the method.

Further, according to an embodiment of the present disclosure, the CP pattern is recognized as a location of an RS signal, a start location of a control channel, and a start location of a short TTI, and based on this, signal transmission/reception can be performed. If a subframe structure composed of CPs having different lengths is provided, an RS in which robustness is more important and a control channel may be located in a relatively longer CP symbol.

Further, according to an embodiment of the disclosure, information on an essential parameter set for a subcarrier spacing and a CP length pattern can be exchanged between the base station and the terminal.

According to an embodiment of the present disclosure, a method for a terminal to transmit/receive a signal in a mobile communication system includes receiving from a base station information related to a subcarrier spacing corresponding to the base station through a predetermined subcarrier spacing, transmitting to the base station the information related to the subcarrier spacing corresponding to the terminal on the basis of the received information on the subcarrier spacing corresponding to the base station, and receiving from the base station resource mapping information determined on the basis of the information related to the subcarrier spacing that can be supported by the terminal.

According to another embodiment of the present disclosure, a terminal in a mobile communication system includes a controller configured to receive from a base station information related to a subcarrier spacing corresponding to the base station through a predetermined subcarrier spacing, to transmit to the base station the information related to the subcarrier spacing corresponding to the terminal on the basis of the received information on the subcarrier spacing corresponding to the base station, and to receive from the base station resource mapping information determined on the basis of the information related to the subcarrier spacing that can be supported by the terminal.

According to still another embodiment of the present disclosure, a base station in a mobile communication system includes a transceiver configured to transmit/receive a signal, and a controller configured to control the transceiver, to transmit to a terminal information related to a subcarrier spacing corresponding to the base station through a predetermined subcarrier spacing, to receive from the terminal the information related to the subcarrier spacing corresponding to the terminal on the basis of the transmitted information on the subcarrier spacing corresponding to the base station, and to transmit to the terminal resource mapping information determined on the basis of the information related to the subcarrier spacing that can be supported by the terminal.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method by a terminal in a wireless communication system, the method comprising:
    identifying a first subcarrier spacing and a second subcarrier spacing; and
    receiving, from a base station, a signal based on the first subcarrier spacing and the second subcarrier spacing,
    wherein a first cyclic prefix (CP) pattern applied to a first symbol based on the first subcarrier spacing and a second CP pattern applied to a second symbol based on the second subcarrier spacing are determined from a predetermined CP pattern set,
    wherein CPs included in the first CP pattern have two different lengths, and a CP located in a first order in a slot has a length with an offset, the offset being common for the first CP pattern and the second CP pattern,
    wherein the first symbol corresponding to the first subcarrier spacing to which the first CP pattern is applied and the second symbol corresponding to the second subcarrier spacing to which the second CP pattern is applied are respectively time-aligned,
    wherein a period of the CPs included in the first CP pattern corresponds to a predetermined number of symbols,
    wherein the predetermined CP pattern set comprises at least one CP pattern having an index, and
    wherein an index of the first CP pattern is adjacent to an index of the second CP pattern, in case that the first subcarrier spacing is twice of the second subcarrier spacing.

2. The method of claim 1,
    wherein at least one CP included in the first CP pattern and at least one CP included in the second CP pattern are determined based on a first coverage of a first signal based on the first symbol to which the first subcarrier spacing is applied, and a second coverage of a second signal based on the second symbol to which the second subcarrier spacing is applied, and
    wherein the first coverage of the first signal and the second coverage of the second signal are within a predetermined range.

3. The method of claim 1, further comprising:
    receiving, from the base station, information related to a subcarrier spacing corresponding to the base station.

4. A method by a base station in a wireless communication system, the method comprising:
    identifying a first subcarrier spacing and a second subcarrier spacing; and
    transmitting a signal to a terminal based on the first subcarrier spacing and the second subcarrier spacing,
    wherein a first cyclic prefix (CP) pattern applied to a first symbol based on the first subcarrier spacing and a second CP pattern applied to a second symbol based on the second subcarrier spacing are determined from a predetermined CP pattern set, wherein CPs included in the first CP pattern have two different lengths, and a CP located in a first order in a slot has a length with an offset, the offset being common for the first CP pattern and the second CP pattern, wherein the first symbol corresponding to the first subcarrier spacing to which the first CP pattern is applied and the second symbol corresponding to the second subcarrier spacing to which the second CP pattern is applied are respectively time-aligned, wherein a period of the CPs included in the first CP pattern corresponds to a predetermined number of symbols, wherein the predetermined CP pattern set comprises at least one CP pattern having an index, and wherein an index of the first CP pattern is adjacent to an index of the second CP pattern, in case that the first subcarrier spacing is twice of the second subcarrier spacing.

5. The method of claim 4, wherein at least one CP included in the first CP pattern and at least one CP included in the second CP pattern are determined based on a first coverage of a first signal based on the first symbol to which the first subcarrier spacing is applied and a second coverage of a second signal based on the second symbol to which the second subcarrier spacing is applied, and wherein the first coverage of the first signal and the second coverage of the second signal are within a predetermined range.

6. The method of claim 4, further comprising:

transmitting, to the terminal, information related to a subcarrier spacing corresponding to the base station.

7. A terminal in a wireless communication system, the terminal comprising:

a transceiver configured to transmit and receive a-signals; and at least one processor coupled with the transceiver and configured to:

identify a first subcarrier spacing and a second subcarrier spacing, receive a signal from a base station based on at least one of the first subcarrier spacing and the second subcarrier spacing, and determine, from a predetermined cyclic prefix (CP) pattern set, a first CP pattern applied to a first symbol based on the first subcarrier spacing and a second CP pattern applied to a second symbol based on the second subcarrier spacing, wherein CPs included in the first CP pattern have two different lengths, and a CP located in a first order in a slot has a length with an offset, the offset being common for the first CP pattern and the second CP pattern, wherein the first symbol corresponding to the first subcarrier spacing to which the first CP pattern is applied and the second symbol corresponding to the second subcarrier spacing to which the second CP pattern is applied are respectively time-aligned, wherein a period of the CPs included in the first CP pattern corresponds to a predetermined number of symbols, wherein the predetermined CP pattern set comprises at least one CP pattern having an index, and wherein an index of the first CP pattern is adjacent to an index of the second CP pattern, in case that the first subcarrier spacing is twice of the second subcarrier spacing.

8. The terminal of claim 7, wherein at least one CP included in the first CP pattern and at least one CP included in the second CP pattern are determined based on a first coverage of a first signal based on the first symbol to which the first subcarrier spacing is applied and a second coverage of a second signal based on the second symbol to which the second subcarrier spacing is applied, and wherein the first coverage of the first signal and the second coverage of the second signal are within a predetermined range.

9. The terminal of claim 7, wherein the at least one processor is further configured to control the transceiver to receive, from the base station, information related to a subcarrier spacing corresponding to the base station.

10. A base station in a wireless communication system, the base station comprising:

a transceiver configured to transmit and receive a-signals; and at least one processor coupled with the transceiver and configured to:

identify a first subcarrier spacing and a second subcarrier spacing, and transmit a signal to a terminal based on at least one of the first subcarrier spacing and the second subcarrier spacing, and determine, from a predetermined cyclic prefix (CP) pattern set, a first CP pattern applied to a first symbol based on the first subcarrier spacing and a second CP pattern applied to a second symbol based on the second subcarrier spacing, wherein CPs included in the first CP pattern have two different lengths, and a CP located in a first order in a slot has a length with an offset, the offset being common for the first CP pattern and the second CP pattern, wherein the first symbol corresponding to the first subcarrier spacing to which the first CP pattern is applied and the second symbol corresponding to the second subcarrier spacing to which the second CP pattern is applied are respectively time-aligned, wherein a period of the CPs included in the first CP pattern corresponds to a predetermined number of symbols, wherein the predetermined CP pattern set comprises at least one CP pattern having an index, and wherein an index of the first CP pattern is adjacent to an index of the second CP pattern, in case that the first subcarrier spacing is twice of the second subcarrier spacing.

11. The base station of claim 10, wherein at least one CP included in the first CP pattern and at least one CP included in the second CP pattern are determined based on a first coverage of a first signal based on the first symbol to which the first subcarrier spacing is applied and a second coverage of a second signal based on the second symbol to which the second subcarrier spacing is applied, and wherein the first coverage of the first signal and the second coverage of the second signal are within a predetermined range.

12. The base station of claim 10, wherein the at least one processor is further configured to control the transceiver to transmit, to the terminal, information related to a subcarrier spacing corresponding to the base station.

* * * * *